(12) United States Patent
Goei et al.

(10) Patent No.: US 12,252,025 B2
(45) Date of Patent: *Mar. 18, 2025

(54) METHODS AND DEVICES FOR WIRELESS AND LOCAL CONTROL OF THE TWO-WAY FLOW OF ELECTRICAL POWER BETWEEN ELECTRIC VEHICLES, BETWEEN EVS AND ELECTRICAL VEHICLE SUPPLY EQUIPMENT(S), AND BETWEEN THE EVSE(S) AND THE ELECTRICITY GRID

(71) Applicant: Power Hero Corp., La Verne, CA (US)

(72) Inventors: Esmond Goei, Vancouver (CA); Steve Cloud, Stow, OH (US)

(73) Assignee: Power Hero Corp., La Verne, CA (US)

( * ) Notice: Subject to any disclaimer, the term of this patent is extended or adjusted under 35 U.S.C. 154(b) by 644 days.

This patent is subject to a terminal disclaimer.

(21) Appl. No.: 17/533,706

(22) Filed: Nov. 23, 2021

(65) Prior Publication Data

US 2022/0111747 A1    Apr. 14, 2022

Related U.S. Application Data

(63) Continuation-in-part of application No. 17/203,278, filed on Mar. 16, 2021, now Pat. No. 11,623,537,
(Continued)

(51) Int. Cl.
*B60L 53/30* (2019.01)
*B60L 53/12* (2019.01)
(Continued)

(52) U.S. Cl.
CPC ............ *B60L 53/305* (2019.02); *B60L 53/12* (2019.02); *B60L 53/16* (2019.02); *B60L 53/63* (2019.02);
(Continued)

(58) Field of Classification Search
CPC ...................................................... B60L 53/305
(Continued)

(56) References Cited

U.S. PATENT DOCUMENTS 4,309,644 A    1/1982   Reimers et al.
9,180,783 B1  11/2015   Penilla et al.
(Continued)

FOREIGN PATENT DOCUMENTS

KR        101781055   *  9/2017  ............. G01R 22/10

OTHER PUBLICATIONS

PCT: International Preliminary Report on Patentability of PCT/US2019/018551 (related application); Yukari Nakamura; Aug. 27, 2020; 11 pages.
(Continued)

*Primary Examiner* — Edward Tso
*Assistant Examiner* — Ahmed H Omar

(57) ABSTRACT

An apparatus enables an electric vehicle charger to communicate with a central control network. A first input interface interconnects the apparatus with the electric vehicle charger. A second input interface interconnects the apparatus with a charging connector associated with an electric vehicle. A wireless communications interface provides wireless connectivity between the central control network and the electric vehicle charger to receive bidirectional communications thereon. Control circuitry interconnects the first input interface with the second input interface via a signaling connection for providing communications between the first input interface and the second input interface. The control circuitry further provides a power connection for selectively providing a charging signal from the first input interface to the second input interface responsive to commands received over the wireless communications interface.

21 Claims, 28 Drawing Sheets

Related U.S. Application Data which is a continuation of application No. 16/279,426, filed on Feb. 19, 2019, now Pat. No. 10,960,782.

(60) Provisional application No. 63/189,481, filed on May 17, 2021, provisional application No. 62/632,208, filed on Feb. 19, 2018.

(51) Int. Cl.

| | | |
|---|---|---|
| *B60L 53/16* | (2019.01) | |
| *B60L 53/63* | (2019.01) | |
| *B60L 53/66* | (2019.01) | |
| *B60L 53/67* | (2019.01) | |
| *B60L 53/68* | (2019.01) | |
| *B60L 53/80* | (2019.01) | |

(52) U.S. Cl.
CPC ............ *B60L 53/66* (2019.02); *B60L 53/665* (2019.02); *B60L 53/67* (2019.02); *B60L 53/68* (2019.02); *B60L 53/80* (2019.02)

(58) Field of Classification Search
USPC ........................................................ 320/109
See application file for complete search history.

(56) References Cited

U.S. PATENT DOCUMENTS

| | | |
|---|---|---|
| 2009/0140700 A1 | 6/2009 | Eberhard et al. |
| 2011/0270476 A1 | 11/2011 | Doppler et al. |
| 2013/0110296 A1 | 5/2013 | Khoo et al. |
| 2013/0217409 A1 | 8/2013 | Bridges et al. |
| 2014/0028257 A1 | 1/2014 | Nishida |
| 2016/0144728 A1* | 5/2016 | Harper .................... B60L 53/67 320/109 |
| 2017/0250550 A1* | 8/2017 | Miftakhov .............. H02J 3/007 |
| 2017/0282736 A1 | 10/2017 | Goei |

OTHER PUBLICATIONS

PCT: International Search Report and Written Opinion of PCT/US2019/018551 (related application); May 29, 2019; 12pgs.
Australian Patent Office: First Examination Report of AU Application No. 2019222634 (related application), Nageib Alkhatib; Feb. 9, 2024; 5 pages.
Canadian Intellectual Property Office: Examiners Report of Canadian Application 3091607 (related application); Albert Lau; Feb. 23, 2023; 6 pages.
PCT: International Search Report and Written Opinion of PCT/US2022/29433 (related application); Aug. 15, 2022; Kari Rodriguez; 15 pages.
Canadian Patent Office: Examiner's Report of CA Application No. 3091607 (related application), Albert Lau; Oct. 26, 2023; 7 pages.
Patent Cooperation Treaty: International Preliminary Report on Patentability of PCT/US2022/029433 (related application); Agnes Wittmann-Regis; Nov. 30, 2023; 15 pages.
Australian Patent Office: Notice of acceptance for patent application of AU 2019222634 (related application); Sep. 16, 2024; 3 pages.

* cited by examiner

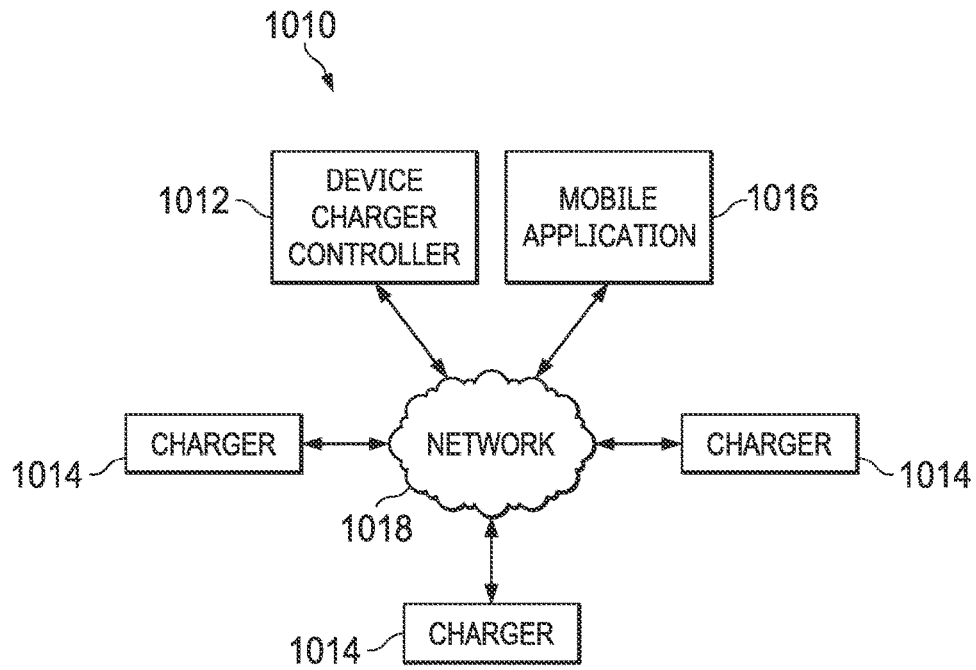
FIG. 10
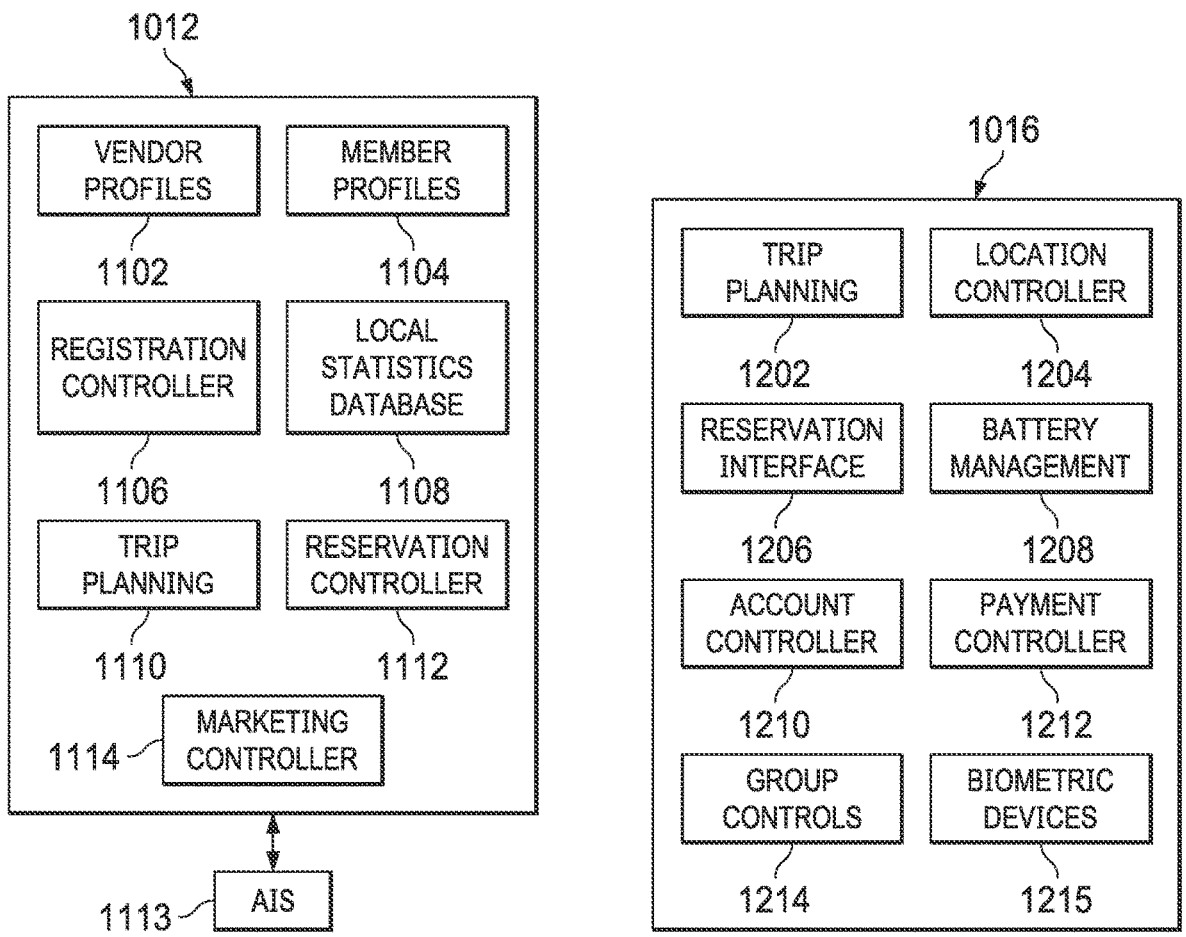
FIG. 11
FIG. 12

METHODS AND DEVICES FOR WIRELESS AND LOCAL CONTROL OF THE TWO-WAY FLOW OF ELECTRICAL POWER BETWEEN ELECTRIC VEHICLES, BETWEEN EVS AND ELECTRICAL VEHICLE SUPPLY EQUIPMENT(S), AND BETWEEN THE EVSE(S) AND THE ELECTRICITY GRID

CROSS-REFERENCE TO RELATED APPLICATIONS

This application claims benefit of U.S. Provisional Application No. 63/189,481, filed May 17, 2021, entitled METHODS AND DEVICES FOR WIRELESS AND LOCAL CONTROL OF THE TWO-WAY FLOW OF ELECTRICAL POWER BETWEEN ELECTRIC VEHICLES, BETWEEN EVS AND ELECTRICAL VEHICLE SUPPLY EQUIPMENT(S), AND BETWEEN THE EVSE(S) AND THE ELECTRICITY GRID, which is incorporated by reference herein in its entirety.

This application is a Continuation-in-Part of U.S. patent application Ser. No. 17/203,278, filed Mar. 16, 2021, entitled METHOD AND DEVICE FOR CONVERTING STANDALONE EV CHARGING STATIONS INTO INTELLIGENT STATIONS WITH REMOTE COMMUNICATIONS CONNECTIVITY AND CONTROL, which is a Continuation of U.S. patent application Ser. No. 16/279,426, filed Feb. 19, 2019, entitled METHOD AND DEVICE FOR CONVERTING STANDALONE EV CHARGING STATIONS INTO INTELLIGENT STATIONS WITH REMOTE COMMUNICATIONS CONNECTIVITY AND CONTROL, issued as U.S. Pat. No. 10,960,782 on Mar. 30, 2021. U.S. patent application Ser. No. 16/279,426 claims benefit of U.S. Provisional Application No. 62/632,208, filed Feb. 19, 2018, entitled A METHOD AND DEVICE FOR CONVERTING STANDALONE EV CHARGING STATIONS INTO INTELLIGENT STATIONS WITH REMOTE COMMUNICATIONS CONNECTIVITY AND CONTROL, each of which is incorporated by reference herein in its entirety.

TECHNICAL FIELD

The present invention relates to the charging of electrically powered devices, and more particularly, to a device for converting a dumb Electric Vehicle Supply Equipment (EVSE) (an EV charger) into a smart EVSE, and a network of EVSE networks (PowerNet) that enable subscribers of an EVSE network to access the EVSEs on another EVSE network that is managed by PowerNet.

BACKGROUND

The expanding uses of personal rechargeable electrical and electronic devices often require multiple rechargings of batteries within the devices during the course of daily usage. These devices include things such as mobile phones, tablets, personal entertainment devices, personal mobility devices and electric vehicles. With the advent of thousands of mobile phone applications, the rate of battery discharge in mobile phones has increased and popularize the use of portable power banks which accompanied the user to enable the charging of the mobile phone while the user continues their activity. However, in the case of larger sized tablet devices, these devices must often be left unattended at an electrical outlet. Similar problems are encountered with respect to portable medical devices such as a portable oxygen concentrator or respirator. These problems are also encountered with larger electrical devices such as an electric wheelchair or personal mobility device wherein the method of recharging the batteries of the device is restricted to charging at an electrical wall outlet. Depending on the user's state of disability the user may be confined to their electric wheelchair or personal mobility device for the time that the battery requires charging. The user would then have to wait within the chair during the entire charging process.

The aging of the population has seen a continued increase in the number of people with disabilities that can be alleviated by the use of rechargeable electrical devices such as portable oxygen concentrators (POCs) for people with chronic breathing difficulties, or electric wheelchairs for people with a mobility disability. Besides this aging population group, commonly referred to as the "Boomer" generation, many individuals may also be afflicted at younger ages due to injury, illness or birth disability.

Municipalities worldwide are responding to the need to provide transportation and pathways that are accessible by personal mobility device (PMD) users with wheelchairs or electric scooters. The main consumption of battery power by a PMD may begin at the destination point when the user engages in one or more activities that prompted the trip or journey in the first place. As an individual ventures out of his/her home, it is likely that they desire to visit more than one place around a particular destination point. For example, once the individual reaches a mall, they are likely to traverse the mall and visit various in-mall destinations. As the user visits the various places, the electric wheelchair or scooter is consuming battery power, and the PMD user must be conscious of the time passage. The level of residual battery charge may be used up causing the PMD to run out of battery power unexpectedly. When a PMD is drained of battery power, the user is greatly inconvenienced as PMDs can weigh 300 pounds or more and are much too heavy to push and manipulate manually. Additionally, the complete draining of the battery's power causes permanent damage to the battery which shortens battery life and which are expensive to replace. It is commonly recommended that the battery should never be drained below 60% of its capacity, and more recently, it has been recommended that such batteries be frequently charged and maintained close to full capacity. This creates a problem with public venues that are not equipped to provide electrical outlets for charging of devices, much less an electric PMD. Nor are the venue operators incentivized to provide electricity for free.

Similar types of problems arise with electrically powered cars when traveling longer distances from their homes. Electrically powered cars typically have a range of approximately 70-100 miles and some models with a range of over 300 miles. When going on longer trips or attempting to travel cross country, there is a similar need for periodic charging of the car in order to continue on the trip. Thus, some manner for preplanning and reserving charging opportunities would provide greater peace of mind to the electric vehicle traveler.

SUMMARY

The present invention, as disclosed and described herein, in one aspect thereof comprise an apparatus which enables an electric vehicle (EV) charger (EVSE) to communicate with a central control network. A first input interface interconnects the apparatus with the electric vehicle charger. This first input interface may be within the EVSE or extended out by way of a connector such as a J1772 connector. A second input interface interconnects the apparatus with a charging connector associated with an electric vehicle. A wireless communications interface provides wireless connectivity between the central control network and the electric vehicle charger to receive bidirectional communications thereon. This wireless communications interface and its functionality may be embodied as an integral system with functional elements distributed within the EVSE and also between the EVSE and the EV. Control circuitry interconnects the first input interface with the second input interface via a signaling connection for providing communications between the first input interface and the second input interface. The control circuitry further provides a power connection for selectively providing a charging signal from the first input interface to the second input interface responsive to commands received over the wireless communications interface.

BRIEF DESCRIPTION OF THE DRAWINGS

For a more complete understanding, reference is now made to the following description taken in conjunction with the accompanying Drawings in which:

FIG. 10 illustrates a medical/mobility device charging management system;

FIG. 11 is a block diagram of a central management server of a medical/mobility device charging management system;

FIG. 12 is a block diagram of a user application of a medical/mobility device charging management system;

FIG. 28b illustrates a functional block diagram of the embodiment of FIG. 28a;

DETAILED DESCRIPTION

Figure 1:
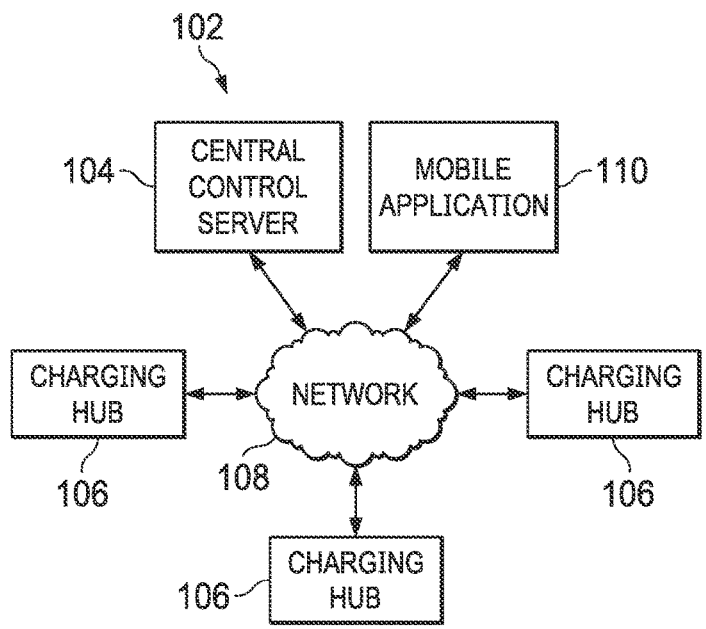
FIG. 1 illustrates a generic system for managing and reserving charging stations.

Referring now to the drawings, wherein like reference numbers are used herein to designate like elements throughout, the various views and embodiments of methods and devices for wireless and local control of flow of electrical power between electric vehicles, between EVSEs and electrical vehicles and between EVSEs and the electricity grid are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a generic representation of an electrical device charging management system 102. The system 102 includes a central control server 104 that is responsible for providing centralized management of the charging management system responsive to a variety of system inputs. The central control server 104 manages a number of charging hubs 106 that it communicates with via a network 108 such as the Internet. The charging hubs 106 include one or more charging ports that enable an electrically powered device to be connected and charged. The central control server 104 stores a variety of information related to registered system users and their associated electrically powered devices that are to be charged at the charging hubs 106. The information collected and stored can be used for reserving charging hubs 106, controlling the charging periods of the electrically powered device connected to the charging hub 106 and for enabling payment of charging services provided by the charging hubs. The users of the system are able to interact with the central control server 104 using a mobile application 110 that is stored upon a mobile device such as a smart phone, a tablet, a laptop, personal data assistants, etc. that belongs to the user and provides the ability to interconnect with the central control server 104 via the connecting network 108 such as the Internet. The mobile application 110 would be downloaded onto the user's communication device, and the user would register with the central control server 104 enabling the user to make reservations and find information with respect to the variety of charging hubs 106 that are a part of the charging management system 102 or which may be owned by other vendors that are compatible with the system. In such cases the system may only provide management and accounting and payment processes. The mobile application 110 would also enable new vendors that offer the services of charging units to register with the system.

Figure 2:
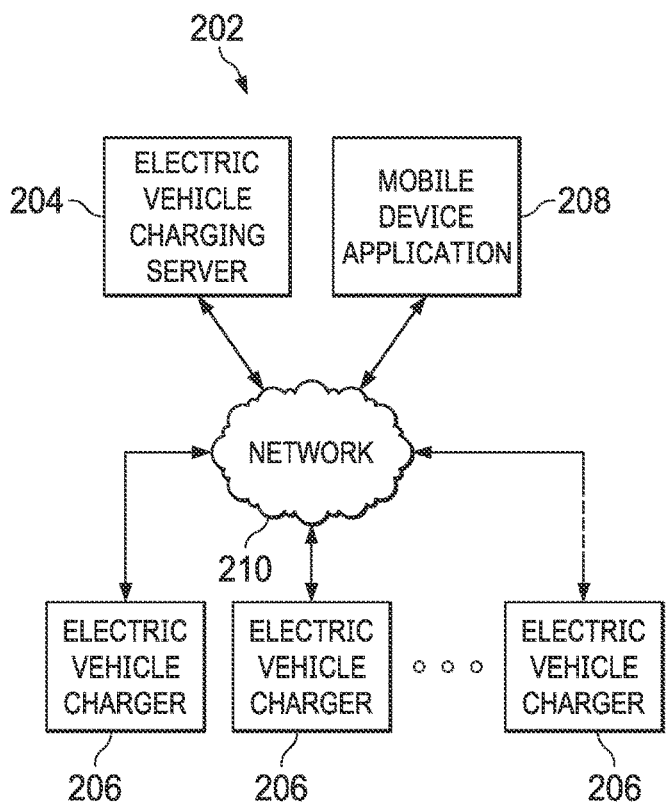
FIG. 2 illustrates an electric vehicle charger (EVSE) reservation and control system.

Referring now to FIG. 2, there is more particularly illustrated one embodiment of a charging management system 202 for electric vehicles. The system 202 provides closed loop accounting of the electric vehicle charging process starting from matching the electric vehicle to the charger unit 206, reserving the charger unit, engaging the charger unit, measuring the electricity delivered from the charger unit and collecting and disbursing payment. The electric vehicle charging management system 202 includes an electric vehicle charging control server 204 that controls and manages all system operations enabling user devices to make reservations, connect with and control charging with a variety of electrical vehicle chargers 206. The control server 204 may further enable charging of electrical vehicles by appointment or charging by reservation of other types of portable electric devices. The charging management and reservation system 202 could just as well be applied to non-electric powered vehicles that utilize other types of fuel for power generation such as hydrogen fuel which requires recharging of hydrogen tanks and even gasoline powered cars may benefit from a mechanism for reserving gasoline pumps in certain circumstances such as gasoline rationing which occurred in prior periods of energy crisis. The electric vehicle users are able to interact with the system 202 using a mobile device application 208 installed, for example, on their smartphone. As discussed before, interactions between the control server 204, charging units 206 and mobile device application 108 occur over a central network 210 such as the Internet. A particular electrical vehicle charging unit 206 can provide the chargers and appropriate connections for one or more types of electrical vehicles, such as golf carts, electric motorized wheelchairs, electric shopping carts, etc.

The growing deployment of electric vehicles create a need for widespread electrical charging stations 206 that are conveniently and strategically located at points of interest. The control server 204 enables a network of charging stations 206 to be managed within a wireless/wired automated environment enabling individuals and/or owners of specific brands of electrical vehicles to rent out their chargers 206 for charging compatible electric vehicles. For example, an owner of a Tesla can offer other Tesla drivers the use of their home/premises charging apparatus for a designated fee. The management system 202 is able to match a user with a particular charging station 206 by way of the mobile device application 208. The mobile device application 208 in addition to matching users with charging stations 206 makes use of the central management control system server 204 via the network 210 to enable the dispensation of electricity to the electric vehicles, control various electricity-metering apparatus and provide for an automated reservation, billing and payment processing mechanism for payment of use of the electrical vehicle chargers 206 to enable owners of the electrical vehicle chargers 206 to become a part of the charging management system 202.

Figure 3:
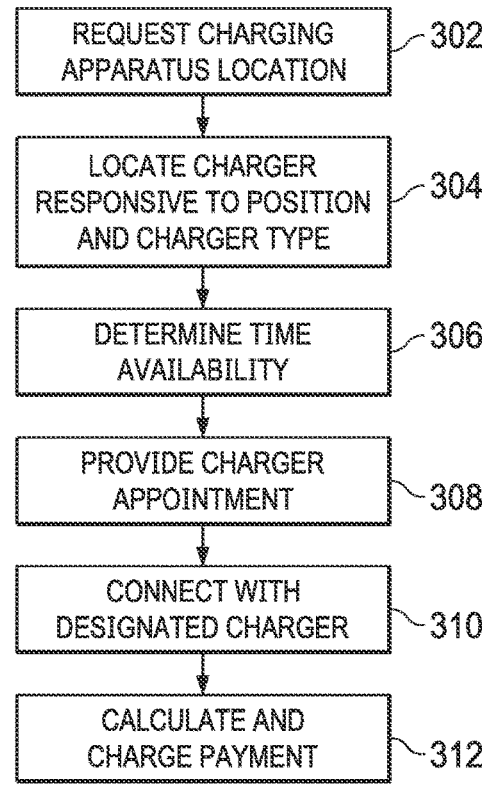
FIG. 3 is a flow diagram illustrating a process for reserving and using EVSEs that are part of a network.

Referring now to FIG. 3, there is illustrated a flow diagram describing the use of an electric vehicle charging management system 202 as discussed with respect to FIG. 2. Through the mobile device application 208, a user of an electric vehicle request at step 302 a location of a electric vehicle charger unit 206 that is compatible with their brand of vehicle. The charging control server 204 matches the vehicle to one or more appropriate vehicle chargers 206 at step 304 responsive to the position of the vehicle and the type of charger required to charge the vehicle. Next, the availability of the located chargers 206 is determined at step 306 to determine which of the chargers is available for charging of the vehicle. The time availability may be based upon a requested time or a projected time based upon the travel plan. Upon confirmation of the availability of the charging units 206, the user is to select one of the available charging units 206 and an appointment with the specific charging unit 206 is made by the charging control server 204, and the driver is notified of this appointment through their mobile application 208. Alternatively the user may elect to allow the system to select one of the many available 206 chargers pursuant to preset user preferences or to a system provided artificial intelligence system (AIS) which makes the election for them. Part of the appointment process may involve a full or partial payment being made by the drivers account subject to the charging functionalities of the charging control server 204. The driver may then travel to the designated charging unit 206 to obtain the vehicle charge.

Upon arrival at the designated charging unit 206, the vehicle is connected at step 310 with the designated charger that has been predetermined to be compatible with the particular electric vehicle brand that needs charging. Based on published utility rates, the amount of electricity consumed during the charge process and the location of the charging unit 206, the charging control server 204 can determine the amount to be collected from the registered driver's credit card or other registered payment sources such as PayPal at step 312 to complete payment for the charging services. Determination of electricity consumption can be facilitated by several means and mechanisms including in-line and inductive metering within the charging circuit to the electric vehicle or from data generated by the electric vehicle which may be accessible via Bluetooth or other wireless transmissions. With the advent of smart metering capability installed by utilities to monitor on premise electricity usage the electricity consumed via users using our system such information may be transmitted to our system for usage accounting and billing. Alternatively, the charging profiles from the electric vehicle manufacturer could be automatically referenced to generate an estimate of the electricity consumption that can be billed to the drivers' charging accounts for collection.

Figure 4:
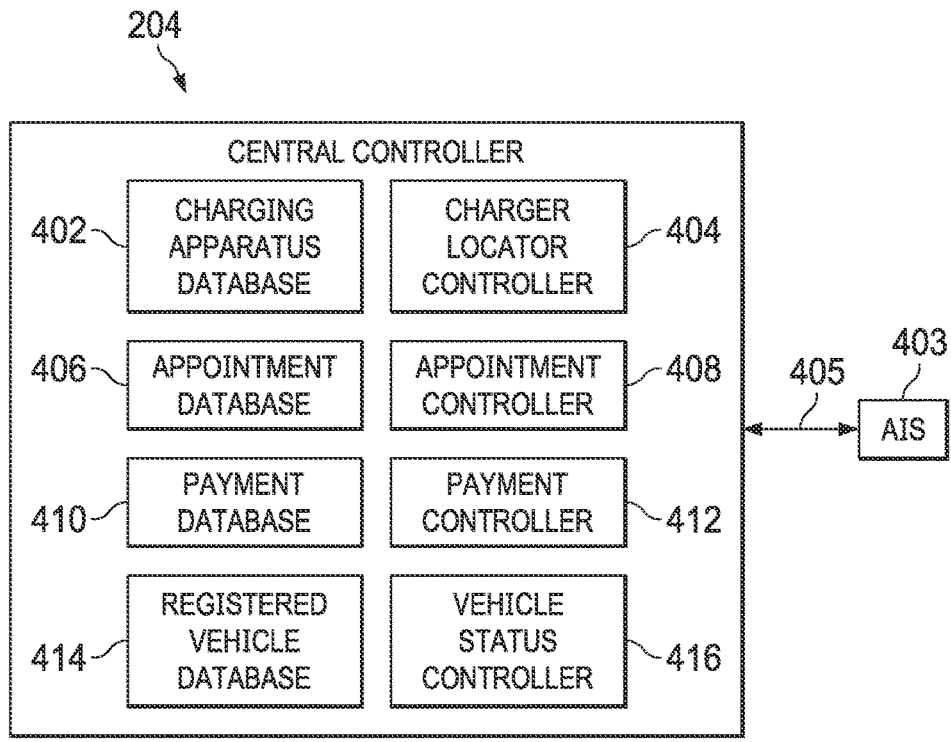
FIG. 4 is a block diagram of a central controller of an EVSE network.

Referring now to FIG. 4, there is illustrated a functional block diagram of the charging control server 204. The charging control server 204 includes a charging apparatus database 402 that includes all of the electrical vehicle charging units 206 that have registered with the system for providing charging locations for electric vehicles. The database 402 includes information such as number of charging ports and the types of electric vehicles for which the charging units 206 may be used. Databases within the charging controller server 204 comprise databases that provide data for performing complex real-time matching of the location of an electric vehicle on the road and searching for a charging unit 206 to determine the charging unit that is closest to the vehicle using the charger locator controller 404. More complex matching requests may incorporate destination routing referencing so that the electric vehicle driver may select a charger that is on the way to the electric vehicle's destination, or a mobile charging station that can rendezvous with the electric vehicle. The database 402 may also store information related to the registered electric vehicle such as the last time the electric vehicle was charged, the state of charge to enable the system to estimate the battery exhaustion time and recommended charging locations that an electric vehicle could reach before running out of power. A charger locator controller 404 determines charging units 206 that may possibly be utilized for charging the electrical vehicle based upon information stored within the charging apparatus database 402 and vehicle position and type information provided from the mobile device application 208 of the driver of the electric vehicle. In addition, a link 405 to an AIS 403 may be provided for the purpose of providing more sophisticated trip planning that incorporates various biometric data that may prompt more frequent stops for health necessities or prior user trip patterns. With the pending availability of autonomous vehicle platforms, mobile charging stations will become available and AIS 403 could also be used to coordinate dynamic scheduling of rendezvous points for charging the electric vehicle. The artificial intelligence system 403 may make decisions regarding trip planning without requiring specific user input but by only relying upon provided or monitored system information.

An appointment database 406 stores information for charging appointments that are made by vehicle drivers with respect to particular charging units 206. The appointment database 406 indicates a charging unit 206 and times that the charging unit is presently scheduled to be charging a particular vehicle. An appointment controller 408 generates a listing of possible appointment times for a charging unit 206 to the mobile device application 208 responsive to a user request and receives and stores a user selection for a particular appointment time for a charging unit 206 that a driver has selected.

A payment database 410 stores payment information for registered system users. The payment database 410 stores information required to enable payment for charging sessions via credit card, PayPal, Apple Pay, or other payment mechanisms. The payment controller 412 controls interactions with the mobile device application 208, charging information within the charging control server 204 and the vendor accounts for the charging unit 206 enable transfer of funds from the registered EV charging equipment user to a vendor responsible for the charging unit 206 providing a charging session. Various payment schemes may be stored in database 410 such as the use of stored credit resulting from advance deposits or some protocol for a system of membership debits and credits whereby members may opt to accumulate credits by providing charging service to other registered members and are debited when they consume electricity at a registered charging unit 206.

The registered vehicle database 414 maintains information concerning registered users with the system 202. Each registered user would have information concerning their vehicle type enabling assistance in selection of charging units 206 appropriate for that vehicle type. Additionally, the database 414 would include information tying the vehicle to particular charging information and other user or vehicle relevant information. The vehicle status controller 416 monitors operation of the charging operation by a charging unit 206 to which electric vehicle is connected. The charging status controller 416 can monitor the links of a charge and monitor for conditions indicating that ceasing of the battery charge is necessary due to completion of charging or problem issues requiring ceasing of battery charge.

Figure 5:
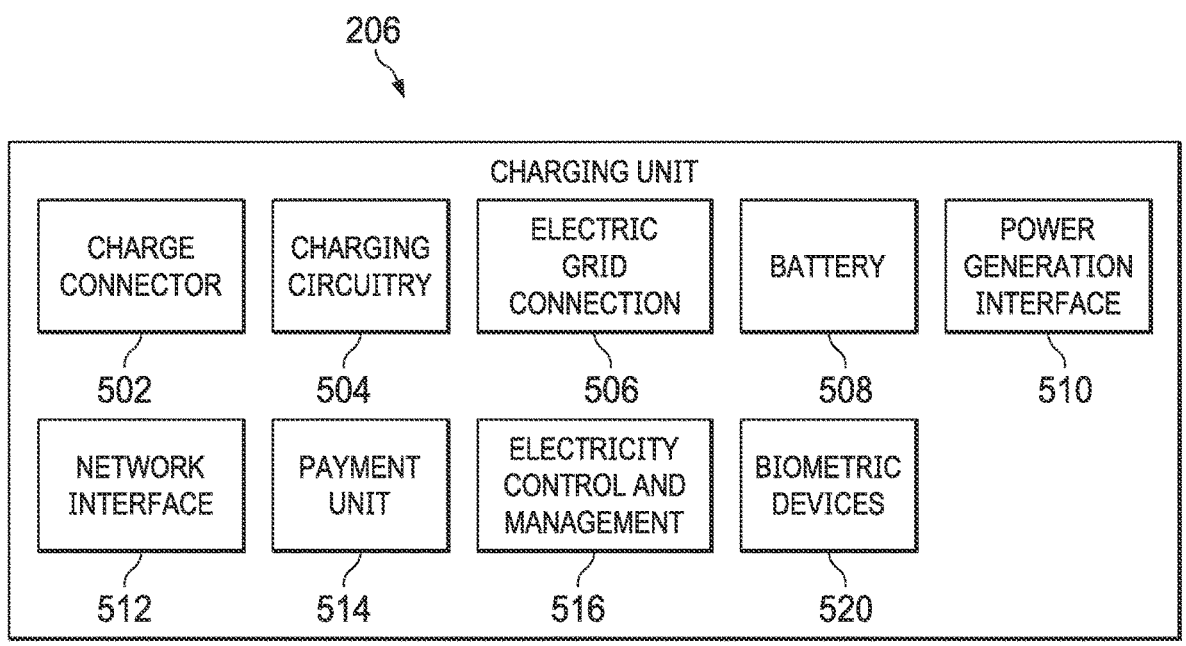
FIG. 5 illustrates a block diagram of a charging unit of an EVSE network.

FIG. 5 illustrates a functional block diagram of the charging unit 206. Charging units 206 are available in three classes of performance, level I and II are for residential and commercial installations where single phase AC power is available. Level III electric charging units are required for quick charging of electric vehicles in minutes. Level III charging units utilize three-phase AC power which is usually only available at a business or commercial premises. A typical level I or level II charger will fully charge an electric vehicle in several hours. The charging unit 206 will include a charge connector 502 for connecting one or more different types of electric vehicle to charging circuitry 504. The charging circuitry 504 generates the charging voltage provided to the vehicle. The charge connector 502 can be a single or multiple vehicle connection depending upon the capabilities of the charging unit 206. The charge connector 502 may comprise, but is not limited to, NEMA 15, Tesla, NEMA 50, J1772, SAE Combo, CHADeMO, NEMA 20, etc. connectors.

Charging circuitry 504 utilizes power from either the local power grid or a local battery source to generate a charging current that is output via the charge connector 502 to the electric vehicle being charged. The charging circuitry 504 can receive the charging power from either the electrical power grid via an electric grid connection 506 or a local battery 508. The electric grid connection 506 would comprise a standard power interface to the local power grid. A battery 508 would locally store electricity that was provided via some type of power generation interface 510 or from the electric grid connection 506. The power generation interface 510 could be connected to a solar, wind or other type of power generation system. Alternatively, the system could switch between the alternative power generation interface 510 and the electric grid connection 506 based upon low tariff periods from the electricity grid. Thus, the charging unit 206 would connect to the electric grid during low tariff times and utilize the alternative power generation interface 510 during higher tariff times.

A network interface 512 provides for a wireless or wired connection to the charging control server 204 to enable communications and operations occurring between the databases and controllers therein and the control functionalities within the charging unit 206. The network interface 512 utilizes powerline communications technologies and wireless technologies such as Wi-Fi, 3G/4G data services, GPSS and other mapping technologies. A payment unit 514 comprises an interface for manually entering user information or a credit card reader enabling the taking of point-of-sale payment information from a registered user that desires to charge their electric vehicle. Payment may be taken via cash, check or credit card using the appropriate payment collection protocols, or even membership debits and credits.

Each of the system components are under control of an electricity control and management unit 516 that is responsible for controlling all operations between charging units and operations between the charging unit 206 and the charging control server 204. The electricity control and management unit 516 enables the dispensation of electricity, detects the amount of electricity consumed and transmits this information through the network 210 using mechanisms such as powerline communications, and Wi-Fi, 3G, 4G or other prevalent data networks to the central controller 204 for storage within the various databases. The electricity control and management module 516 includes current sensors on the AC lines connected to the charging vehicle to measure the level of charge being delivered and provide electronic clocks that may be used to measure the duration of electricity dispensation. Information collected, used and transmitted during and after the matching process includes data on the electric vehicle connector type, the charging unit's characteristics, local utility electricity rates, electric vehicle identification protocols, dispensation duration, as well as characteristics of the charger behavior which may affect maintenance of the charger, etc. Alternatively, a fixed amount of charge can be implemented in discrete blocks of time, for example 30 minute increments, to control the electricity dispensation using a simple timer switch.

Biometric devices 520 may also be used for validating a user that is connecting his EV with the charging unit 206 and enabling initiation of the charging process. The biometric devices 520 may comprises devices such as fingerprint scanners, voice recognition devices, retinal scanners, etc.

Figure 6:
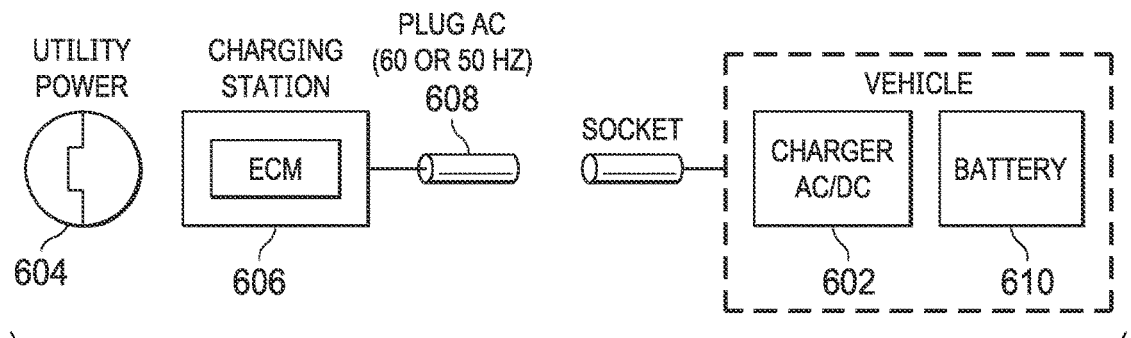
FIG. 6 illustrates an AC coupled charging unit.
Figure 7:
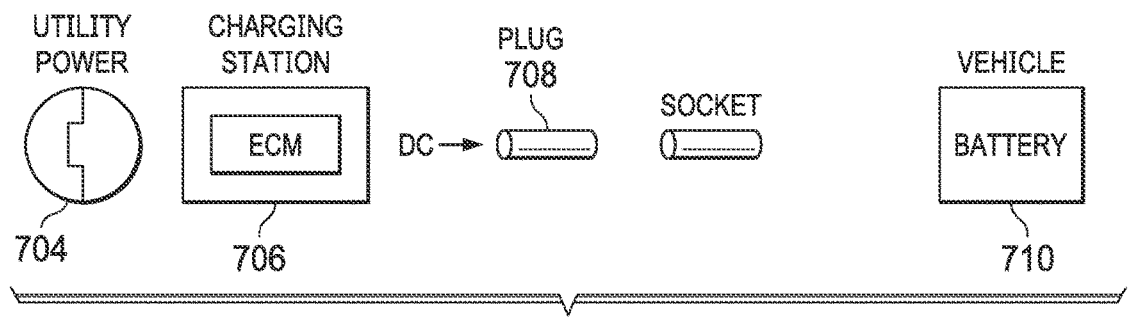
FIG. 7 illustrates a DC coupled charging unit.
Figure 8:
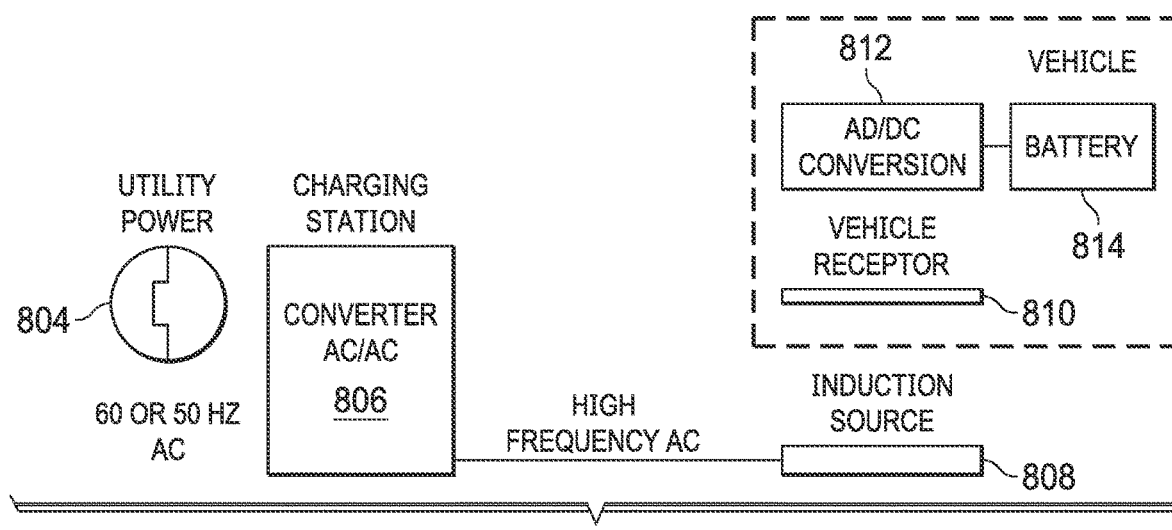
FIG. 8 illustrates an inductively or capacitively coupled charging unit.

Referring now to FIGS. 6-8, there are illustrated components of the system for three different modes of coupling between the electric vehicle with a converter depending on the electric vehicle's onboard electricity storage system. As shown in FIG. 6, if the electric vehicle has a built-in converter 602 to convert the incoming AC power from the utility power 604 into DC power, the charging station 606 only needs to output AC power with the appropriate connector plug 608 voltage to charge the battery 610. If the electric vehicle requires DC power for charging, the electric power provided from the charging station 706 responsive to the utility power 704 comes from a DC power output mechanism at the appropriate voltage from the connector plug 708. The plug connection 708 provides the DC charging voltage directly to the battery 710.

In addition to the directly coupled electric vehicle (EV) charging configurations of FIGS. 6 and 7, an inductive or capacitive charging system may be used wherein the utility power 804 provided to the charging station 806 is inductively or capacitively coupled to a vehicle through an inductive or capacitive source 808 and vehicle receptor 810. An AC to DC conversion unit 812 within the vehicle converts the AC power into a DC component for charging the battery 814. Note that all three charging situations of FIGS. 6-8 utilize a charging station including an electricity control and management system 516 that provides the necessary electrical power conversion and regulation as necessary, turns on/off the charging power, measures the amount of electricity dispensed and performs other control functions such as monitoring the charge used by the EV via data gathered from the EV during charging. Such data may be gathered wirelessly or via a connecting cable that connects the electric vehicle to the charging unit.

Figure 9:
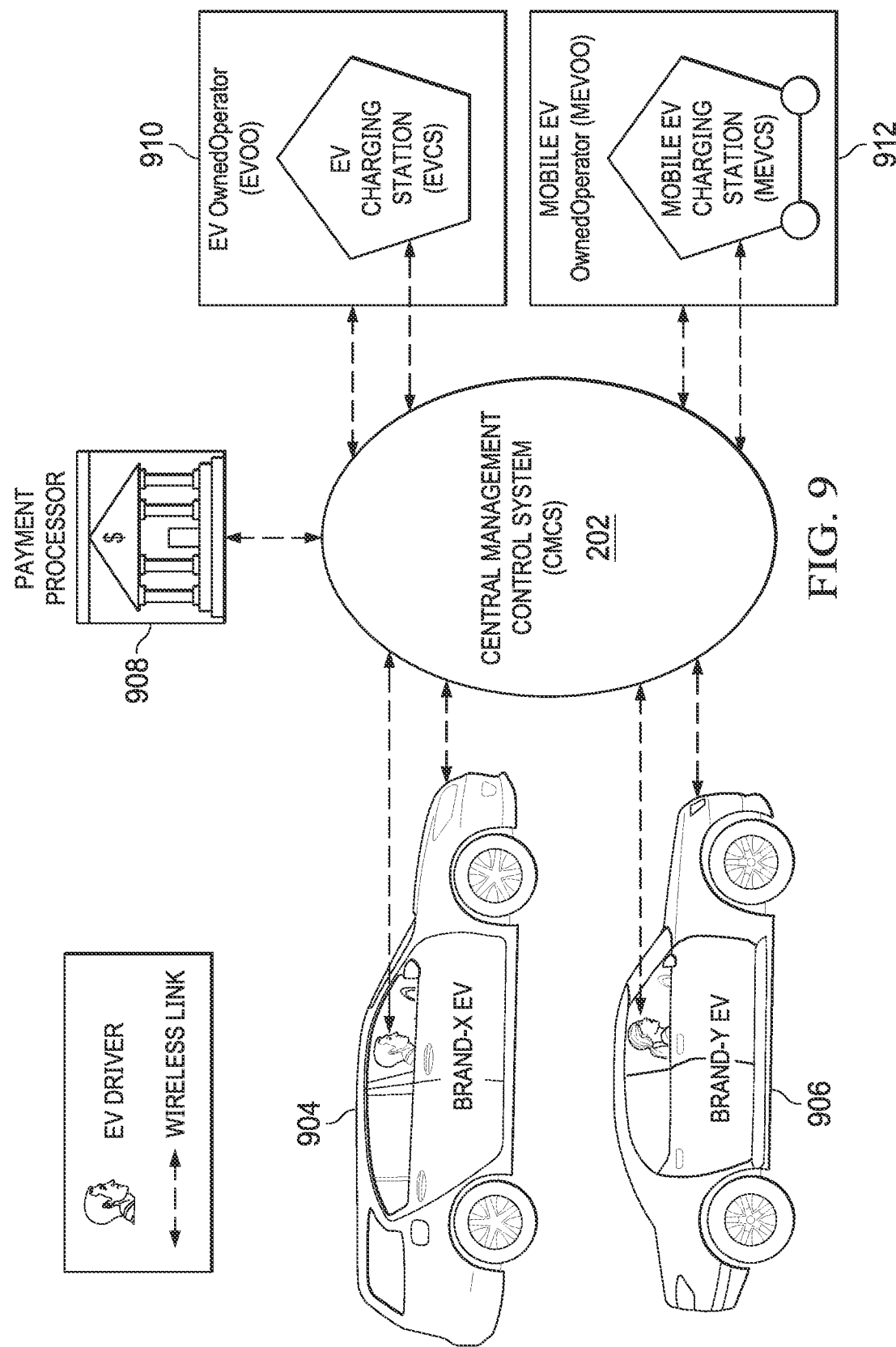
FIG. 9 illustrates a central management control system and its interaction with EVSEs.

FIG. 9 illustrates the main components of the charging system wherein the various components are wirelessly communicating with the charging control server 202. The charging control server 202 is the brains of the system and maintains a database of components including the profiles of the drivers and the charging units along with the locations of the charging units. The charging control server 202 monitors each transaction from start to finish, records the time of charging, performs payment processing and continuously collects information from the network components. The charging control server 202 wirelessly connects to different brands of electric vehicles 904, 906 through the mobile application and with the payment processor 908 to carry out payment for charging services. Further wireless connections may be between the owners and operators of various EV charging stations 910 at fixed locations or mobile EV charging stations 912 that may actually come to stranded vehicles to provide charging or to dynamically schedule and coordinate rendezvous between travelling electric vehicles and mobile charging stations. The mobile chargers 912 utilize onboard storage devices or generators enabling the mobile system to provide charging services wherever it is needed such as an electric vehicle rally, county fair, golf course or tournament where electric carts need charging, etc., or wherever electricity might be needed. By coupling onboard energy collection sources such as solar panels or wind turbines, a mobile charger 912 could operate indefinitely away from a power grid. These mobile chargers 912 provide a roving charging station on a moving platform such as a truck equipped with fossil fuel motorized electric generators or a bank of batteries that are either charged from the normal grid outlet such as 110 V or 220/240 V AC wall circuits and/or are continuously charged on the road via onboard solar panels or energy collection mechanism such as wind turbines or the vehicles 12 V DC output.

The electric vehicle network management and charging system 202 provides the ability to match brand specific electric vehicles with brand compatible charging units and schedule an electric vehicle charging session. The system 202 also provides the means of matching and enabling non-EV owners who buy third party charging units to become independent operators operating on their own schedule to provide charging services. The system 202 will deliver the same transaction experience to those using brand specific electric vehicles and charging units by scheduling the transaction, measuring/metering and dispensing the electricity consumed, collecting and disbursing payment for consumption, recording the incident and tracking the process. The system 202 will provide for electronic record keeping and payment processing. Payment mechanisms are universally available from third parties including the use of on-site magnetic card readers, smart chip card readers, online Internet data entry through third-party portals, and other methods as may become popular or necessary for payment processing. Prepayment options are also available by pre-registering the electric vehicles payment options which then merely require the completion of agreed-upon payment protocols.

In another embodiment, the system may utilize modules of removable batteries wherein electric vehicle may simply exchange charge depleted batteries for a set of fully charged batteries, and thus eliminate the waiting time associated with charging the electric vehicles onboard batteries. When such electric vehicles are available as well as the battery modules, the system will utilize a battery exchange system to exchange batteries using the mobile applications and central controller described hereinabove with such modular batteries that are matched with their modular electric vehicle that may accept the batteries.

Referring now to FIG. 10, there is illustrated an alternative embodiment of a system 1010 for managing a network of charging stations for personal electric devices such as personal mobility devices, personal medical devices, and personal media devices such as mobile phones, electronic tables and laptop computers. The system 1010 includes a central device charger controller 1012 that controls all charging operations between a plurality of charging units 1014 through a network 1018, such as the Internet. Individual users may establish appointments with the various charging units 1014 using a mobile application 1016 stored on their personal mobile devices. The mobile application 1016 communicates with the central device charger controller 1012 and charging units 1014 through the network 1018. The system 1010 enables and facilitates the charging of electric devices at locations which provide charging facilities that can be reserved for use at predetermined times or opportunistically as availability permits. The charging units 1014 are provided at locations in or around where a user intends to engage in some activity such as those offered at recreational or food and beverage sites among other establishments, or in general where the user intends or expects to be spending an extended length of time to provide an effective charging cycle. However, the system 1010 is not restricted to such locations as such charging units 1014 may be rented out by the owner or operator for use at the user's option and pleasure. More simplified versions of charging units 1014 may simply be a battery for use in the user's device, or even for a battery exchange system as described herein above. It is anticipated that mobile apps such as 110 and 1016 may be integrated into a single app which provides the user with a menu of functionality related to the type of devices that the user desires to charge whereby the app would then launch the appropriate reservation and use protocols related to the device to be charged.

The network of charging stations 1014 are located within or near the property of a service provider such as a restaurant, cinema, concert hall, etc., or are transportable and can be reserved by a personal mobility device user prior to the user's visit at a particular vendor location. The user makes reservations for use of a charging unit 1014 via the mobile application 1016 which enables the user to connect to the central device charger controller 1012. The charging unit 1014 contains electronics and switches that control the dispensation of an electric charging current to the subscribing user's personal electric/electronic device under control of a central control module having functions that are incorporated within the device charge controller unit 1012. Each charging unit 1014 may contain several connectors that can be controlled from a single centralized controller. Each connector may have different connector configurations for connecting with different devices having different charging protocols.

The mobile application 1016 provides position information using various applications such as GPSS applications, cell tower triangulation techniques or using location sensitive beaconing technologies such as Apple Computer's Bluetooth app iBeacon. Typically, the application 1016 is downloaded to a mobile communications device such as a smart phone or electronic tablet. The application 1016 and central device charger controller 1012 enable the system to employ Internet of Things (TOT) protocols and methods to enable and provide for a range of services to the user who subscribes for such services via online registration through the application.

The system 1010 uses the network 1018 to provide shared computer and communication resources and to maintain databases within the device charger controller 1012, as will be described more fully herein below, for all subscribing vendors and system subscribers. Before registering a vendor, the vendor's venue must be audited as to the feasibility of providing charging unit services. The vendor must have Internet connectivity to become part of the system and may opt for other wireless communications methods such as Wi-Fi, and/or Apple Computer's app iBeacon that facilitates sending digital beacon messages from the vendor to the user. The vendor must also set aside or install specific electrical outlets and space to accommodate the secure and convenient charging of one or more personal electric/electronic devices at their premises or venue. The vendor would initiate the registration process using a mobile application 1016 in a similar manner that a new user would register with the system.

The installation of a beacon-like application on the user's smart device enables the system to provide the user with enhanced services. The electricity provided through the designated outlets is accessed, controlled and regulated via a device and/or software either within the vendor's premises equipment or in an external apparatus that connects with the system. The vendor, such as a restaurant operator that caters to electric wheelchair users, would designate specific wheelchair accessible tables which either incorporate one or more charging ports or in some cases the vendor might deploy their charging units at convenient personal mobility device parking areas provided the vendor also has a means for enabling the visiting user to be transported to the activity venue. All such information is part of the specific event venue profile and may be displayed on the user's mobile application 1016.

In the case of a personal mobility or medical device the charging unit 1014 employs Internet of things (IOT) technology to communicate with the central device charger management controller 1012. The charging unit 1014 also communicates with the personal mobility device in such cases wherein the personal mobility or medical device has built-in communications capability such as Bluetooth or Wi-Fi. In such cases, there may be a need to cooperate with the specific personal mobility or medical device manufacturer in order to obtain the personal devices API (application program interface). Access to such APIs may be required to enable the system's sophisticated features such as trip planning so that the system can determine and correlate the real time charge state of the personal devices' battery and trip characteristics such as the average speed of travel among other measurement parameters for a personal mobility device or the rate of battery drain and medication consumption as in the case of a personal portable medical device user.

The system 1010 incorporates other positioning technologies for such purposes including beaconing technologies and wheel mounted odometers to enable the determination of distances traveled by the personal mobility device based on revolutions of the wheel. Other means of providing such information may utilize third-party apps such as Google maps whereby the system can derive the personal mobility devices position and travel progress via the user's smart phone GPSS system. IOT capability may be deployed in several elements of the vendor's equipment portfolio. Other methods and apparatuses may be used to garner the necessary personal mobility device travel and battery state data to determine the distance traveled and other apparatuses that can be interfaced with the PMD battery for real-time battery state and charge logging. Additionally, the central management controller may measure the quantity of electricity consumed by the personal mobility device during the charging session.

Referring now to FIG. 11, there is illustrated a functional block diagram of the central device charger controller 1012. The controller 1012 includes databases of vendor profiles 1102 and member profiles 1104. The vendor profiles 1102 store information concerning charging units 1014, and the individuals controlling operation of the charging units. The member profiles 1104 include information about users who have registered their personal mobility devices, personal medical devices or other electric devices for charging through the device charger controller 1012 and charging units 1014.

The local statistics database 1108 stores information relating to the neighborhood surrounding charging units 1014. This information may comprise information such as the availability of handicap parking near the particular vendor providing the charging unit or locations of personal mobility device accessible washrooms and other amenities such as restaurants and shops located nearby. Locations of nearby medical facilities that can provide treatment and services specific to the needs of a specific personal mobility device or personal medical device users will also be displayable through the mobile application 1016 in the event that the user is in need of medical intervention. Because of the user's dependence on the personal mobility device, the system could also provide the locations of nearby personal mobility device shops for parts and service and their hours of operation.

Registration controller 1106 is responsible for enabling new users to register with the central device charger controller 1012 after they have downloaded the mobile application 1016 to their personal mobile device. Trip planning controller 1110 enables a user to interact with the central device charger controller 1012 through their mobile application 1016 to plan a trip between locations and locate charging units 1014 located in close proximity to the trip route. Once various charging units 1014 are located that correspond to the trip plan, the reservation controller 1112 enables the user to make a reservation for a particular charging unit 1014 at a particular time through the mobile application 1016. An artificial intelligence system AIS 1113 may be utilized to provide more sophisticated trip planning that incorporates biometric measurement and monitoring to facilitate intervention for medical or other reasons. Marketing controller 1114 generates programs for marketing particular services to users by pushing information from the charger controller 1012 to the mobile applications 1016.

FIG. 12 illustrates a functional block diagram of the mobile application 1016 stored upon a personal mobile device. The application 1016 includes trip planning functionalities 1202 enabling a user to plan and locate charging units 1014 in conjunction with the device charger controller trip planning functionalities 1110. The trip planning functionality 1202 enables a user to search for charging unit enabled establishments/locations to make bookings and reservations for use of a specific charging unit 1014. The trip planning functionality 1202 utilizes charging unit 1014 availability around the specified area and may be carried out manually by user selections or automatically/semi-automatically with assistance from the trip planning controller 1110 within the device charger controller 1012 and in conjunction with AIS 1113. Utilizing user inputs of estimated times to be spent at each portion of a trip, the trip planning functionality 1202 in conjunction with the trip planning controller 1110 of the device charger controller 1012 provides advice on a sequence of charging stops and the optimum time and duration to be connected to a charging unit 1014. Upon user confirmation of a trip plan, the system will make the necessary reservations utilizing communications between the reservation interface 1206 of the application 1016 and the reservation controller 1112 of the device charger controller 1012 at the appropriate charging unit 1014. AIS 1113 may be employed to make trip adjustments dynamically in reaction to trip actualities.

The location controller 1204 enables the mobile application 1016 to determine a current position of the mobile device housing the mobile application. The location controller 1204 makes use of global positioning or other positioning functionalities to determine a terrestrial location of the personal mobility device, personal medical device or other electric device for charging. This is useful in locating charging units 1014 that are in a desired proximity to the user. The reservation interface 1206 enables the mobile application 1016 to generate a reservation for a particular charging unit at a particular time. The reservation interface 1206 interacts with the registration controller 1106 of the device charger controller 1012 in order to locate available charging units 1014. AIS 1113 may be engaged to direct 1206 to make the necessary reservation changes.

Battery management controller 1208 keeps track of the user's current battery charge for a personal mobility device or personal charger device. The battery management controller 1208 determines when a last charge of the device occurred and based upon known discharge characteristics generates alerts and provides notifications to users when recharging of their personal mobility device or personal medical device is necessary in order to avoid the devices becoming completely discharged and stranding the user or placing them in a medical emergency situation. The battery management controller 1208 controls battery management and provides proper charging sequences, conditioning and protections. The battery management controller 1208 assesses battery to charger compatibility, provides charging management and provides real-time feedback and reporting on the charging process and level of the charging device's battery charge so as to alert the user when the battery reaches specified user established threshold triggers or if the battery is impaired. This management and control by the battery management controller 1208 also ensures that the charging process is consistent with the various battery chemistry and technologies used in the respective batteries. Such control may also be moderated on demand to affect the charging rate for the battery such as to enable vendor discretion for pricing their services on the basis of fast or normal charging rates. The battery management controller 1208 may also provide automatic cutoff of the charging process when anomalies are encountered to prevent hazardous events.

The account controller 1210 stores user account information enabling a user to login to the device charger controller 1012 in order to obtain charging services. The account controller 1210 provides real-time account access by vendors and users as to their individual accounts to obtain charger usage and financial information and management. For example, the current status for a charging unit reservation and utilization may be obtained by the vendor. Users may obtain reservation status and carry out actions such as charging to a credit card and/or debiting a bank account with a predetermined booking fee in order to credit the amount to the charging system operator and reserve a predetermined portion of the transaction fee for service providers as may be contracted. Payment controller 1212 stores payment information for the user enabling them to utilize the mobile application 1016 to automatically pay for and obtain charging services using for example credit card information, PayPal information, automatic bank draft information or other payment protocols such as Apple Pay, etc.

The group control functionality 1214 provides for social media interactions and group socializing of system users. Group socializing may include the coordination of user activated group activities and/or assembly when the invited individuals are allocated to specific charging units 1014 for charging. Things such as group gifting capabilities may be facilitated to enable users to coordinate a group gifting campaign for a user, or anyone else that has an email address and or mobile phone number. The group control functions 1214 also provide the ability to offer other group apps by third parties such as SPOND or Evite to enable group gatherings to be offered through the system 1010. Group controls 1214 could also provide neighborhood watch capabilities whereupon a user can automate the setting of alarm that is broadcast to one or more individuals whenever a trip plan is violated as to time of expected arrival and expected trip stop location as might occur when an elderly personal mobility device user gets forgetful and strays from their planned activities. Biometric measurement devices 1215 may also be used to provide indications for the need of medical or health related interventions. In such situations, the system could be programmed to send out a distress signal to either the police, and/or other preset emergency contacts. Distress signaling could be provided to alert care practitioners and/or emergency responders when a user's biometric condition triggers preset thresholds. The biometric devices 1215 may also me used for validating a user and enabling initiation of the charging process. The biometric devices 1215 may comprises devices such as fingerprint scanners, voice recognition devices, retinal scanners, etc. The group controls 1214 also provide aggregation or grouping of various personal mobility devices accessible establishments and provide advertising services to such establishments to coincide with trip plans that a user may establish using the trip planning functionalities 1202.

Figure 13:
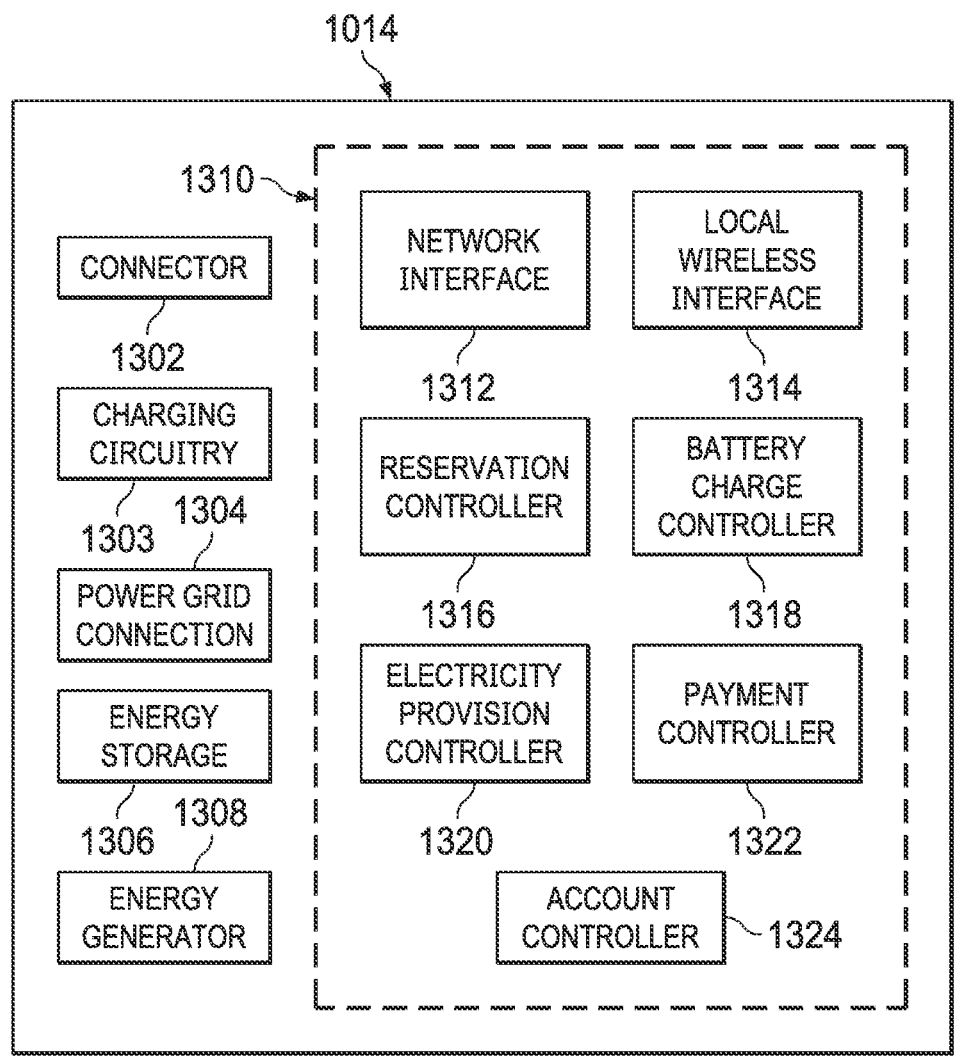
FIG. 13 is a block diagram of a charging unit of a medical/mobility device charging management system.

FIG. 13 provides a functional block diagram of the charging unit 1014. A connector 1302 enables the charging unit 1014 to connect with a device that is being charged. The connector 1302 provides charging current from the charging circuitry 1303. The charging circuitry 1303 generates the charging current from a provided energy source. The connector 1302 can be of one or a plurality of types to enable the charging unit 1014 to connect to a variety of different personal mobility devices, personal medical devices or other types of electrical devices needing charging. A connector 1302 may provide direct, inductive, capacitive coupling or other state-of-the-art over the air technologies to the charging unit from the device being charge. The connector 1302 may comprise several connections under control of the central control module 1310. Each of the plurality of connectors may employ different connector configurations for connecting personal mobility devices as different personal mobility devices may employ different connecting plugs and also contain different types of batteries (such as sealed lead acid (SLA) or lithium ion battery chemistry), different battery capabilities, capacities and different battery charging voltages and charging protocols.

The central control module 1310 provides a range of battery charging management and control protocols and functionalities for regulating the charging process as well as to monitor the personal mobility devices battery charge state to prevent overcharging which can lead to fire and explosions. Power grid connection 1304 connects the charging unit 1014 to the electrical power grid. The power grid connection 1304 provides a connection to the power grid that enables the charging unit to charge a connected electrical device using a generated charging current.

In addition to receiving electrical charging energy from the power grid, energy generator interface 1308 enables connection to an alternative energy generation source such as solar cells, a wind turbine, a gas powered generator, etc. Energy storage batteries 1306 may be used for storing energy for charging a connected electrical device without requiring an active electrical power connection. The off grid power provided by batteries and/or other energy storage devices can be regularly charged by solar panels or other renewable energy power generators such as wind turbines or even fossil fuel power generators. Offered power may in fact also be provided by user devices whereby one personal mobility device may be used to transfer power to another personal mobility device whether singly or in a ganged or combined fashion. The concept is not restricted to personal mobility devices but may also be applied to all portable or transportable user devices for inter-device charging. The batteries may be charged from a connected alternative energy source through the energy generator interface 1308 or through the power grid connection 1304.

A central management controller 1310 includes all of the central control functionalities for controlling the operation of the charging unit 1014 responsive to control information from the central device charger controller 1012 and mobile applications 1016. Communications with the central device charger controller 1012 and mobile applications 1016 are carried out through a network interface 1312 enabling communications over the network 1018. Further communications to the network 1018 or local devices may also be carried out through a local wireless interface 1314 using Wi-Fi, Bluetooth or other wireless communications protocols or through the powerline itself. The reservation controller 1316 enables information to be exchanged regarding the establishment of a reservation by a user, validation of the user upon arrival at the charger 1014 for charging, and notification of the reserved status of charging unit 1014 at a particular point in time at which a reservation has been granted. The battery charging controller 1318 controls the battery charging process when an electrical device is actually connected with the charging unit 1014.

Upon validation by reservation controller 1316 of the valid connected device and user member that made the reservation the electricity provision controller 1320 works in conjunction with the charging circuitry 1303 to regulate the flow of electricity to the device's battery. The electricity provision controller 1320 has the ability to regulate the flow of electricity in such a manner as to manage the charging of the user's device battery that is connected to the charging unit 1014 so as to optimize the charging process or simply to regulate the speed of charging based on pricing and payment protocols. This process is facilitated by the incorporated data communications capability of the local wireless interface 1314 using Wi-Fi, 3G, 4G, Bluetooth etc. Payment controller 1322 provides point-of-sale functionalities enabling a user to pay for charging services received by their electric device. The payment controller 1322 may be in the form of a magnetic strip or smart chip reader that reads information from a credit card or a data entry terminal that receives information from a user's mobile application or enable manual entry relating to payment information that is used to charge a user's account. The account controller 1324 provides access to user account information based upon information received from the mobile application 1012 that has requested a charging time or is providing payment information.

In the case of the charging of large capacity battery powered personal mobility devices such as electric wheelchairs and scooters for the mobility impaired, such personal mobility devices typically take a long period of time to charge but are quick to discharge in use due to the unpredictable energy consumption modes. In such cases where the charging time required is long and there is a physical or medical dependence on the device by the user, the utility of being able to reserve a charging port becomes more of a necessity rather than a convenience. Consider the case of an electric wheelchair user, or the user of a portable oxygen concentrator (POC), a respiratory device for chronic obstructive pulmonary disease sufferers which requires the need of a charge while the user is out of their home. The user dependence on his wheelchair or POC precludes leaving the device to be charged while the user engages in an activity; unless the user has a spare device to use while their other device is charging or the user is participating in an activity at the charging station itself such as a eating dinner at a restaurant or watching a show at a theater.

Using the mobile application 1016 and device charger controller 1012, the user is able to reserve a charging port in advance for a predetermined time where the user knows they will be present at or near a specific charging facility. The user may also charge their device at the establishment when they are engaged in an activity at a location, such as dining at a restaurant, for a particular period of time. One of the features of the system is the assisting of the user in determining the optimum time for recharging which coincides with a period of immobility such as eating dinner in the restaurant that includes a charging unit and/or has the ability to facilitate charging services. The described system has tremendously broad utility and applicability to any and all rechargeable devices. While the disclosure is made with respect to rechargeable electric motor powered personal mobility devices for mobility impaired individuals or personal medical devices, the concept described herein is applicable to other types of electrically rechargeable devices that store energy and require recharging or energy refurbishment. The concept described herein is also applicable to other modalities of energy storage and dispensation such as hydrogen gas or other compressed fluids.

Figure 14:
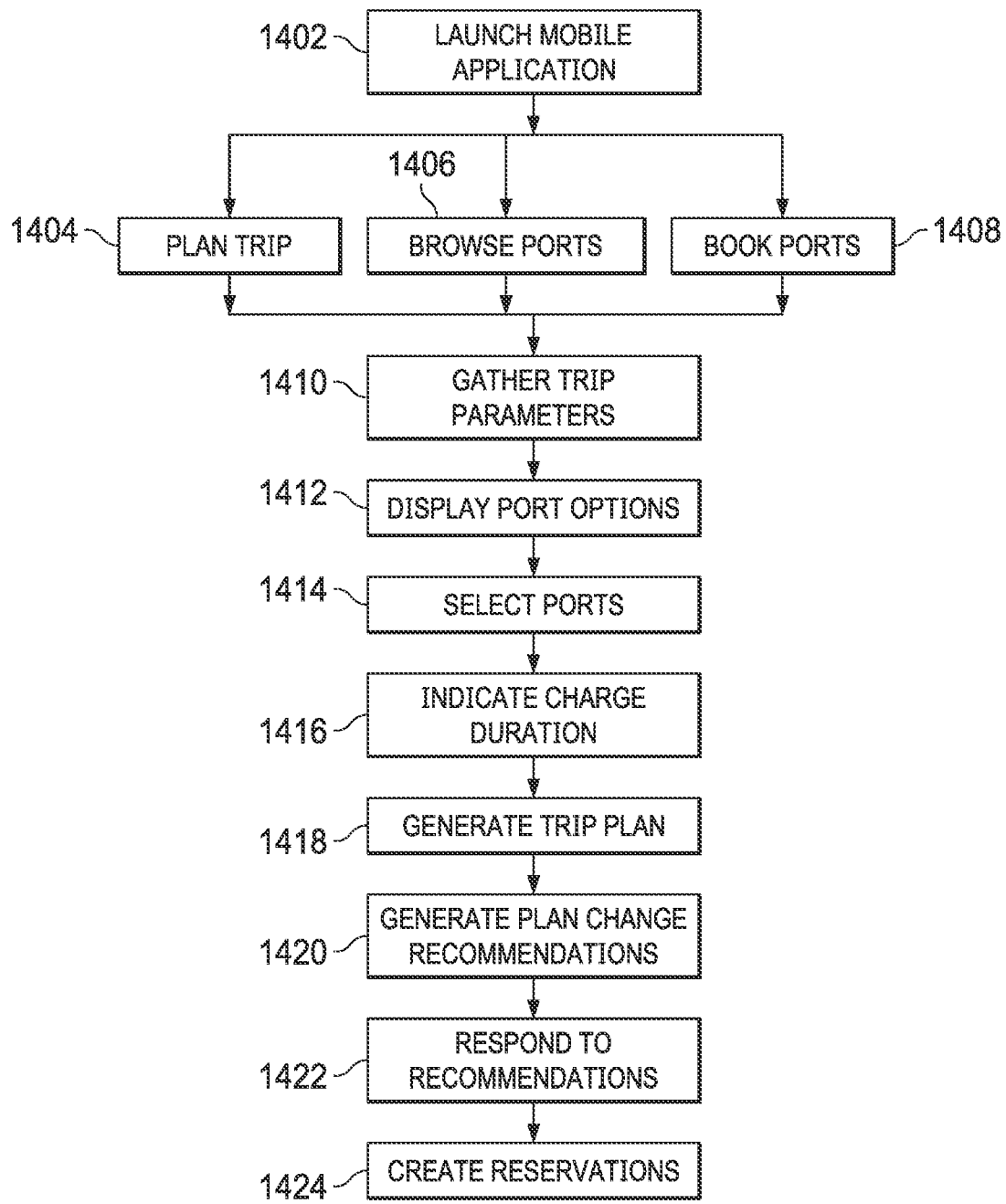
FIG. 14 is a flow diagram illustrating the process for generating a reservation in the medical/mobility device charging management system.

Referring now to FIG. 14, there is illustrated a flow diagram of the process for generating a reservation transaction. The system concept may be applied to a wide variety of rechargeable devices, and the utilization of the features of the system are very diverse. In the example of a personal mobility device user, one such feature of the system which is accessible via the mobile application 1016 is to plan a trip that encompasses various trip stops for charging the personal mobility device during the course of the journey and to coincide those charging periods with a specific stationary activity such as dining, drinking, reading or viewing a movie. During these times a personal mobility device is connected to a charging port and is being charged during the user's activity. A user launches at step 1402 the mobile applications 1016 on a smart phone or other communications devices such as electronic tablets and reviews several action options available for execution such as plan trip 1404, browse charging units 1406 or book charging units 1408. The user selects, in one example, browse charging units at step 1406 and asks for destination and area coverage at step 1410 to gather various trip parameters enabling them to make a charger selection. The coverage area may be viewed in miles, yards or even metric dimensions. The user application 1016 displays at step 1412 the various locations that include charging units. The user browses the available destination points that they intend to visit during their trip to make sure that charging units 1014 are available during their trip.

Once satisfied with the availability of charging units 1014 at the specified trip stops, particular charging units 1014 are selected at step 1414 for the trip. The application 1016 asks for the expected duration spent at each charging unit at step 1416 and upon user confirmation, a trip plan is generated at step 1418 that lists the recommended sequence of trip stops and the times allocated at each stop. The user can also generate trip plan change request/recommendations at step 1420 to charging units 1014 that have not been made a part of the generated trip plan. Based upon considerations of the stop length times and expected lapse times and battery drain, the system will specify the trip plan at 1418 and provide recommended times for a charging appointment. The user can confirm the recommendation at step 1422, or alternatively, generate plan change recommendations at step 1420. If a user's changes are inconsistent with the user's personal mobility device characteristics and planned usage of the trip, the system will prompt the user for alternative selections and/or propose alternative charging unit bookings. Upon acceptance of the recommendations at step 1420, the reservations may be generated at step 1424.

Upon confirmation of a trip plan, the system will make the necessary charging unit 1014 reservations at step 1424 and interface with the appropriate charging units to perform the necessary booking protocols such that the charging unit 1014 is reserved for a particular user. At all times the power output of charging unit 1014 is turned off and not available to unauthorized users and/or devices until appropriately validated. Alternatively, using the trip planning functionalities 1202 of the application 1016, the user can simply plan a trip by selecting planned trip on the opening screen of his smart phone and the system in conjunction with AIS 1113 will check the availability of charging units 1014 at various destination points and generate a trip plan with trip stop sequences automatically.

Figure 15:
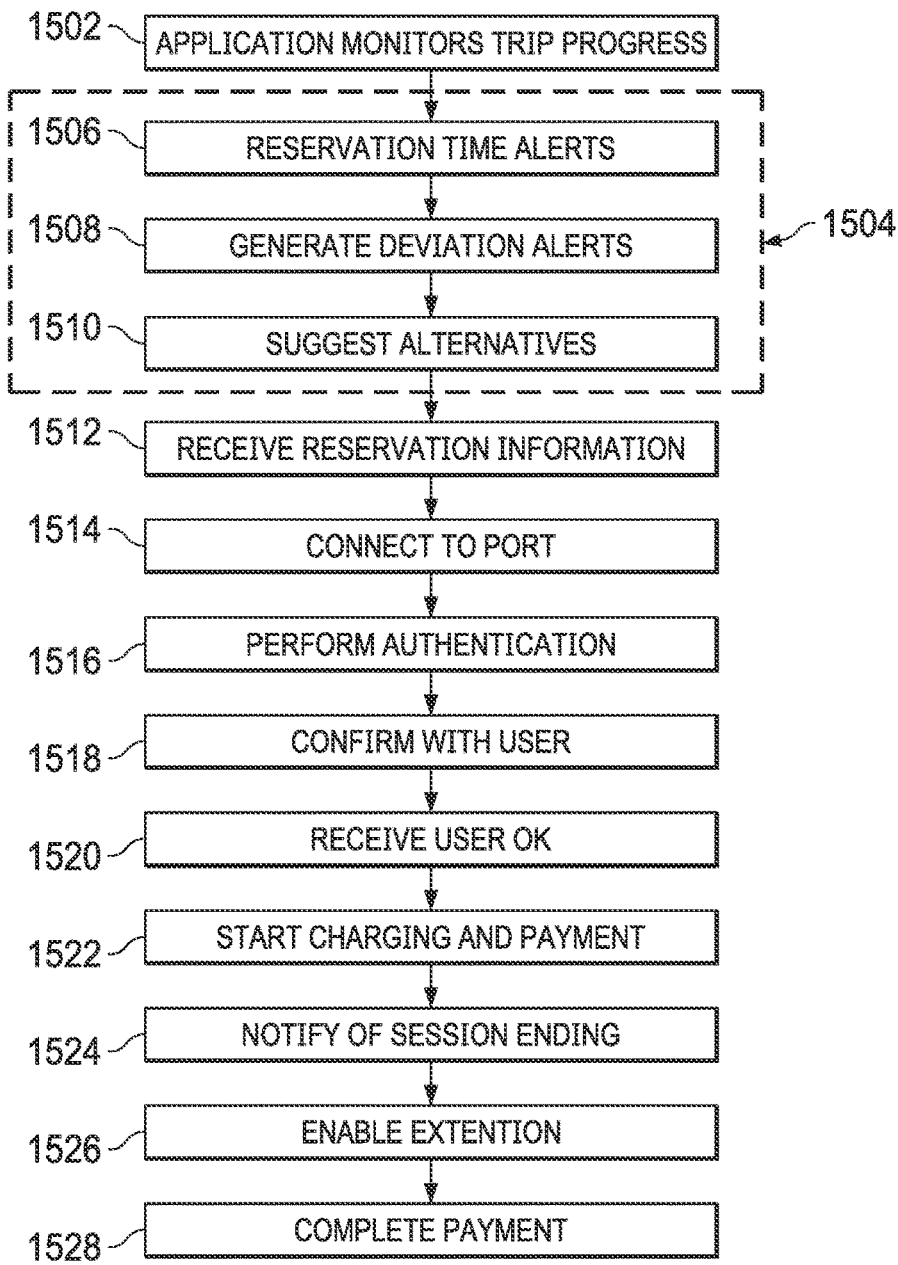
FIG. 15 illustrates an individual user using the medical/mobility device charging management system during a particular trip.

Referring now to FIG. 15, there is illustrated the process of using various reservations for device recharging during an actual trip. The user begins his journey and the mobile application 1016 will monitor the trip progress at step 1502. Based upon the trip progress monitoring, a number of different alerts or suggestions as shown generally at step 1504 may be generated and displayed to the user through his mobile application 1016. The user may be prompted along the way with reservation time alerts 1506 as scheduled charging unit 1014 reservation times approach. Alternatively, if the monitoring determines that the user has deviated from his trip plan schedule and appears to endanger his battery consumption plan, the system will generate a deviation alert at 1508 and prompt for a corrective action or propose a change in the trip sequence at step 1510 so as to enable an alternative charging units 1014 booking. However, such changes may result in booking cancellation penalties which are charged directly to the user's credit card or bank account on file within the system. The user may also engage the AIS to entirely manage the charging sequences based on tracking the user's journey.

When a user stops at an appointed time at an appointed charging unit location, the user will present his reservation information at step 1512 to the charging unit and is directed to a charging unit 1014 where the user can connect his personal mobility device, personal medical device or other rechargeable electric/electronic devices. Alternatively the charging unit 1014 may also provide indication of its location by optical means such as flashing colored lights which also indicates the charger's state of operation. The charging unit 1014 may also broadcast its location using beacon technologies that the mobile application 1016 may home in to or lock onto to provide direction guidance. Assuming that the vendor is a restaurant, the charging unit 1014 will likely comprise a reserved table. The personal mobility devices or electric wheelchair can simply wheel up to the table and charge while dining. Alternatively, if the personal mobility devices and electric scooter cannot be used at a dining table, the vendor may provide a designated parking area that is equipped with a charging unit 1014, and the user is then provided with a temporary wheelchair which can be used at the table. All such information concerning the vendor charging environment is available to the user through his mobile application 1016.

The user connects his device to the charging unit at step 1514. As soon as the device is plugged into the charging unit 1014, an authentication sequence will be initiated at step 1516. The progress of the authentication sequence is displayed on the user's mobile application 1016 and may comprise verifying the personal mobility device identification (e.g. registered serial number), verifying the make, model and power specification of the personal mobility device (which requires a user's affirmative action to ensure that the personal mobility device has not been modified from its original manufacturing state), the user's credit card, bank account or other payment source is validated, and the time of the connection is recorded. Alternatively, if the user had purchased usage credits in advance then such credits may be utilized as payment. The user authorizes commencement of the charging at step 1518 and this confirmation is received by the charging unit 1014 at step 1520. The system provides for different categories of users and does not require that the user have a smart phone and mobile application 1012. Each vendor having a charging unit is equipped or enabled to act as a proxy for authorization whereupon the visiting user may perform the authorization via the vendor's point-of-sale device. Such an option is a necessity in the case of a disabled user that cannot operate a smart phone, or tablet or does not have either one. Alternatively the system may use biometric validation methodologies.

The charging process is initiated and payment made at step 1522. Once the scheduled charging unit session is nearing termination, the user and vendor are alerted at step 1524. The user may be given an opportunity to extend the charging session at step 1526 provided that no other bookings for the charging unit 1014 have been scheduled. In the event that the specific charging unit 1014 has been pre-scheduled by another user, the system may offer the current user a different charging unit that is available on premise. The system or vendor also has the ability to re-assign a different charging unit 1014 to the next scheduled user whereby the current user of a charging unit may extend his charging time or use of the vendor's facilities for perhaps an additional fee. Once the session is terminated, the system will complete the payment protocols at step 1528, and the user's preselected form of payment is charged and credited to the serving vendor's account. The system provides a variety of financial payment operations as commonly practiced in e-commerce such as scheduled billing and payment, record keeping and periodic statement reporting, etc. It is up to the system operator and vendor to determine the frequency and method of payment from the system operator to the vendor.

Figure 16:
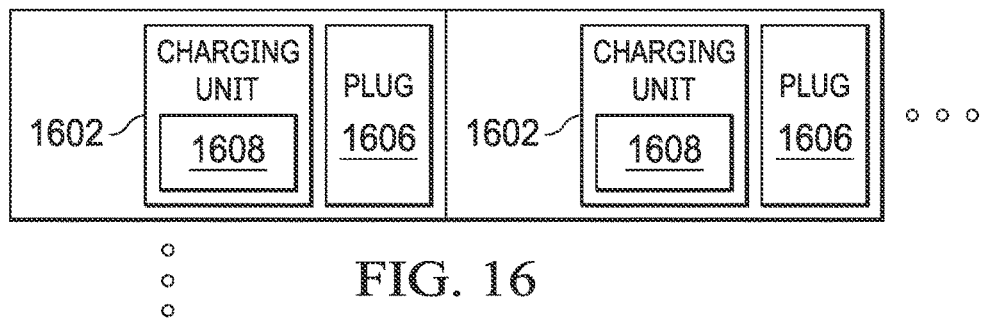
FIG. 16 illustrates a further configuration of the charging units included within a group of one or more lockers.

Referring now to FIG. 16, there is illustrated a further configuration of the charging units, wherein a plurality of charging units 1602 are included within a group of one or more lockers 1604. Each locker 1604 includes at least one charging unit 1602 such as that discussed herein above and a plug 1606 for connecting any type of electric device that needs charging. Users can access the locker by several means, by using a digital or biometric key or by paying an indicated fee. In the case of a digital key the user enters a code received through a mobile application or by paying an indicated fee through the application. Alternatively, the user may gain access by biometric verification of his identity compared with a pre-stored biometric file in the system. Upon validation of the user's identity the user is then able to have access to the charging unit 1602 and plug 1606. The user can then connect his device for charging and lock the device in the locker while it is charging to maintain the device in a secure location while the user perform other activities. The communications interface 1608 associated with the charging unit 1602 can contact the user through the user's mobile application to broadcast a charging state (charging, quarter charge, half charge, three-quarter charge, complete charge, etc.) of the electric device being charged. The lockers 1604 could additionally be used in a kiosk or other convenient grouping of the charging units.

The preceding discussion depicts one example of a charging management and reservation system wherein a personal mobility device, personal medical device or other electric device is charged with a device specific cable that presumably delivers the appropriate DC voltage and amperage to the device while the charging unit 1014 performs the charge monitoring and management. Different devices may have different battery charging protocols, different connectors and characteristics and may either have an onboard charger which can be directly connected to the 120 V AC outlet or require an offboard (not part of the device) charger that provides the appropriate DC charge voltage and amperage and connectors. All these characteristics of specific devices are matched to the specific vendor's equipment repertoire.

The architecture of the management and reservation system 1010 is designed to be an "open" system which enables the incorporation of third-party apps and system components such as third-party cloud platforms, group meeting and group gifting apps. Additionally, the system functionality is an open system that can provide the same reservation and charging functionality for other rechargeable devices such as Ebikes, two wheeled balance scooters or Segway devices, smart phones and tablets and portable respiratory devices dependent on the particular vendor. A vendor could simply be an individual that owns a charger for a specific rechargeable device that may be obsolete or hard to come by and in such situations the individual vendor may find an opportunity to rent out his charger rather than transacting a one-time sale. The user could also be traveling and has forgotten to carry his charging equipment for his device in which case the ability to rent such a charger via the system could be a lifesaver.

The system also incorporates the capability to register vendors on the spot via the mobile application 1016 as in the case when a user finds a willing establishment that is not yet part of the system but which is willing to allow the user to utilize the establishment's 120 V AC or alternative power outlet. In providing this vendor registration capability via the mobile application 1016, the system is able to propagate utility organically via its membership database.

Figure 17:
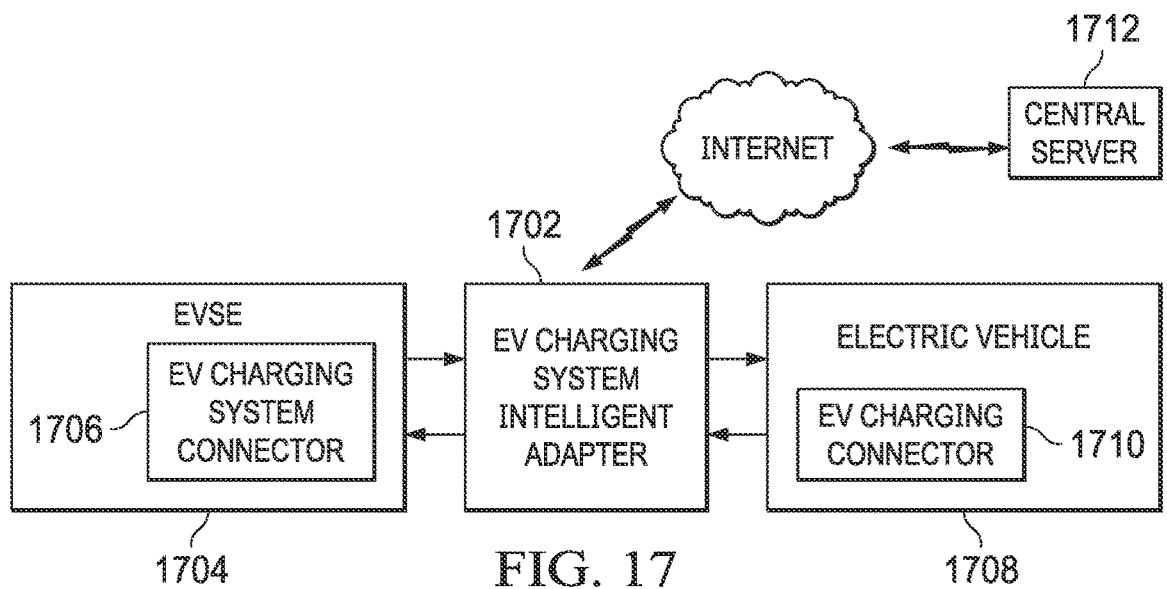
FIG. 17 illustrates a block diagram of an intelligent charging adapter for use with a dumb charging system.

Referring now to FIG. 17, there is illustrated a further embodiment wherein an intelligent adapter 1702 for an electric vehicle charger (more commonly referred to as electric vehicle supply equipment (EVSE)) 1704 may be used for converting said dumb EVSE 1704 that has no network connectivity, into an intelligent EVSE with remote communications connectivity and control. The EVSE 1704 such as that described herein above includes an EVSE connector 1706 that is used for interconnecting with an electric vehicle 1708. In its normal configuration, the EVSE connector 1706 connects directly with the electric vehicle charging connector 1710 to initiate charging of the electric vehicle 1708. As electrical vehicles become more popular, access to charging stations becomes more critical for widespread adoption of electric vehicles. The high cost of installing and equipping electric vehicle charging stations (EV stations) with one or more EV chargers/EVSE hinders the construction and deployment of EV charging stations. In addition, most EV charging stations are unmanned and thus the availability of the stations' EVSEs is unknown until electric vehicle drivers arrive at a particular location to use the chargers. Thus when they arrive, the driver may find the equipment is already in use or currently inoperative.

This limitation may be overcome as shown in FIG. 17 by use of an intelligent EVSE adapter 1702. The adapter 1702 provides for remote communications connectivity and control to provide better control and information with respect to the EVSE 1704. The EVSE intelligent adapter 1702 converts the standalone EV charger/EVSE 1704 at any unmanned EV station into an intelligent charger whereby the availability of such chargers may be monitored and reserved remotely and controlled for dispensing electricity using for example the systems described herein above. A single intelligent EVSE adapter 1702 is required for each charger 1704 at the EV charging station. The adapter 1702 is designed to interface directly with the EVSE's connector 1706 such that the adapter 1702 merely plugs into the connector 1706 of the EVSE/charger 1704. The intelligent adapter 1702 then plugs into the electric vehicle charging connector 1710 in the same manner that the EVSE/charger connector 1706 would. The adapter 1702 then provides remote communications connectivity and control as will be more fully described herein below. This makes the conversion process simple and inexpensive.

There is estimated over 20,000 unmanned publicly accessible EV chargers/EVSEs within the US that are neither remotely controlled nor available for remote reservation. In addition there are hundreds of thousands more EV chargers that are installed in private homes by electric vehicle owners. By equipping such standalone EV chargers 1704 with an intelligent adapter 1702, electric vehicle drivers may conveniently search for adapter equipped chargers that are available and even reserve the chargers without being inconvenienced by traveling to an unmanned EV station to only find out that the chargers are not available for use.

The EV charger/EVSE intelligent adapter 1702 encompasses various technologies such as the Internet, cloud computing, wireless communications, remote control techniques, in-line, near-field and transponder communications, power transmission protocols, delivery and measurement, database techniques and technologies, smart electricity grid techniques, alternate power conveyance grids, direct and wireless power conveyance/delivery/transference, location determination technologies such as GPS, and Internet Of Things ("IOT") protocols and methods to enable and empower EV chargers with intelligence for remote control and use.

The intelligent EVSE adapter 1702 is an electrical and mechanical apparatus that is attachable to the charging connector 1706 of an EV charger 1704 that complies with the International Electro technical Commission (IEC) standards and other relevant standards governing EV conductive charging systems with general characteristics including charging modes and connection configurations, and requirements for specific implementations (including safety requirements) of both electrical vehicle 1708 and electric vehicle supply equipment (EVSE) in a charging system, such as the control of power supplied to the electrical vehicle 1708 and the signaling between the electrical vehicle 1708 and the EV charger 1704. Such standards may also cover devices such as plugs, socket-outlets, vehicle couplers and vehicle inlets. In one embodiment the EV charger/EVSE connector 1706 may comprise a SAE J1772 Level 1/2 connector as used in North America. However, the functionality and principles of the system extend to all other standard conforming connectors such as the VDE-AR-E-2623-2-2 which is used in Europe, the JEVS G105-1993 (commonly known as CHAdeMO) which is used in Japan and any other configuration for a charging connector.

Further, the use of the adapter 1702 is not constrained to Level 1, 2 or 3 chargers with their different voltages and current limits. Essentially, just as the J1772 connector is equipped with five pins of which two are the AC wires, one is the ground, and two are signal pins for proximity detection and for the control pilot function. Other connector types also have at least one pin that is used as a control communications link and one or more pins as power pins for DC or AC power.

Figure 18:
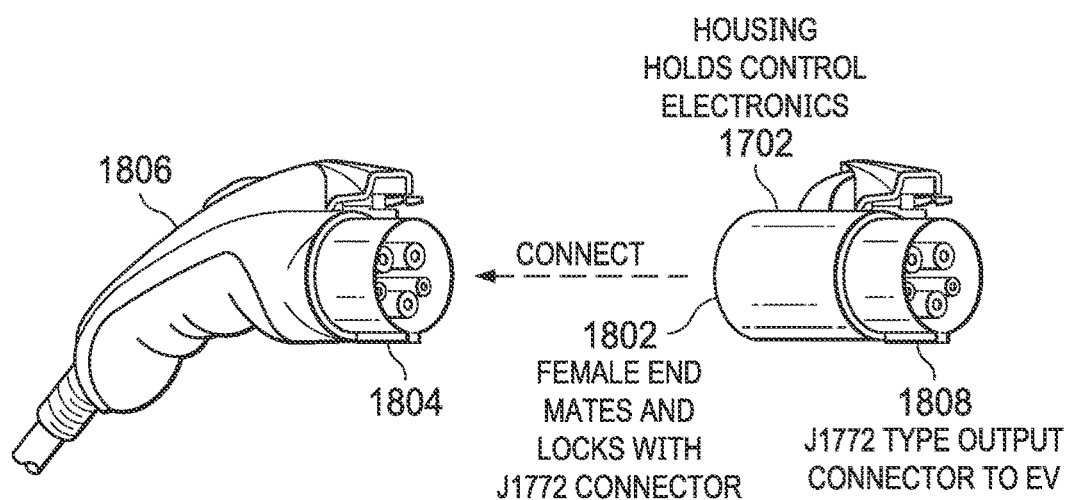
FIG. 18 illustrates a charging adapter that mates with a charge connector of a charging system.
Figure 19:
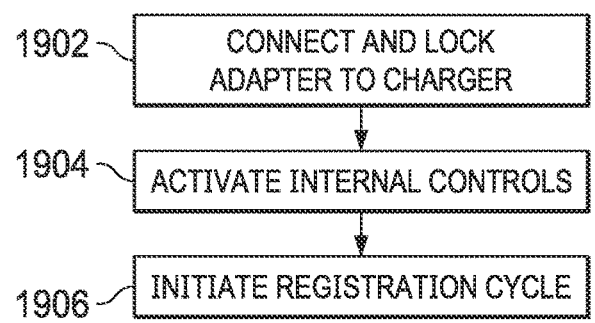
FIG. 19 illustrates a flow diagram of the process occurring when a charging adapter is connected with the charging system.

Referring to FIG. 18, the EV charger/EVSE intelligent adapter 1702 contains control electronics that manage the functions of the adapter. The adapter's 1702 corresponding female inputs 1802 mate and lock with the male connector pins 1804 in the J1772 connector 1806 coming from the EV charger 1704. The adapter 1702 provides a new J11772 type connector 1808 to act as a connector with an electric vehicle connector 1710. Referring now also to FIG. 19 there is illustrated the process for connection of an adapter 1702 to an EV charger/EVSE connector 1706. Upon mating and locking of the adapter 1702 with the charger's J1772 connector 1806 at step 1902, the adapter's internal controls are activated at step 1904 and initiate a registration cycle at step 1906 whereby the adapter 1702 is wirelessly connected to a central server 1712 under management of the charger service administrator. The registration process essentially tells the central server 1712 that the EV charger 1704 to which the adapter 1702 is connected is now available for rent.

Figure 20:
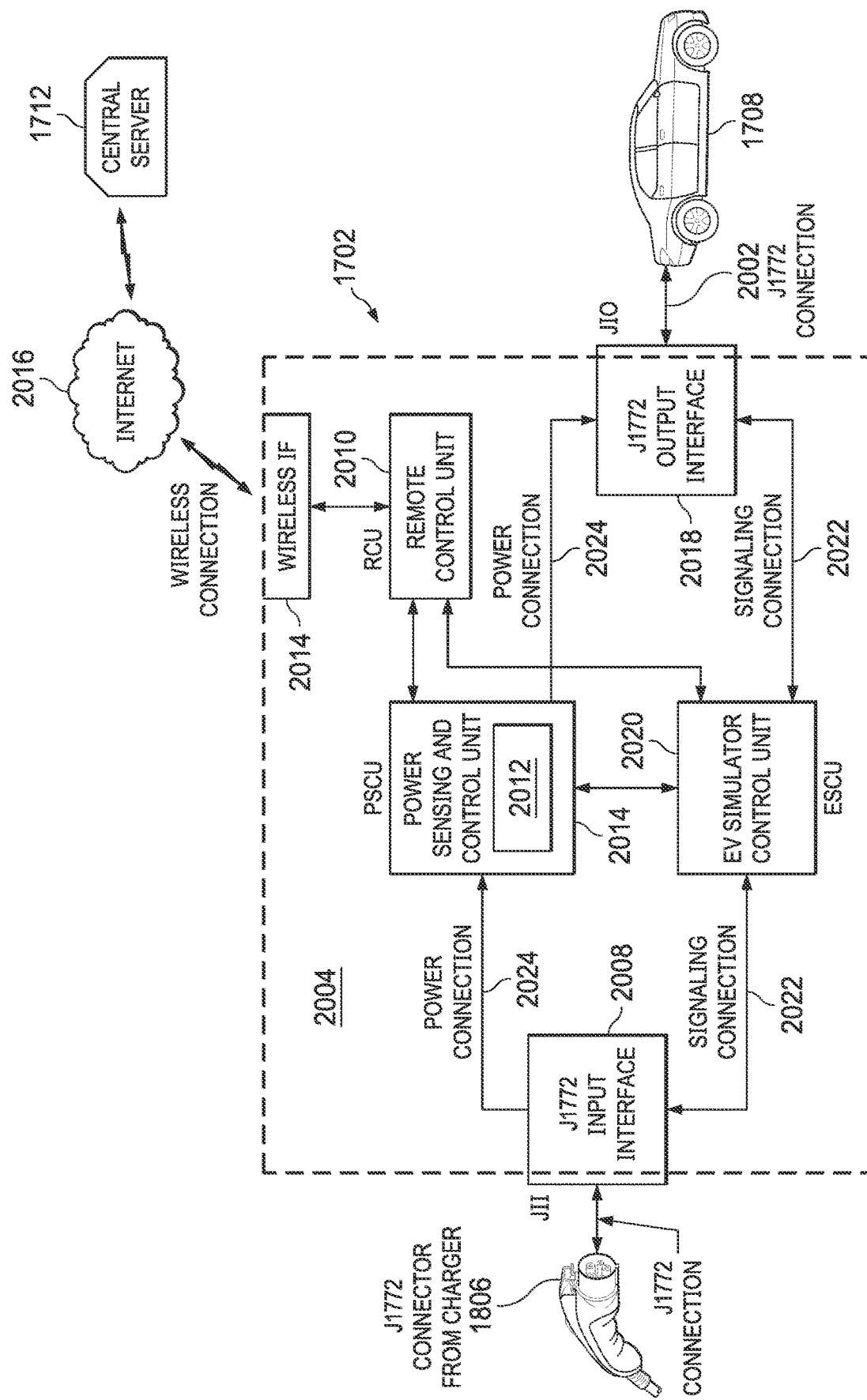
FIG. 20 illustrates a functional block diagram of the intelligent charging adapter.

Referring to FIG. 20 there is illustrated a functional block diagram of the adapter 1702 for interconnecting a J1772 connector 1806 with an electric vehicle 1708 via another J1772 connector 2002. The adapter components are located within an adapter housing 2004. The J1772 connector 1806 on the input side of the adapter 1702 is connected to a functioning EV charger 1704, which in turn is connected to an electrical power supply. The input interface 2008 provides a means for connecting the adapter 1702 with the EV charger connector 1806 and includes female inputs for interconnecting with the male input pins of the charger connector 1806. Once the adapter 1702 mates with the EV charger 1704 through its J1772 connector 1806 to the adapter's J1772 input interface 2008, the remote control unit (RCU) 2010 detects the connection to the charger and activates the adapter using power from an internal removable, rechargeable battery 2012 within the power sensing control unit (PSCU) 2014. The RCU 2010 then commences communications with the central server 1712 using a wireless interface 2014. The wireless interface 2014 provides for a connection to the central server 1712 using a cellular data network, Wi-Fi network or any other type of wireless communications protocol. The RCU 2010 controls operation of the adapter 1702, manages control of the adapter responsive to commands from the central server 1712 and controls charging signals passing through the adapter 1702.

The central server 1712 manages all the adapters 1702 in the field and also the mobile apps within user's mobile devices for reserving an adapter-equipped charger (an "i-Charger"). The RCU 2010 contains a communications module that set ups a communications link with a local Wi-Fi router or other wireless communications network to access the Internet cloud 2018 and thereon to connect with the central server 1712 using the wireless interface 2014. The connection with the cloud 2018 may be provided by several means including inline powerline communications or wireless router to a modem connected to an Internet provider, or by satellite data connection, or through a cellular data link. Thus, even a remote EV charger 1704 can be communicated with by the central server 1712.

Figure 21:
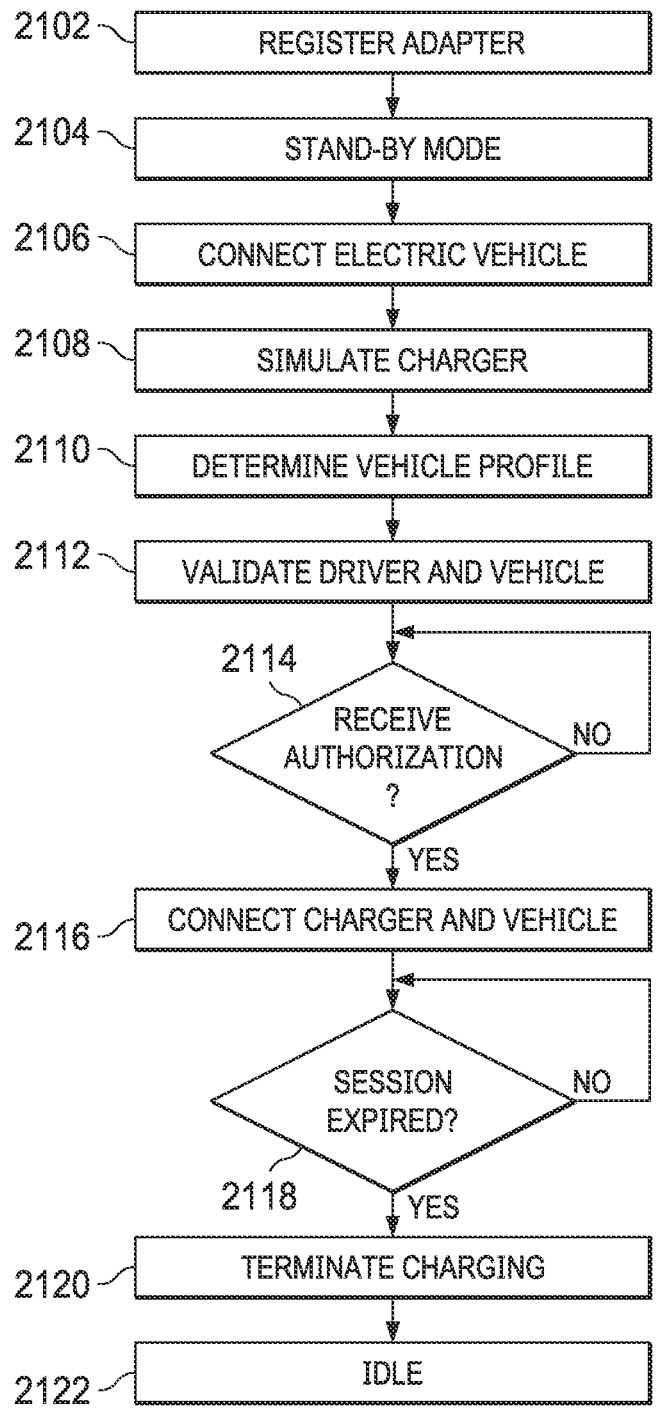
FIG. 21 illustrates a flow diagram of the manner in which the intelligent charging adapter controls a charging process between a charger and an electric vehicle.

Referring now also to FIG. 21, there is illustrated a flow chart more fully describing the operation of the adapter 1702 when connected to a charger 1704. Once communications are established with central server 1712, the RCU 2010 registers the presence and availability of the adapter 1702 in the registry of adapters maintained at the central server 1712 at step 2102. The RCU 2010 next switches the adapter 1702 into standby mode at step 2104 to await the arrival of an electrical vehicle 1708 to connect with the J1772 output interface (JIO) 2018. In this idle state, the adapter 1702 draws its electricity from the internal rechargeable battery 2012 in the PSCU 2014.

When an electric vehicle 1708 arrives at an i-Charger station (an adapter-equipped charger station) for a reservation, the driver of the vehicle will launch a mobile app associated with the charger reservation service such as that described above and obtain validation for a charging session which may have been reserved in advance. The driver next connects the electric vehicle 1708 at step 2106 to the adapter 1702 via the HO connector 2018, which triggers the RCU 2010 to simulate appearing as a charger to the electric vehicle at step 2108 in order to determine at step 2110 the electric vehicle profile such as make of vehicle and the vehicle's battery properties. The RCU 2010 then communicates with central server 1712 to validate the driver and electric vehicle at step 2112. Upon receiving authorization for a valid charge at step 2114, the RCU 2010 instructs the EV simulator control unit (ESCU) 2020 to connect the signal line 2022 between the charger 1704 and the electric vehicle 1708 at step 2116. The EV simulator control unit 2020 controls the connection and communications between the charger 1704 and the electric vehicle 1708. While the adapter 1702 is in the idle state this signal line 2022 is open so that the charger 1704 cannot communicate prematurely with the electric vehicle 1708 and enable the adapter 1702 to complete its pre-charge session protocols with the central server 1712 such as to validate and record the charging session, etc. This signal line 2022 is the only switchable line within the adapter 1702 as it is the means of communicating with the EV charger 1704 for controlling the activation or termination of power from the EV charger 1704.

Once the session is authorized the ESCU 2020 acts as a transponder and enables communications between the EV charger 1704 and the electric vehicle 1708 via the signal line 2022. The EV charger 1704 performs its normal charging sequence and detects the type of electric vehicle 1708 and battery to charge and performs a normal charging routine to charge the authorized connected electric vehicle 1708. During electric vehicle 1708 charging, the PSCU 2014 will tap power from the charge lines 2024 by inductance, capacitance or other means to recharge the rechargeable battery 2012 of the adapter 1702 which powers the adapter electronics. The PSCU 2014 does not switch the power lines to the EV itself due to the high voltages and current that is typical and which would require bulky relays. While this embodiment describes inductance charging and use of a rechargeable battery 2012 to power the adapter electronics, other means of powering the adapter electronics may be used. In addition, an interface may be incorporated in the housing 2004 for the use of an external power source to charge the internal battery 2012 of the adapter 1702. The PSCU 2014 manages and distributes the appropriate control power to all the electronics elements in the adapter 1702. Also, while this illustration cites the use of the signal line 2022 for communications between the EV charger 1704 and the electric vehicle 1708, other charging devices and standards may evolve and embody other means of communications between the electric vehicle 1708 and the charger 1704 but the underlying principle of the adapter 1702 acting as an intermediary control mechanism still applies.

During the electric vehicle 1708 charging session the RCU 2010 monitors the connection at step 2118 via the signal line 2022 until its program or the central server 1712 determines that the reservation period has expired and that the charging is to terminate at step 2120. Alternatively, the EV 1708 may have attained the desired charge status or is fully charged. At this point the ESCU 2020 is instructed to break the signal line connection between the electric vehicle 1708 and the EV charger 1704 and take control of the charger's signal line instead. Herein, the ESCU 2020 simulates as the electric vehicle 1708 and instructs the charger 1704 to cut off the charging power to the electric vehicle and the adapter 1702 reverts to its idle position at step 2122 to await the next charging transaction. Besides controlling the connection or disconnection of the signal line 2022 between the EV charger 1704 and the electric vehicle 1708, the ESCU 2020 also performs the EV charging termination sequence according to the charger it is connected to.

Thus, the adapter 1702 serves to turn an ordinary "dumb" standalone EV charger 1704 into an intelligent charger that can broadcast its availability status and also control the charging session of an electric vehicle 1708. The illustration provided above for a J1772 provisioned EV charger 1704 is an illustration of the control functions of the adapter 1702 and its application. The sequence of operation of the functional elements of the adapter 1702 may vary depending on the production design of the adapter 1702 and its application, the various standards in force, and the types of chargers used, but the underlying principal functions of the adapter 1702 as an intermediary control mechanism still apply. The adapter 1702 may be produced to be compatible with different physical packaging. Additionally, the electric vehicle 1708 may represent an electric personal mobility device. The system would also be useful in reserving charging stations for charging any other type of electrical device.

The inventions described herein for implementing the adapter encompass various hardware and software technologies such as the Internet, cloud computing, wireless communications, remote control techniques, in-line, near-field and transponder communications, power transmission protocols, delivery and measurement, database techniques and technologies, smart electricity grid techniques, alternate power conveyance grids, direct and wireless power conveyance, power delivery, power transference, location determination technologies such as GPS, and Internet of Things ("IoT") protocols and methods to enable and empower EVs and EV chargers with intelligence for remote control and use.

The adapter described herein and its various embodiments is an electrical and mechanical apparatus that complies with the International Electrotechnical Commission (IEC) standards and other relevant standards governing EV conductive charging systems with general characteristics including charging modes and connection configurations, and requirements for specific implementations (including safety requirements) of both EV and electric vehicle supply equipment (EVSE) in a charging system, such as the control of power supplied to the EV and the signaling between the EV and the EVSE. Such standards may also cover devices such as plugs, socket-outlets, vehicle couplers and vehicle inlets. For ease of discussion the following description relates to the SAE J1772 Level 1 and Level 2 connectors used in North America in illustrating the features of the systems herein, but the functionality and principles of the systems extend to all other standard conforming connectors such as the VDE-AR-E-2623-2-2 which is used in Europe, the JEVS G105-1993 (commonly known as CHAdeMO) which is used in Japan, and other power dispensing devices as will be known to those skilled in the art. Further, the current system is not constrained to Level 1, 2 or 3 chargers with their different voltages and current limits. Essentially, just as the J1772 connector is equipped with 5 pins of which 2 are the AC wires, I is the earth, and 2 are signal pins for proximity detection and for the control pilot function, other connector types also have at least one pin that is used as a control communications link and one or more pins as power pins for DC (SAE J2847/2) or AC (SAE J2847/1) power.

Although electric vehicles (EVs) are becoming more popular, access to public charging stations remains one of the top barriers to EV adoption. The high cost of installing and equipping EV charging stations ("EV Station(s)") with one or more EV chargers, so-called Electrical Vehicle Supply Equipment ("EVSE") or EVSE(s) hinders the construction and deployment of EV Stations. In addition, most, if not all, EV stations are unmanned and not monitored electronically. Thus, the availability of the EVSE(s) at the public stations ("Public EVSE(s)") are unknown until an EV driver arrives to use the Public EVSE(s) at the particular public EV Station and determines whether the particular Public EVSE(s) are in use, or inoperative. There is a need to enhance the use of Public EVSEs by ultimately enabling the monitoring of the state of operability and controlling the use of such EVSEs and thereby allowing EV drivers to select and reserve a specific EVSE at specific times for the charging of their EV. The following would be applicable to EVSEs that are installed on the premises of homes and businesses ("Private EVSE(s)") which are generally intended for exclusive use by their respective families, business associates and employees. The inventions herein enable such Private EVSE(s) to also be reservable and used by the general population of EV drivers, the public.

In another embodiment, as EVs are equipped with large capacity storage batteries, the electrical energy stored in the EVs' batteries could be made available to the Grid via the EVSE that the EV is connected to, or directly to the Grid if the EV is equipped with an embodiment described herein. The related Grid systems would enable anyone to tap into the electrical energy stored in the EVs' batteries for a variety of needs and applications. For example, under the control of the Grid operator such as a utility company (a "Utility"), the Utility could tap into the stored energy in the Grid-connected EV (whether directly or indirectly via an EVSE) and supplement the peak demands of the Grid with power from one or more EVs. Given that most EV charging is conducted with Private EVSEs would suggest that several GWh of electrical power could be extracted from EVs connected to the Grid as enabled by the inventions described herein.

The inventions described herein are an extension of, or expansion on, various provisional and non-provisional patent applications, and specifically of issued U.S. Pat. No. 10,960,782, filed Feb. 19, 2019, entitled METHOD AND DEVICE FOR CONVERTING STANDALONE EV CHARGING STATIONS INTO INTELLIGENT STATIONS WITH REMOTE COMMUNICATIONS CONNECTIVITY AND CONTROL, and the issued U.S. Pat. No. 10,857,902, filed Apr. 3, 2017, entitled AUTOMATED SYSTEM FOR MANAGING AND PROVIDING A NETWORK OF CHARGING STATIONS, each of which are incorporated herein by reference in their entirety. The devices described therein convert standalone Public EVSE(s) and Private EVSE(s) (collectively "Chargers" or "dumb chargers") into intelligent chargers ("i-Charger(s)") whereby the availability of such i-Chargers may be monitored, controlled and reserved remotely and wirelessly for dispensing electricity. More specifically, although the descriptions therein and herein describe that one adapter is required to convert one Charger into an i-Charger and that each adapter is designed to fit directly onto the SAE J1772 output plug of the Charger, in this embodiment, thereby making the process of conversion simple and inexpensive, the functions of the adapter may be manifested in other SAE standard plugs, or devices that operate over multiple EVs, EVSEs, and the Grid simultaneously. The functions of the adapter may also be physically distributed but operate as an integrated system such that parts or all of the functions are embodied in different physical entities but operate as a single system. For example, rather than incorporate the adapter functionality in an adapter that fits directly onto the SAE J1772 output plug of the Charger, such functions may be incorporated in the SAE J1772 output plug itself or embedded into the Charger internally. The functionality of the adapter may also be distributed physically and be wholly contained in a standard NEMA 5, NEMA 14 or other standard socket itself. Similarly, adapters that provide intelligence to the dumb Chargers at the power input side to the Charger may operate over more than one EV, EVSE, and the Grid simultaneously.

It is estimated that there are over 20,000 unmanned Public EVSEs in America many of which are neither remotely controlled nor available for remote reservation. In addition, there are hundreds of thousands more of Private EVSEs that are already installed and exclusively used by the EVSE owners and their families, and the business owner(s) and their associates and employees. By also equipping all Chargers with adapter or ePort devices, the Chargers would be converted into i-Chargers and enable EV drivers to conveniently search for the optimal i-Charger that is available, reserve such i-Charger and not be inconvenienced by travelling to an unmanned Charger only to find that the Charger is not available for use.

An example of functional segmentation is the power dispensing plug itself such as the standard SAE J1772 EVSE plug that is predominantly used in North America which may be provisioned internally with the adapter functionality thereby creating a plug that replaces the standard J1772 plug part that would have been used as a part in the normal production and assembly of the EVSEs. Such EVSEs that are equipped with a modified plug would then be network-ready for reservation and use by EV drivers to charge their EV. The functionality of the adapter may also be segmented and embodied into several sub-components or sub-elements by the use of connectors and cables whereby an EVSE may be made intelligent by exchanging its power dispensing cable with an alternate cable that is terminated with a modified adapter plug that mates with the EV's charging input socket.

Figure 22:
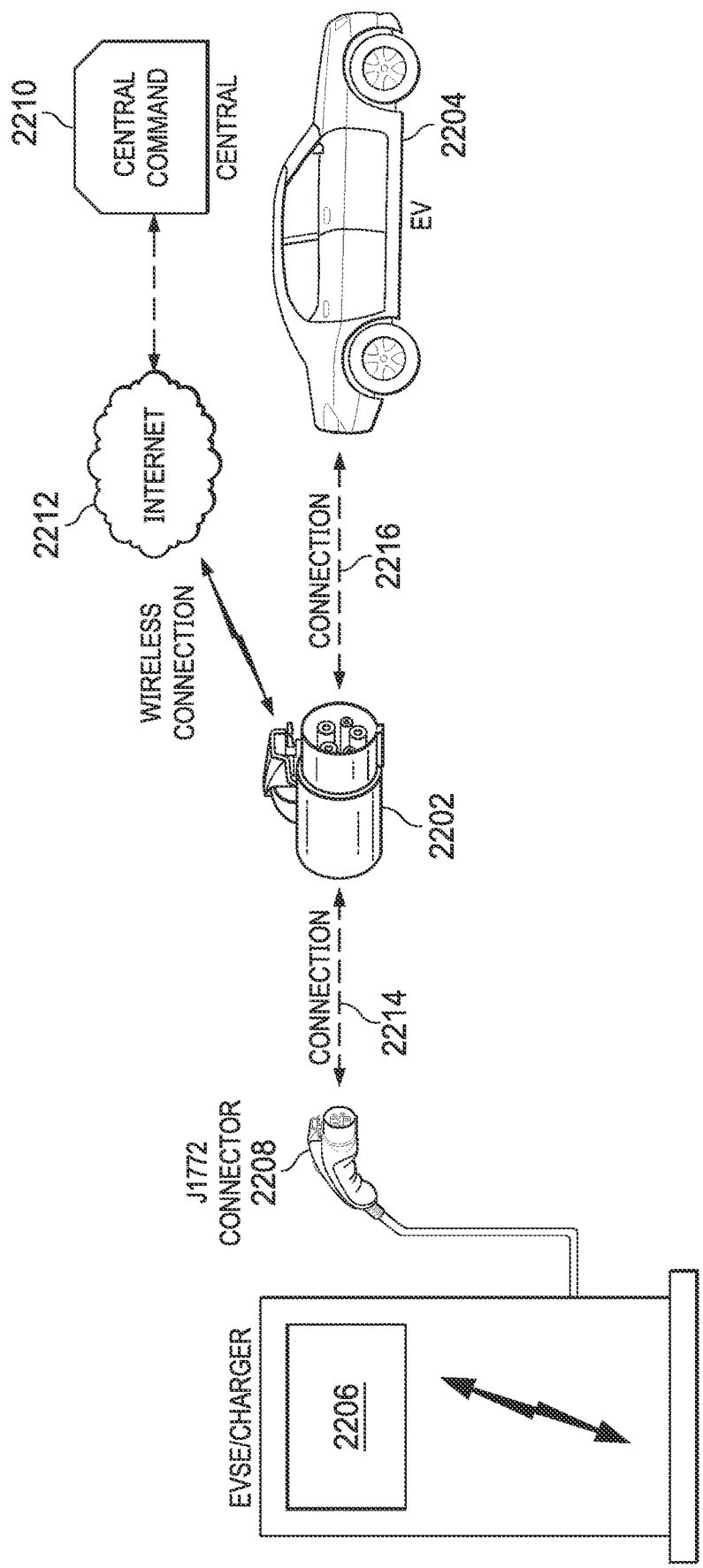
FIG. 22 illustrates an adapter for providing bidirectional charging connection between a charger and an electric vehicle.

Referring to FIG. 22, there is illustrated the manner in which an adapter 2202 interconnects an electric vehicle (EV) 2204 with an electric vehicle charger (EVSE/Charger) 2206. The adapter 2202 as described herein above contains control electronics that manage the functions of the adapter. The adapter's female input pins mates with the corresponding male connector pins in the J1772 connector 2208 coming from the charger 2206. Upon mating and locking with the charger's J1772 connector 2208, the adapter's 2202 internal controls are activated and immediately initiate a registration cycle whereby the adapter is connected to a Central Command server (Central) 2210 under management of the charger service administrator over the Internet 2212. The registration process tells Central server 2210 that the EV charger 2206 to which the adapter 2202 is connected to is now available for rent.

Figure 23:
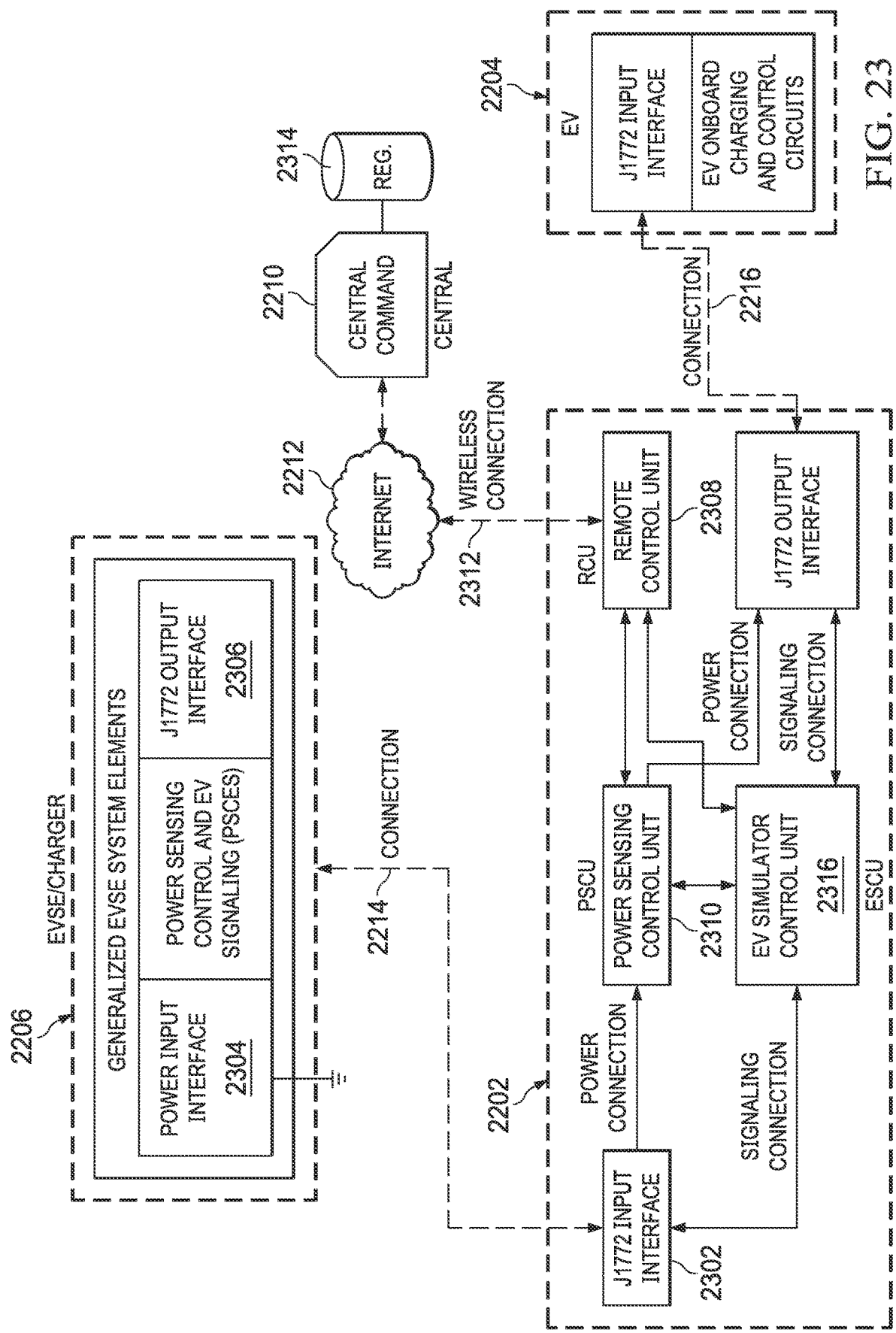
FIG. 23 provides a block diagram of the functional elements of the charging adapter system.
Figure 24:
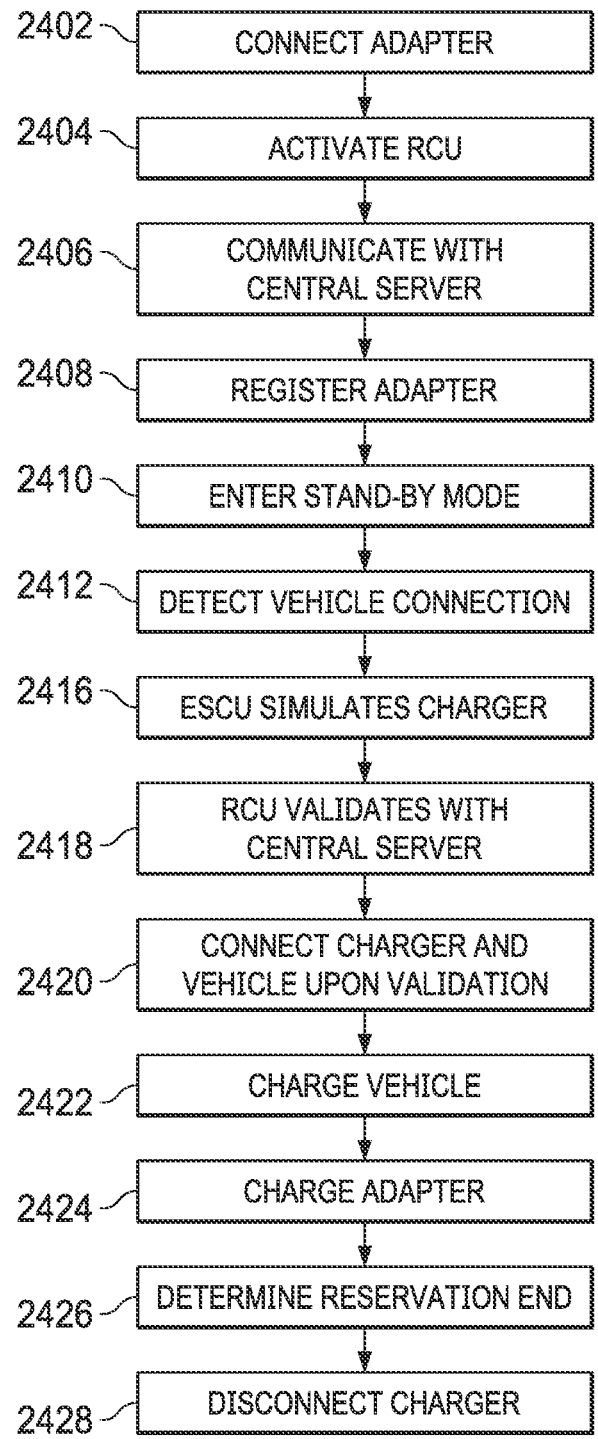
FIG. 24 illustrates a flow diagram of the operation of the charging adapter system of FIG. 23.

Referring now to FIG. 23, there is illustrated a functional block diagram of the components for interconnecting a charger 2206 with an electric vehicle 2204 using an adapter 2202. FIG. 24 is a flow diagram illustrating the connection process associated with the adapter 2202. FIG. 23 shows the functional elements of the equipment and devices that were depicted in FIG. 22. The adapter 2202 is shown functionally connected with the EV Charger 2206 via its J1772 input interface 2302. The charger 2206 is connected to an appropriate electricity source via its power input interface 2304. Upon the adapter 2202 mating with the charger 2206 at step 2402 (see FIG. 24), through the charger's J1772 output interface 2306 connection, the adapter's Remote Control Unit (RCU) 2308 will activate at step 2404, using power from an internal rechargeable battery (not shown) within the Power Sensing Control Unit (PSCU) 2310, and commence communications at step 2406 with Central Command server 2210 (also referred to as "Central"). Central server 2210 manages all the adapters 2202 in the field and also the mobile app on a user's mobile device for reserving an adapter-equipped charger (an "i-Charger"). The RCU 2308 contains a communications module that set ups a communications link 2312 with the premise's WiFi router or uses its internal cellular data communications unit to access the Internet cloud 2212 and thereon to connect with Central server 2210. The connection with the Internet 2212 may be provided by several means including inline powerline communications or wireless router to a modem connected to an Internet provider, or by satellite data connection, or through a cellular data link.

Once communication is established with Central server 2210, the RCU 2308 registers the adapter's 2202 presence and availability in the registry 2314 of adapters maintained at Central server 2210 at step 2408, and switches into standby mode at step 2410 to await the arrival of an electric vehicle (EV) 2204 for a charging session. In this idle state, the adapter 2202 draws its electricity from the internal rechargeable battery (not shown) in the PSCU 2310 or other local power source.

When an EV 2204 arrives at an i-Charger station (adapter-equipped charger station) at the reserved time, the driver of the EV 2204 will launch a mobile app on a mobile device associated with the charger 2206 reservation service and obtain validation for the charging session. Alternately, the adapter 2202 may be equipped to detect the presence of the EV 2204 via use of near-field, GPS, cellular triangulation of the user's mobile phone, etc., which launches the mobile app on the mobile device. The driver connects the EV 2204 to the adapter 2202 which is detected by the adapter at step 2412 which triggers the ESCU 2316 to simulate appearing as a charger to the EV 2204 at step 2416 in order to determine the EV's profile such as make of vehicle and the EV's battery properties. This information can be used to control the charging current applied to the EV's battery. The RCU 2308 communicates with the Central server 2210 to validate the EV driver and EV 2204 at step 2418. Upon receiving authorization for a valid charge, the RCU 2308 instructs the EV Simulator Control Unit (ESCU) 2316 to connect the signal line at step 2420 between the charger 2206 and the EV 2204. While the adapter 2202 is in idle state this signal line is open so that the charger 2206 cannot communicate prematurely with the EV 2204 until the adapter 2202 completes its pre-charge session protocols with the central server 2210 to validate and record the session, etc. This signal line(s) between the charger 2206 and the EV 2204 is the only switchable line(s) within the adapter 2202 as the means of communicating with the EV charger 2206 for controlling the activation or termination of power delivery from the charger. Once the session is authorized, the ESCU 2316 acts as a transponder and enables communications between the EV charger 2206 and the EV 2204 via the signal line(s). The EV charger 2206 then performs its normal charging sequence by detecting the type of EV 2204 and battery to charge and performs its normal charging routine to charge the authorized connected EV at step 2422. During EV 2204 charging, the PSCU 2310 will tap power from the charge lines by inductance or other means to recharge the adapter's 2202 rechargeable battery at step 2424 which powers the adapter electronics when the adapter is on standby. The adapter 2202 may also be equipped with a charging port for connecting to an external power source for charging its internal battery when the EVSE 2206 has been idle for a prolonged time (off-line). Adapter 2202 charging methods may include solar, USB charging port, low-voltage power supply, or other similar means.

The PSCU 2310 does not switch the power lines to the EV 2204 itself as such it does not require bulky internal power switching relays. While this illustration cites inductance charging and use of a rechargeable battery to power the adapter's electronics other means of powering the adapter electronics may be used which are not illustrated here. The PSCU 2310 manages and distributes the appropriate control power to all the electronics elements in the adapter 2202. Also, while this illustration cites the use of the signal line(s) for communications between the EV charger 2206 and the EV 2204, other charging devices and standards may evolve and embody other means of communications between the EV and the charger but the underlying principle of the adapter 2202 acting as an intermediary control mechanism still applies.

During the EV 2204 charging session, the RCU 2308 monitors the connection in the sidelines via the signal line until its program or the Central server 2210 determines that the reservation period has expired and that the charging is to terminate at step 2426. Alternatively, the EV charger 2206 and/or the EV 2204 may terminate the flow of electricity when the EV 2204 has reached the appropriate charge state. At this point, the ESCU 2316 is instructed to break the signaling connection between the EV 2204 and the EV charger 2206 and to take control of the charger's signal line(s) instead. The ESCU 2316 simulates as the EV 2204 and instructs the charger 2206 to cut off the charging power to the EV and the adapter 2202 then reverts to its idle state to await the next charging transaction at step 2428. Besides controlling the connection or disconnection of the signal line(s) between the EV charger 2206 and the EV 2204, the ESCU 2316 may also perform other charging task protocols such as compiling and transmitting session statistics to the Central server 2210, communicating with the EV driver's mobile phone app, or managing the EV charging termination sequence according to the charger and EV that is in session.

Thus, the adapter 2202 serves to turn an ordinary dumb Charger/EVSE into an intelligent i-Charger that can broadcast its availability status and also control the charging session of an EV 2204. The sequence of operation of the functional elements of the adapter 2202 may vary depending on the production design of the adapter and its application, the various standards in force, and the types of chargers used but the underlying principal functions of the adapter as an intermediary control mechanism still applies. The adapter functionality itself may be configured to be compatible with different physical packaging and embodiments as further described below.

Figure 25:
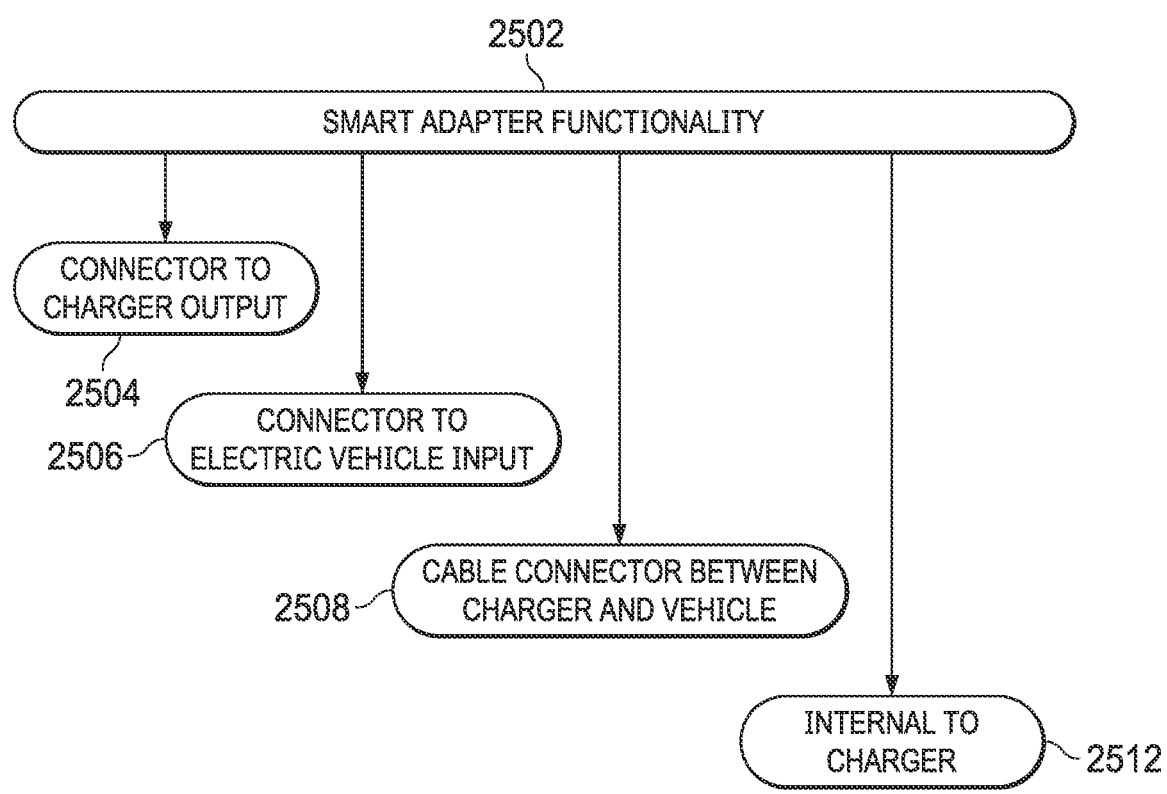
FIG. 25 illustrates the various configurations of the smart adapter functionality.

It is noted that in order to incorporate the functionality of the adapter 2202 that certain of its hardware and firmware elements may be distributed and packaged in one or more physical packages as more fully described herein below. Referring now to FIG. 25, there is illustrated the manner in which the smart adapter functionalities 2502 can be implemented in a number of different configurations that do not necessarily encompass the adapter embodiment described herein above. These additional configurations include a connector to the EV charger output 2504, a connector to the EV input connector 2506, a cable connector 2508 between the charger and the EV and the incorporation of all of the adapter functionalities into the EV charger circuitry 2512. These various configurations would provide the same overall charging system described above but in different implementations. The connector to the EV charger output 2504 would comprise the above described adapter embodiment. The connector to the EV input connector 2506 would comprise a smart adapter configuration similar to that described above but would initiate response to connection to a charge connector of an electric vehicle rather than to connection to the charger connector. The EV charger circuitry incorporating the adapter functionalities 2512 would operate in the same manner a dumb charger having the adapter connected would operate. These various embodiments will be more fully discussed herein below with respect to FIGS. 26-35.

Figure 26:
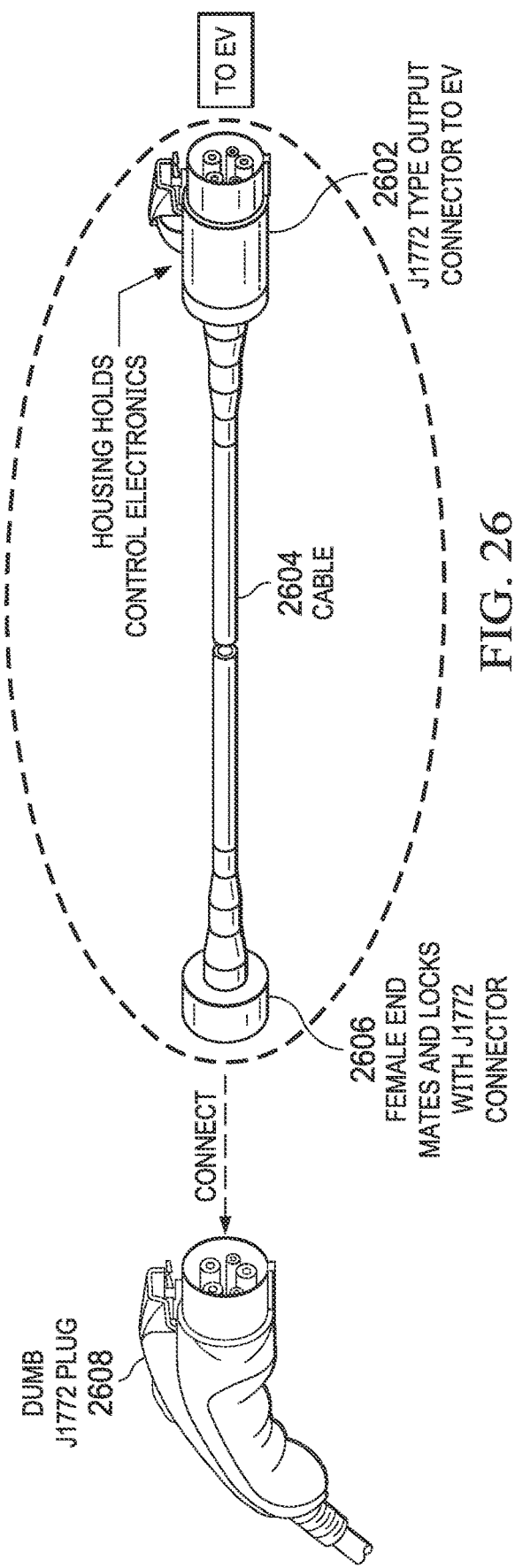
FIG. 26 illustrates a first cable embodiment of the adapter functionality.

In one embodiment as depicted in FIG. 26, there is illustrated the adapter functionalities implemented in a cable with the control circuitry implemented in the electric vehicle end of the cable. The control elements may itself be incorporated into a standard J1772 type plug 2602 which is connected to a cable 2604 that is provisioned with a J1772 female socket 2606 that mates with the EVSE's dumb J1772 connector 2608 itself via a power dispensing cable.

Figure 27:
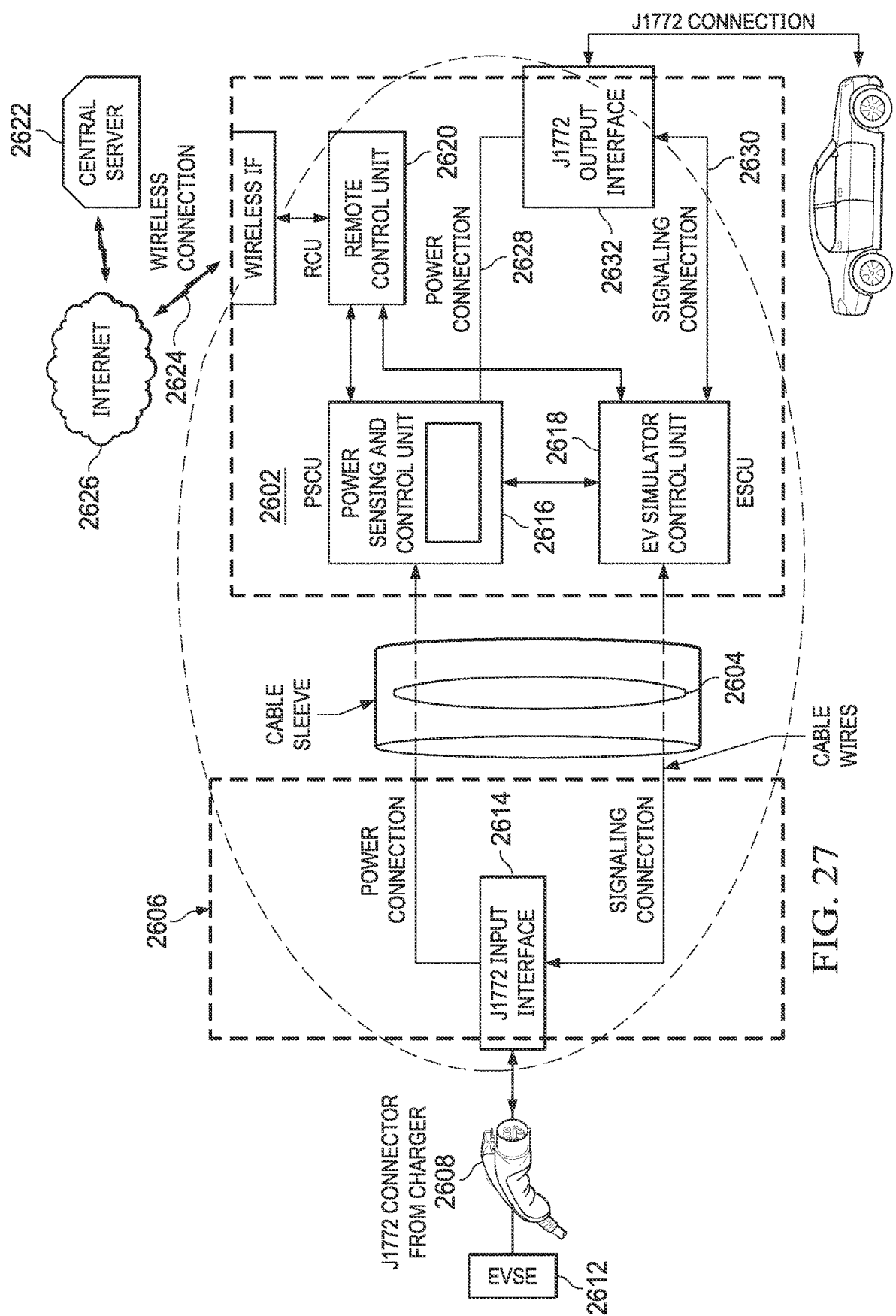
FIG. 27 illustrates a functional block diagram of the embodiment of FIG. 26.

Referring now to FIG. 27, there is illustrated a functional block diagram of the embodiment of FIG. 26. The J1772 connector 2608 of the EVSE connects with a J1772 interface 2614 within the J1772 female socket 2606. The J1772 interface 2614 provides connections to a power sensing and control unit (PSCU) 2616 over power connection 2628 through cable 2604 and to a EV simulator control unit (ESCU) 2618 over signaling connection 2630 through the cable. Once the connector 2608 mates with the interface 2614, the remote control unit (RCU) 2620 within the J1772 type plug 2602 detects the connection and activates the connector 2602 using power from an internal removable, rechargeable battery within the power sensing control unit (PSCU) 2616. The RCU 2620 then commences communications with the central server 2622 using a wireless interface 2624 through the internet 2626. The wireless interface 2624 provides for a connection to the central server 2622 using a cellular data network, Wi-Fi network or any other type of wireless communications protocol. The RCU 2620 controls operation of the connector 2602, manages control of the connector responsive to commands from the central server 2622 and controls charging signals passing through the connector 2602.

The central server 2622 manages the connector 2602 in the field and also the mobile apps within user's mobile devices for reserving a charger (an "i-Charger"). The RCU 2620 contains a communications module that set ups a communications link with a local Wi-Fi router or other wireless communications network to access the Internet cloud 2626 and thereon to connect with the central server 2622 using the wireless interface 2624. The connection with the cloud 2626 may be provided by several means including inline powerline communications or wireless router to a modem connected to an Internet provider, or by satellite dish connection, or through a cellular data link. Thus, even a remote EV charger 2612 can be communicated with by the central server 2622. PSCU 2616 controls the charging operations once authorized as described herein over power connection 2628. The ESCU 2618 simulates signaling operations of the charger as described herein to enable communications over signaling connection 2630. The output interface 2632 provides the connection to the cable 2604.

Figure 28A:
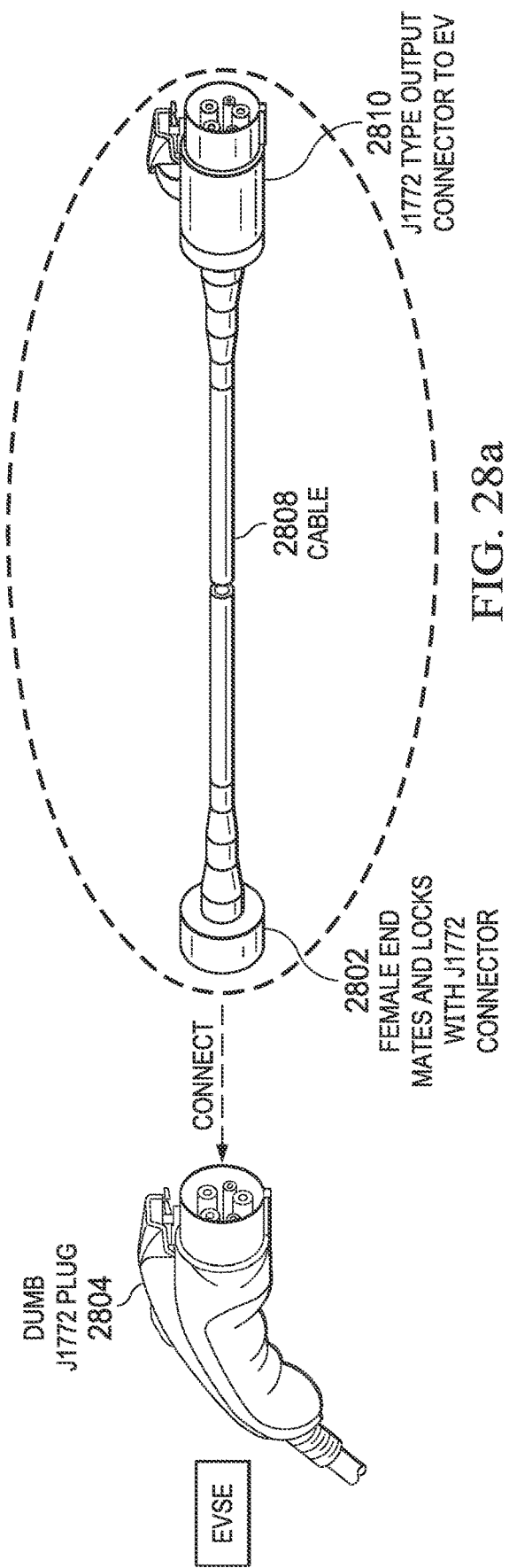
FIG. 28a illustrates a second cable embodiment of the adapter functionality.

FIG. 28a illustrates an alternative embodiment of the adapter functionalities implemented in a cable with the control circuitry implemented in the charger end of the cable. The control elements of the adapter may be distributed and incorporated into a cable socket 2802 that mates with the host EVSE's J1772 plug 2804. The cable socket 2802 is connected to a cable 2808 that connects with a standard J1772 type plug 2810 that connects the cable mechanism to the electric vehicle for charging.

Figure 28B:
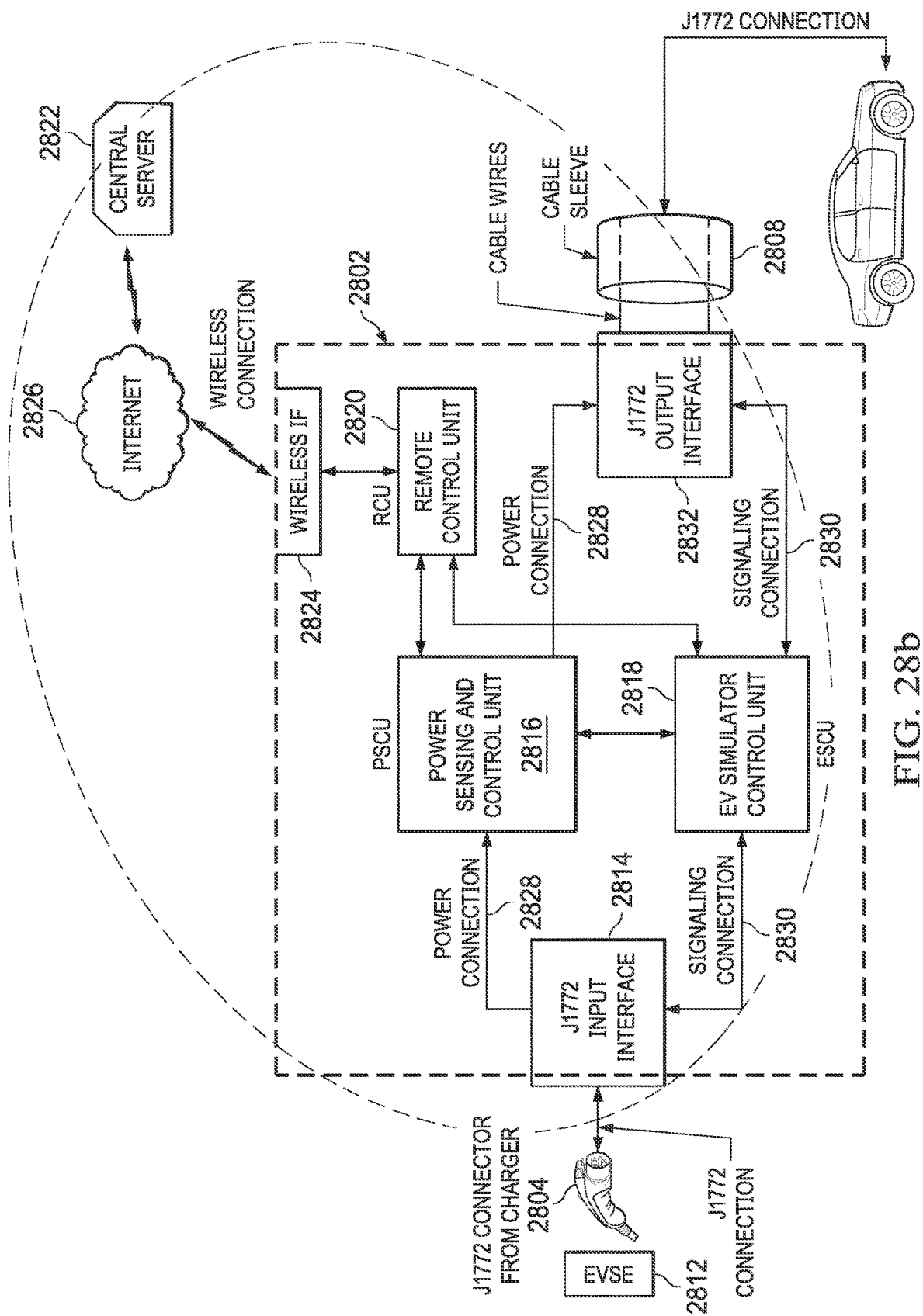

Referring now to FIG. 28b, there is illustrated a functional block diagram of the embodiment of FIG. 28. The J1772 connector 2804 of the EVSE connects with a J1772 interface 2814. The J1772 interface 2814 provides connections to a power sensing and control unit (PSCU) 2816 and to an EV simulator control unit (ESCU) 2818. Once the connector 2804 mates with the interface 2814, the remote control unit (RCU) 2820 detects the connection and activates the connector 2802 using power from an internal removable, rechargeable battery within the power sensing control unit (PSCU) 2816. The RCU 2820 commences communications with the central server 2822 using a wireless interface 2824 through the internet 2826. The wireless interface 2824 provides for a connection to the central server 2822 using a cellular data network, Wi-Fi network or any other type of wireless communications protocol. The RCU 2820 controls operation of the connector 2802, manages control of the connector responsive to commands from the central server 2822 and controls charging signals passing through the connector 2802.

The central server 2822 manages the connector 2802 in the field and also the mobile apps within user's mobile devices for reserving a charger (an "i-Charger"). The RCU 2820 contains a communications module that set up a communications link with a local Wi-Fi router or other wireless communications network to access the Internet cloud 2826 and thereon to connect with the central server 2822 using the wireless interface 2824. The connection with the cloud 2826 may be provided by several means including inline powerline communications or wireless router to a modem connected to an Internet provider, or by satellite data connection, or through a cellular data link. Thus, even a remote EV charger 2812 can be communicated with by the central server 2822. PSCU 2816 controls the charging operations once authorized as described herein over power connection 2828. The ESCU 2818 simulates signaling operations of the charger as described herein to enable communications over signaling connection 2830. The output interface 2832 provides the connection to the cable 2808.

Figure 29:
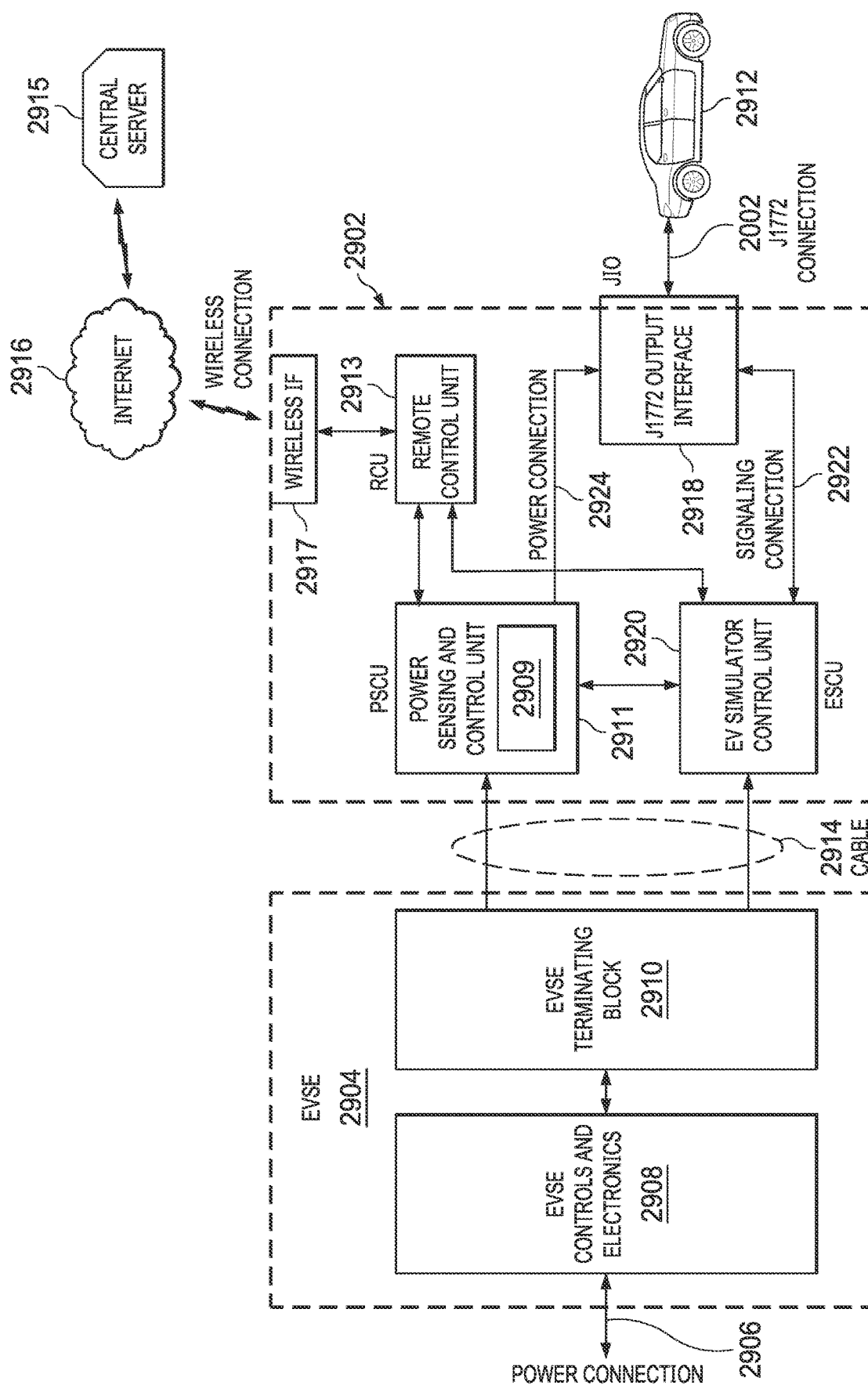
FIG. 29 illustrates a functional block diagram of an embodiment of the adapter functionality included within a charger connector.

Referring now to FIG. 29, there is illustrated a J1772 connector 2902 having the adapter functionality embedded therein. The EVSE charger 2904 connects to a power connection 2906 that provides power to the EVSE. EVSE control and electronics 2908 control the operation of the EVSE 2904 for providing an output charging current. The output of the charging current and the input of control signals from a charging EV 2912 are provided through the EVSE terminating block 2910. The EVSE 2904 connects with a J1772 connector 2902 having imbedded adapter functionalities via a cable 2914. The cable 2914 provides connections to a power sensing and control unit (PSCU) 2911 and to an EV simulator control unit (ESCU) 2920. Once the connector 2902 mates with the EV 2912, the remote control unit (RCU) 2913 detects the connection to the charger and activates the adapter using power from an internal removable, rechargeable battery 2909 within the power sensing control unit (PSCU) 2911. The RCU 2913 commences communications with the central server 2915 using a wireless interface 2917 through the internet 2916. The wireless interface 2917 provides for a connection to the central server 2915 using a cellular data network, Wi-Fi network or any other type of wireless communications protocol. The RCU 2913 controls operation of the connector 2902, manages control of the adapter responsive to commands from the central server 2915 and controls charging signals passing through the connector 2902.

The central server 2915 manages the connector 2902 in the field and also the mobile apps within user's mobile devices for reserving a charger (an "i-Charger"). The RCU 2913 contains a communications module that set ups a communications link with a local Wi-Fi router or other wireless communications network to access the Internet cloud 2916 and thereon to connect with the central server 2915 using the wireless interface 2917. The connection with the cloud 2916 may be provided by several means including inline powerline communications or wireless router to a modem connected to an Internet provider, or by satellite data connection, or through a cellular data link. Thus, even a remote EV charger 2904 can be communicated with by the central server 2915. PSCU 2911 controls the charging operations once authorized as described herein over power connection 2924. The ESCU 2920 simulates signaling operations of the charger as described herein to enable communications over signaling connection 2922. The output interface 2918 provides the J1772 connection to the EV 2912.

In other embodiments, certain adapter functional elements may be incorporated into the power dispensing cable itself. All such hardware elements that in their entirety make up the adapter hardware may be hardwired or interconnected by plug and socket combinations for ease of manufacturer and/or assembly and installation, and the adapter's software may be incorporated locally, and/or distributed and interconnected through the host or external networks wirelessly and/or remotely.

Figure 30:
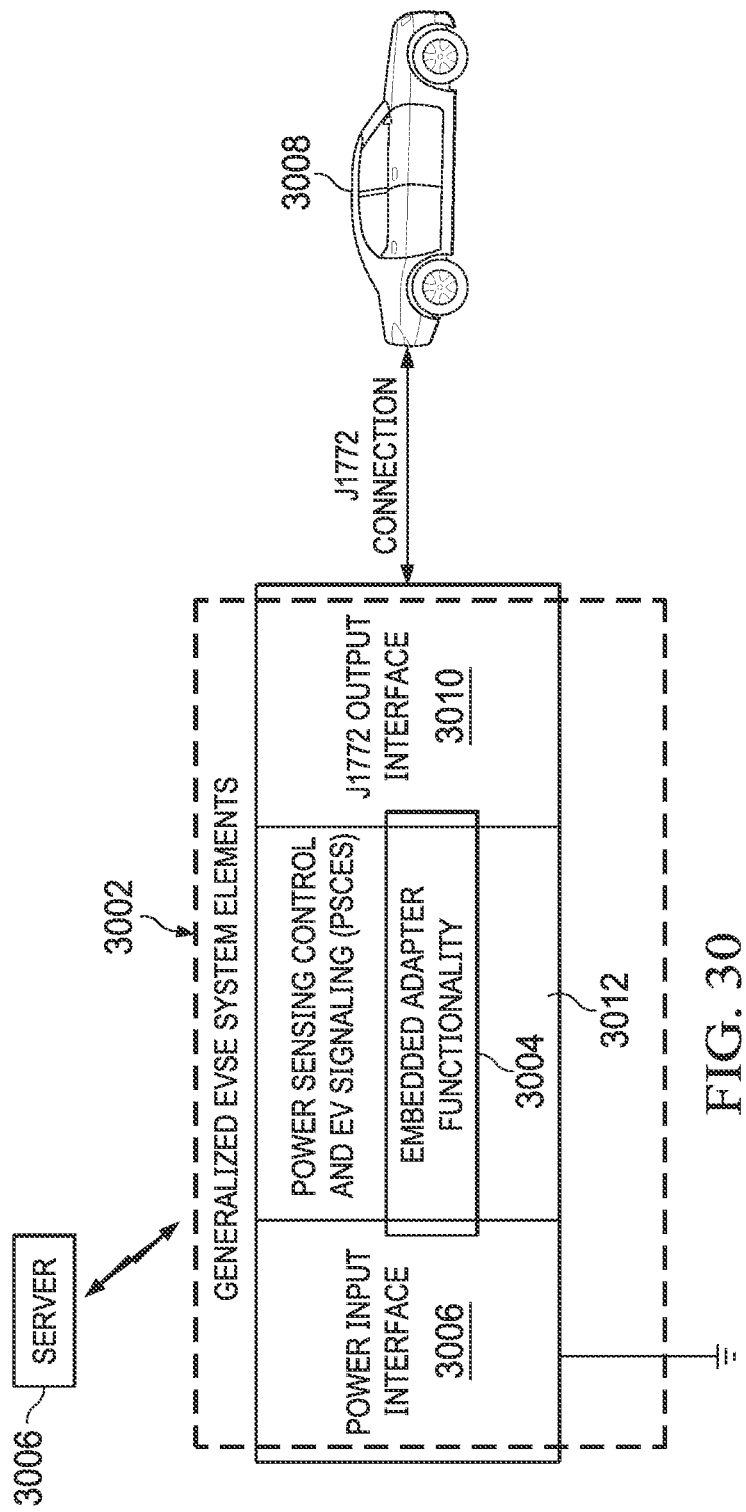
FIG. 30 illustrates a further embodiment of the adapter functionality included within a EVSE charger.

Referring now to FIG. 30, there is illustrated a networked electric vehicle charger 3002 having the adapter function 3004 embedded in the EVSE charger. The EVSE charger 3002 may be a networked EVSE under the network control of a remote server 3006 controlled by the charger manufacturer or network management of a third party EVSE management company. If under manufacturer control certain aspects of the adapter's functions 3004 may be disabled via the adapter's API or via hardware switches as applicable at the time of assembly/integration of/with the EVSE charger 3002. Similarly, in the case of using a third party network, the adapter's networking functionality may be disabled or conformed to the third party network. It should be noted that the use of the J1772 connection is depicted as an example and that other standard connectors and connecting protocols may be used.

The charger 3002 would include a power input interface 3006 for connecting the charger to a power source for charging the EV 3008. The EV 3008 connects with the charger 3002 through a J1772 output interface 3010 for providing the charging current thereto. Control of the charger 3002 is provided by the power sensing and control and EV signaling circuitry (PSCES) 3012. The adapter functionalities 3004 would be embedded across each of the power input interface 3006, the PSCES 3012 and the output interface 3010 as necessary to implement a charger providing all of the adapter functionalities described herein.

In the configurations for the use of the adapter's functional elements 3004 within the charger 3002, it is noted that its use may require reprogramming of the host EVSE charger software and/or modifying the EVSE hardware bill of materials such as the replacement of the EVSE's J1772 plug with a plug that incorporates some or all of the functionality of the adapter as depicted in FIG. 29. Alternatively, the adapter's function 3004 may be embedded into the EVSE charger 3002 itself as in FIG. 29, or embodied at the EVSE power distribution cable as depicted in FIGS. 28-31. The adapter is designed with an open architecture whereby it will be made available with certain API software and hardware modules that specifies the protocols for incorporating the adapter's function 3004 into the manufacture and use of existing EVSE charger 3002 designs. The adapter's function 3004 may be enabled at the EVSE charger 3002, at the network, or third party cloud software integration.

Figure 33:
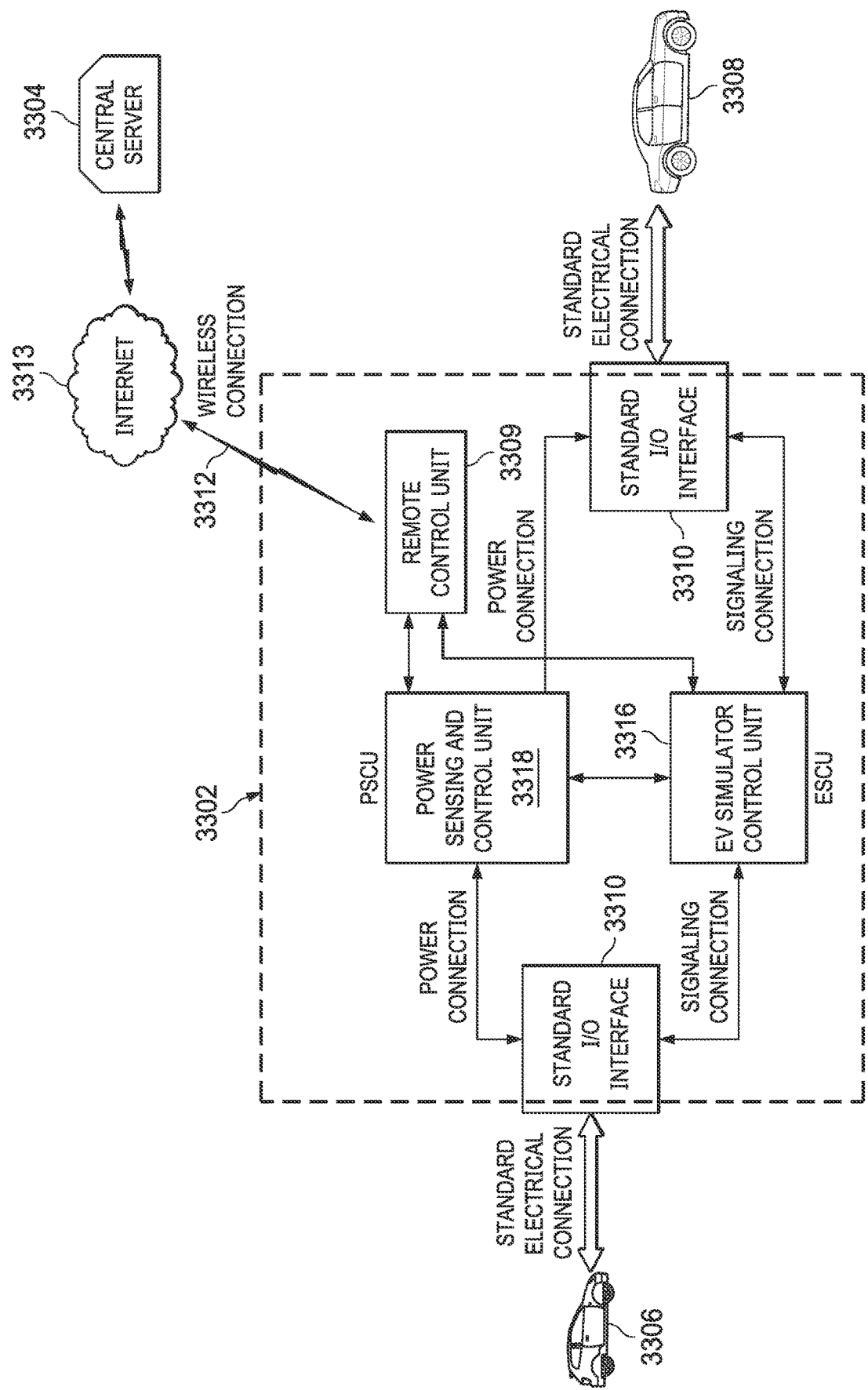
FIG. 33 illustrates an adapter used for providing electric vehicle to electric vehicle power transfer.

Referring further on FIGS. 22 and 23, it is noted that the connection 2214 between the EVSE charger 2206 and the adapter 2202 as well as the connection 2216 between the adapter and the EV 2204 are shown to be bi-directional (SAE J2847/3) so as to show the reversibility of energy flow ultimately between the EVSE charger and the EV. It is also noted that both the EVSE charger 2206 and the EV 2204 must be designed as to allow for two-way flow of electricity under the control of the adapter 2202. Such control is also part of the adapter's function to facilitate and enable utilizing the storage battery in the EV 2204 as either an off-Grid power source or as a peak energy supplement to the Grid itself and is described more fully in subsequent figures herein below. Another embodiment of the adapter 2202 is to facilitate power transfer directly between EVs 2204. FIG. 33 further describes the adapter's functionality and utility with regards to EV-to-EV electricity transfer and the variety of connector types and standards.

Figure 31:
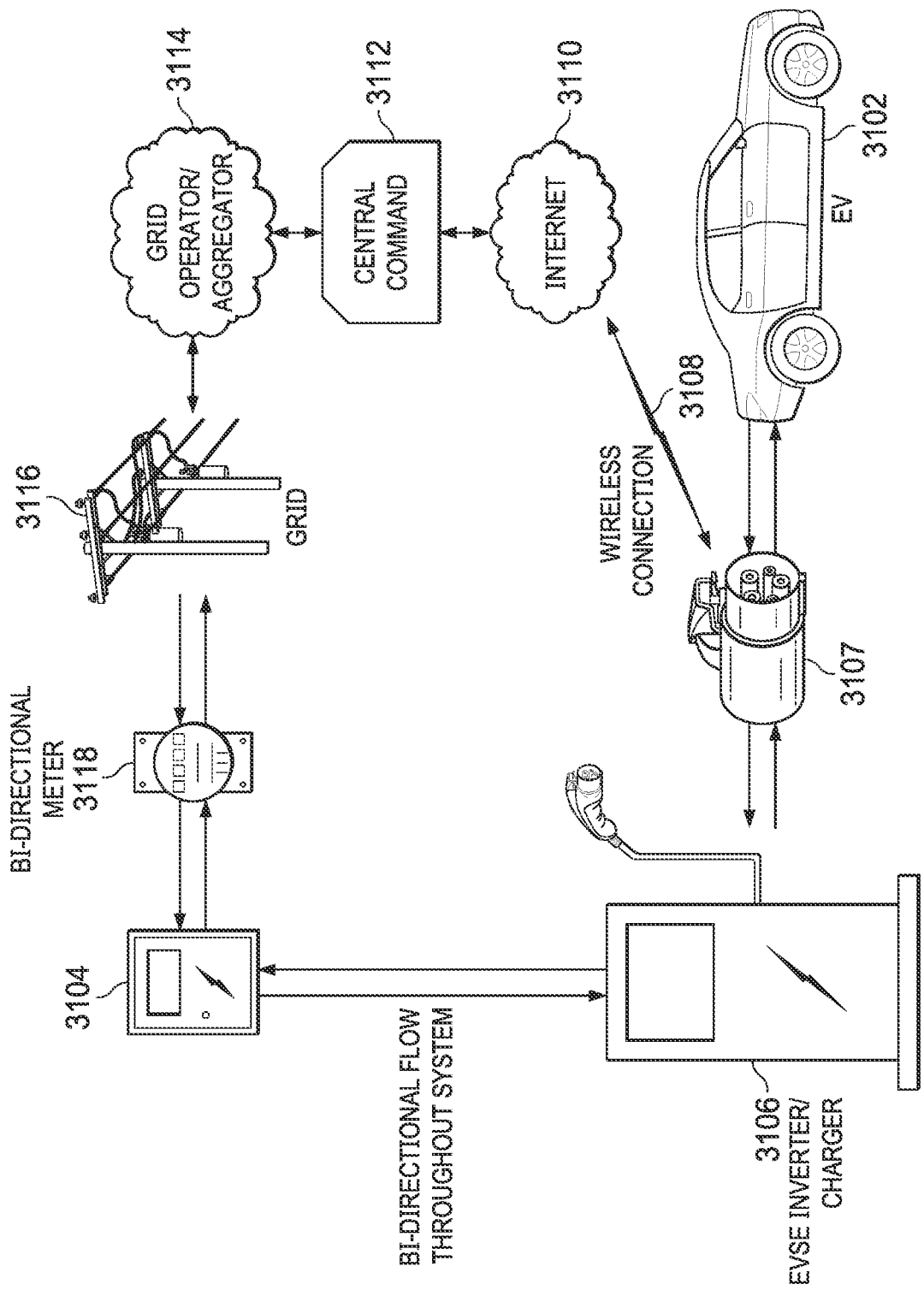
FIG. 31 illustrates a first embodiment of the adapter functionality as used within a grid-tie smart network EVSE charger.

Referring now to FIG. 31, there is an embodiment of a vehicle 3102 to grid ("V2G") Grid-Tie EVSE Inverter/Charger system providing for the ability to both charge an electric vehicle and/or use the EV as a battery storage device that provides Uninterruptible Power Supply ("UPS") functionality to a home 3104 as well as provide offset peak power energy to the Grid Operator/Aggregator 3114. The system bidirectionally connects to the adapter 3107 and the EVSE inverter/charger 3106 in one or more of the manners described herein above. The EVSE inverter/charger 3106 additionally connects with the home 3104 in a bidirectional fashion. The adapter 3107 enables a wireless connection 3108 through the Internet 3110 to the adapter central command server 3112. The adapter central command server 3112 additionally connects with the grid operator/aggregator 3114 that controls the operation of the power grid 3116. The power grid 3116 connects to a home 3104 and registers the power flow to and from the home using a bidirectional power meter 3118. In this manner, power can move in both directions between the home 3104 and an electric vehicle 3102 connected to the EVSE inverter/charger 3106.

Figure 32:
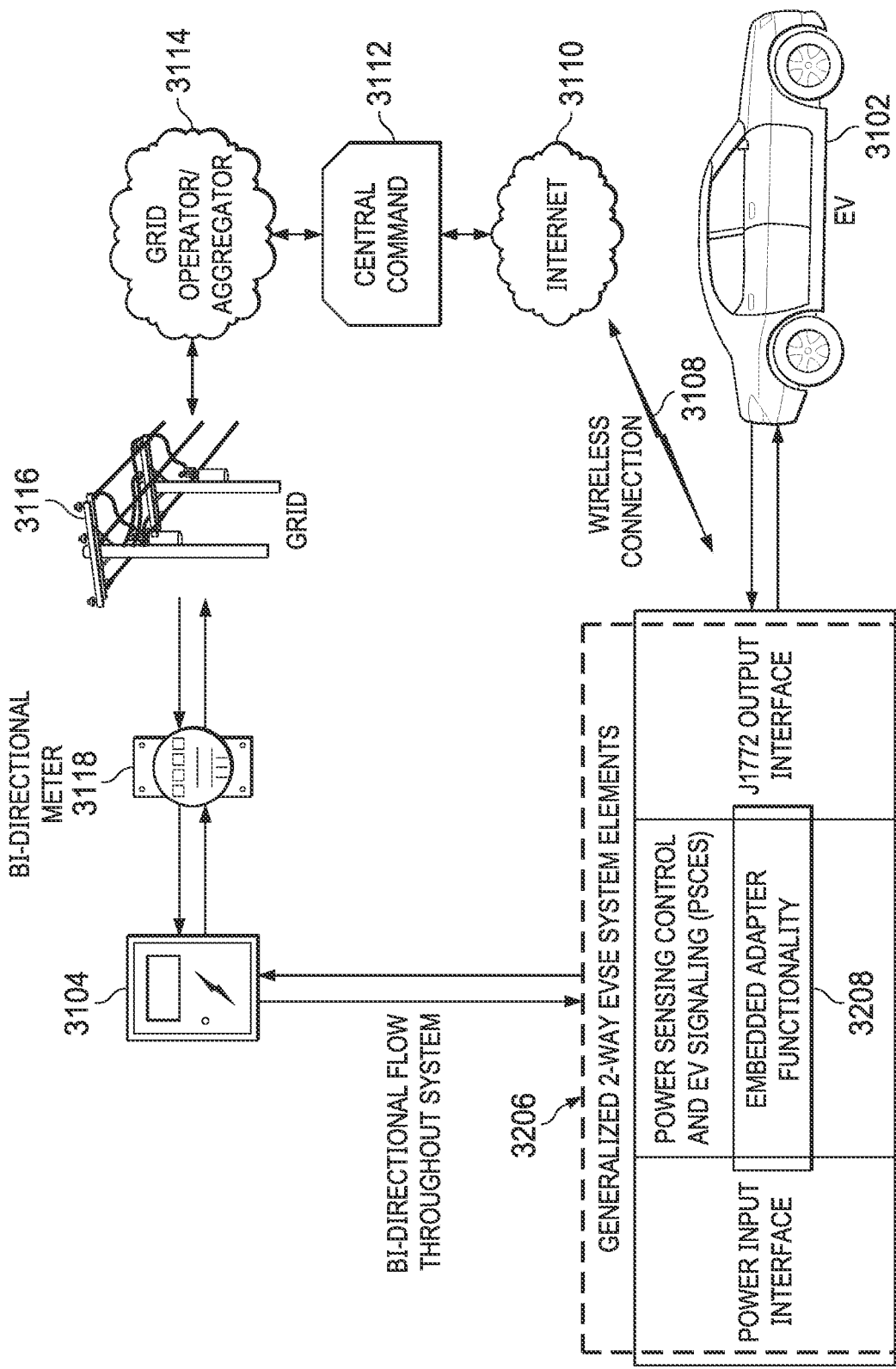
FIG. 32 illustrates a second embodiment of the adapter functionality is used within a grid-tie smart network EVSE charger.

FIG. 32 illustrates an alternative embodiment of the system illustrated in FIG. 31 of a V2G implementation whereby the adapter's function is embedded in the EVSE inverter/charger 3206 in a manner similar to that discussed with respect to FIG. 30. Thus, rather than an adapter 3107 enabling the implementation of the various adapter functionalities, these functionalities are embedded within the inverter/charger 3206.

As part of the solution, the adaptor functionality 3208 or adapter 3107 monitors the current flow and direction according to specified priorities, such as time of day electricity rates. Other priorities may be to maximize supplying power to the Grid 3116 for income generation, which may entail triggering the flow of power to the Grid at pre-set EV charge level ranges. Not all components of a complete system are shown for simplicity. Peak power energy supplement to the Grid 3116 may also be provided in the form of off-grid operation of the home 3104 which takes the home load off the Grid. The system shown includes a dual-function EVSE inverter/charger 3106/3206 as well as a bi-directional electric meter 3118 and several code required electrical components. The EV 3102 must also be able to provide power over the same J1772 connector. For simplicity, DC/AC power conversion from the EV 3102 to the adapter 3104 is not shown, nor the need for "balance of system" equipment for power conditioning, metering, instrumentation, safety, Grid protection such as auto disconnection, etc. that may be required for connection to the electric grid 3116 and to comply with specific power provider's grid-connection requirements.

The devices described herein shall conform to all governing and reasonable standards as may be in force such as those published by the Institute of Electrical and Electronics Engineers (IEEE), Underwriters Laboratories (UL), and the National Electrical Code (NEC) of the National Fire Protection Association, as it relates to electrical equipment and wiring safety.

The adapter 3107 includes hardware/software functionality and protocols that operate in conjunction with Central server 3112 and the Grid operator(s) 3114 to enable and facilitate various V2G functions with one or more EVs 3102 as a Grid energy storage. With a plurality of adapter-equipped EVs 3102, whether co-located or distributed throughout the Grid 3116, it would be possible to aggregate the power that is stored in the EVs 3102 at off-peak hours and subsequently reverse the current flow into the Grid at peak hours. Electric utilities in most states allow for "net metering", an arrangement where excess electricity generated by grid-connected renewable energy systems reverses the homeowner's electricity meter as energy is fed back into the grid. The adapter functionalities will accommodate the various compensatory arrangements and equipment requirements for V2G systems as may be required or mandated by law. Thus, a homeowner who uses more electricity than what his/her V2G system feeds back into the grid during a given month, only pays their power provider the difference between what is used and what is fed back into the Grid. By integrating the adapter functionalities into the system, EVSE charger homeowners can optimize the use of their EV 3102 for transportation as well as a home battery backup, and as an income supplement, or cost reduction. The Grid Operator/Aggregator 3114 can be given access to all adapter functionality-equipped V2G EVSE 3106/3206 whereby they can provide preferential Day-ahead or Demand Response pricing for the homeowner as well as optimizing energy on the grid 3116 as one feature of such a configuration. Besides aggregating the power of a plurality of adapter-equipped EVSEs 3106/3206 such plurality can be configured as a "micro-Grid" whereby power is shared among the micro-Grid participants by activating certain protocols with consent of the micro-Grid participants, in conjunction with the Grid operator(s).

This system scales vehicle charging stations from infrastructure to a fully distributed model employing all possible charging sites; home, office, vacation/travel accommodations, etc. for point of charge solutions. In addition, broad access to a fully aggregated model benefits the grid 3116 in having access to off-grid stored power for managing peak demand as well as providing the homeowner with an electricity back-up solution. In order to incentivize homeowners to participate in such a V2G program the Grid Operator/Aggregator 3114 can compensate the homeowner for supplying any power back to the Grid 3116 and such homeowner can also be compensated for supplying EV charging services to EV users. Such compensation can also take many forms including payments in kind, green credits for contributing to a cleaner environment, or other credits, compensation and/or recognition.

The system also provides for the battery component of a Solar Grid-Tie with Battery Backup whereby offering peace-of-mind to Off-Grid Solar and Grid-Tie Solar home and business owners ensuring energy availability in most conditions. It is to be noted that the functionality described in the invention are not restricted to the modalities and embodiments described in the figures and description nor are they restricted to specific physical elements and may in fact be distributed over and amongst several elements that may not be physically co-located.

Referring now to FIG. 33, there is illustrated the use of an adapter 3302 for providing for EV to EV power transfer with standard connector types. Here, the Power Connection in the adapter 3302 is shown to be bi-directional. The adapter 3302 in this embodiment in conjunction with the Central server 3304 facilitates power transfer from a designated power sourcing EV 3306 to a designated power receiving EV 3308. The Central server 3304 facilitates matching of the respective standard connectors of the connected EVs that plug into either of the adapter's Standard I/O Interfaces 3310. It is assumed that the respective EVs 3306, 3308 are equipped with the necessary power conversion equipment to transmit and receive power as may be the case while the adapter 3302 provides the necessary signaling protocols to enable the power transfer at the appropriate time and sequence. The transference of power between the respective EVs 3306, 3308 may be initiated automatically upon connecting the adapter 3302 between the two EVs, or via control of the mobile app associated with the adapter, and/or adapter service provider. The "Standard Electrical Connection" shown in connecting the EVs 3306, 3308 to the adapter 3302 encompasses the appropriate cabling and/or devices as may be needed to match the electrical requirements of the connection whether it is a connection between an EV and an EVSE, an EV with another EV, or an EV to the Grid. Thus, the adapter 3302 is not restricted to any specific EV in a V2G application.

The adapter 3302 is functionally connected with the EV 3306 and EV 3308 via standard I/O interfaces 3310. The Remote Control Unit (RCU) 3309 will activate responsive to connection to the I/O interfaces 3310, using power from an internal rechargeable battery (not shown) within the Power Sensing Control Unit (PSCU) 3310, and commence communications with Central Command server 3304 (also referred to as "Central"). Central server manages all the adapters 3302 in the field. The RCU 3309 contains a communications module that set ups a communications link 3312 with the premise's WiFi router or uses its internal cellular data communications unit to access the Internet cloud 3313 and thereon to connect with Central server 3304. The connection with the Internet 3313 may be provided by several means including inline powerline communications or wireless router to a modem connected to an Internet provider, or by satellite data connection, or through a cellular data link.

Once communication is established with Central server 3304, the RCU 3309 registers the adapter's 3302 presence and availability in the registry of adapters maintained at Central server 3304, and switches into standby mode to await the connection of the second electric vehicle (EV) 3308 for a charging session. In this idle state, the adapter 3302 draws its electricity from the internal rechargeable battery (not shown) in the PSCU 3310.

When the EV 3308 is connected to the adapter 3302 this triggers the RCU 3309 to simulate appearing as a charger to the EV 3308 in order to determine the EV's profile such as make of vehicle and the EV's battery properties. This information can be used to control the charging current applied to the EV's battery. The RCU 3309 communicates with the Central server 3304 to validate the EV driver and EV 3308. Upon receiving authorization for a valid charge, the RCU 3309 instructs the EV Simulator Control Unit (ESCU) 3316 to connect the signal line between the EV 3306 and the EV 3308. While the adapter 3302 is in idle state this signal line is open so that the EV 3306 cannot communicate prematurely with the EV 3308 until the adapter 3302 completes its pre-charge session protocols with the central server 3304 to validate and record the session, etc. This signal line(s) between the EV 3306 and the EV 3308 is the only switchable line(s) within the adapter 3302 as the means of communicating with the EV 3306 for controlling the activation or termination of power delivery from the EV 3306. Once the session is authorized, the ESCU 3316 acts as a transponder and enables communications between the EV 3306 and the EV 3304 via the signal line(s). During charging, the PSCU 3318 will tap power from the charge lines by inductance or other means to recharge the adapter's 3302 rechargeable battery which powers the adapter electronics when the adapter is on standby.

The PSCU 3318 does not switch the power lines to the EV 3308 itself as such it does not require bulky internal power switching relays. While this illustration cites inductance charging and use of a rechargeable battery to power the adapter's electronics other means of powering the adapter electronics may be used but which is not illustrated here. The PSCU 3318 manages and distributes the appropriate control power to all the electronics elements in the adapter 3302. Also, while this illustration cites the use of the signal line(s) for communications between the EV 3306 and the EV 3308, other charging devices and standards may evolve and embody other means of communications between the EV, but the underlying principle of the adapter 3302 acting as an intermediary control mechanism still applies.

During the EV 3308 charging session, the RCU 3309 monitors the connection in the sidelines via the signal line until its program or the Central server 3304 determines that the charging is to terminate. Alternatively, the determination to terminate may be triggered by the EV 3309 attaining the appropriate charge state. At this point, the ESCU 3316 is instructed to break the signaling connection between the EV 3308 and the EV 3306 and to take control of the charger's signal line(s) instead. The ESCU 3316 simulates as the EV 3306 and cut-off the charging power to the EV and the adapter 3302 then reverts to its idle state to await the next charging transaction. Besides controlling the connection or disconnection of the signal line(s) between the EV 3306 and the EV 3308, the ESCU 3316 may also perform other charging task protocols such as compiling and transmitting session statistics to the Central server 3304, communicating with the EV driver's mobile phone app, or managing the EV charging termination sequence according to the charger and EV that is in session.

Open Architecture

The adapter functionalities is an open architecture design in respect of both hardware and software such that external third-party systems can interface with the adapter either physically or remotely whether for bi-directional control or exchange of data. To facilitate such interfaces the adapter will embody one or more hardware specifications that define how to engage the adapter electrically and mechanically. In addition, one or more software application programming interface(s) (API or APIs) specify how to interface with the adapter software. Such APIs will enable third-party software to interact with the adapter software for various tasks, such as allowing third-party software to reserve and use the adapter-equipped i-Charger for the full or limited range of the adapter's functionality, and/or sync operation with other networks and/or software that interfaces with the adapter.

Figure 34:
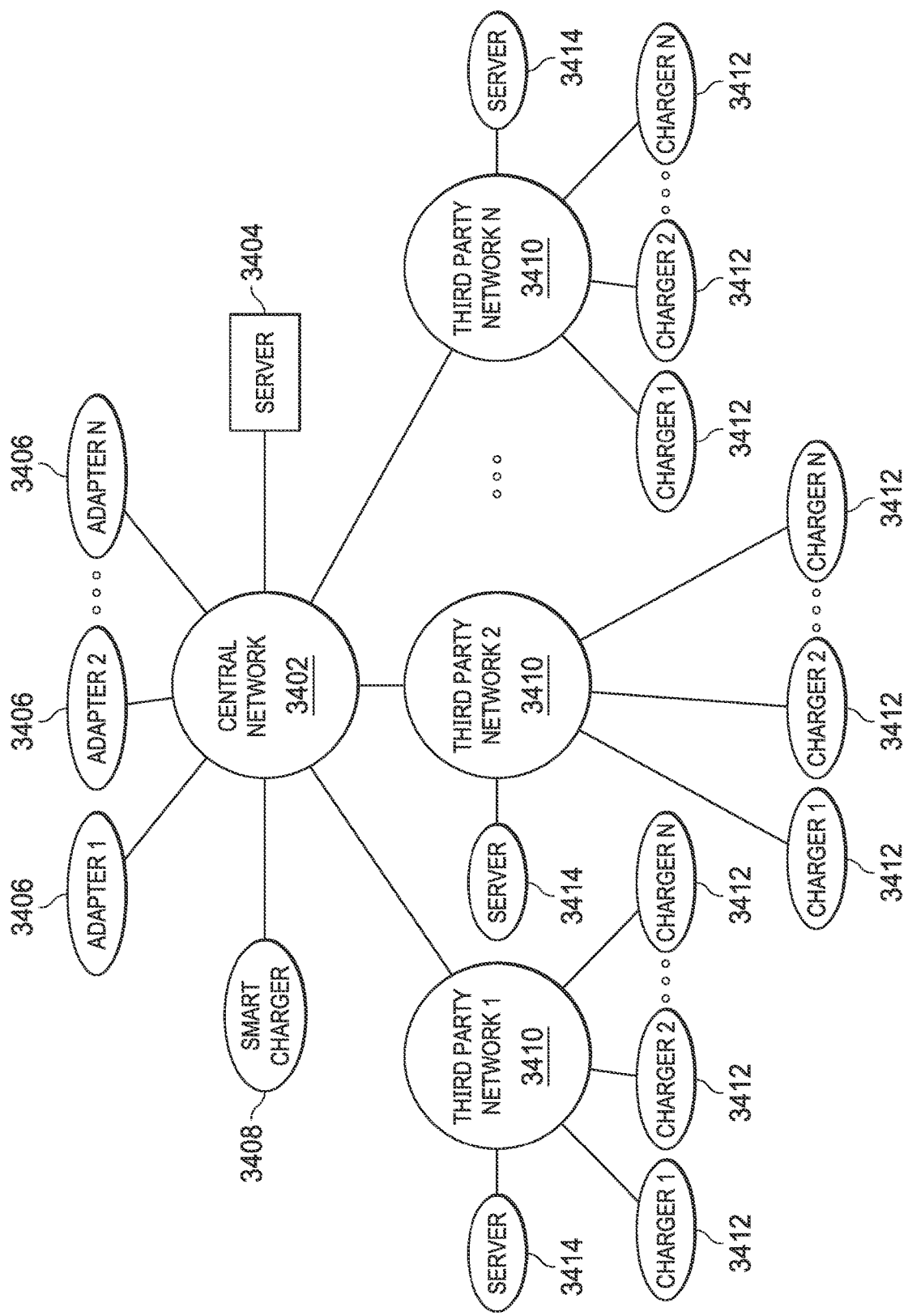
FIG. 34 illustrates an open architecture system including a central network that overlays multiple EV charging networks.

Referring now to FIG. 34, there is illustrated the manner in which the open architecture will provide for an open system that enables the charger network to act as a "central network" that overlays multiple EV charging networks so that anyone on the network can see all charging stations in the world that are available no matter which particular network may manage the actual charging station. The central network 3402 provides interconnection between the central server 3404 and a plurality of connected adapters 3406. The central server 3404 would control the operation of each of the adapters 3406 in the manner similar to that described herein above. Rather than adapters 3406, the central network 3402 could also interconnect with various smart chargers 3408 that connected to the central server 3404 through the central network 3402. While only a single server 3404 is illustrated it will be appreciated by one skilled in the art that multiple servers 3404 may be utilized for controlling various chargers and connected charger networks.

Additionally, the central network 3402 can connect to multiple third-party networks 3410. These third-party networks can comprise charger networks such as ChargePoint, EVGo, Blink, etc. that have one or more chargers 3412 connected thereto. These chargers 3412 within the third-party networks 3410 would be under control of servers 3414 associated with the third-party networks. The servers 3414 would communicate with the central server 3404 to enable users to obtain information regarding chargers located in any of the third-party networks 3410. In this manner, a user logging into the server 3404 of the central network 3402 could obtain available charger and reservation information for adapters 3406 and smart chargers 3408 located within their central network 3402 control, or alternatively could locate the availability and make reservations associated with chargers 3412 located within networks 3410 under third-party control. This can greatly widen the charger network availability to users logging in to the central network 3402.

Figure 35:
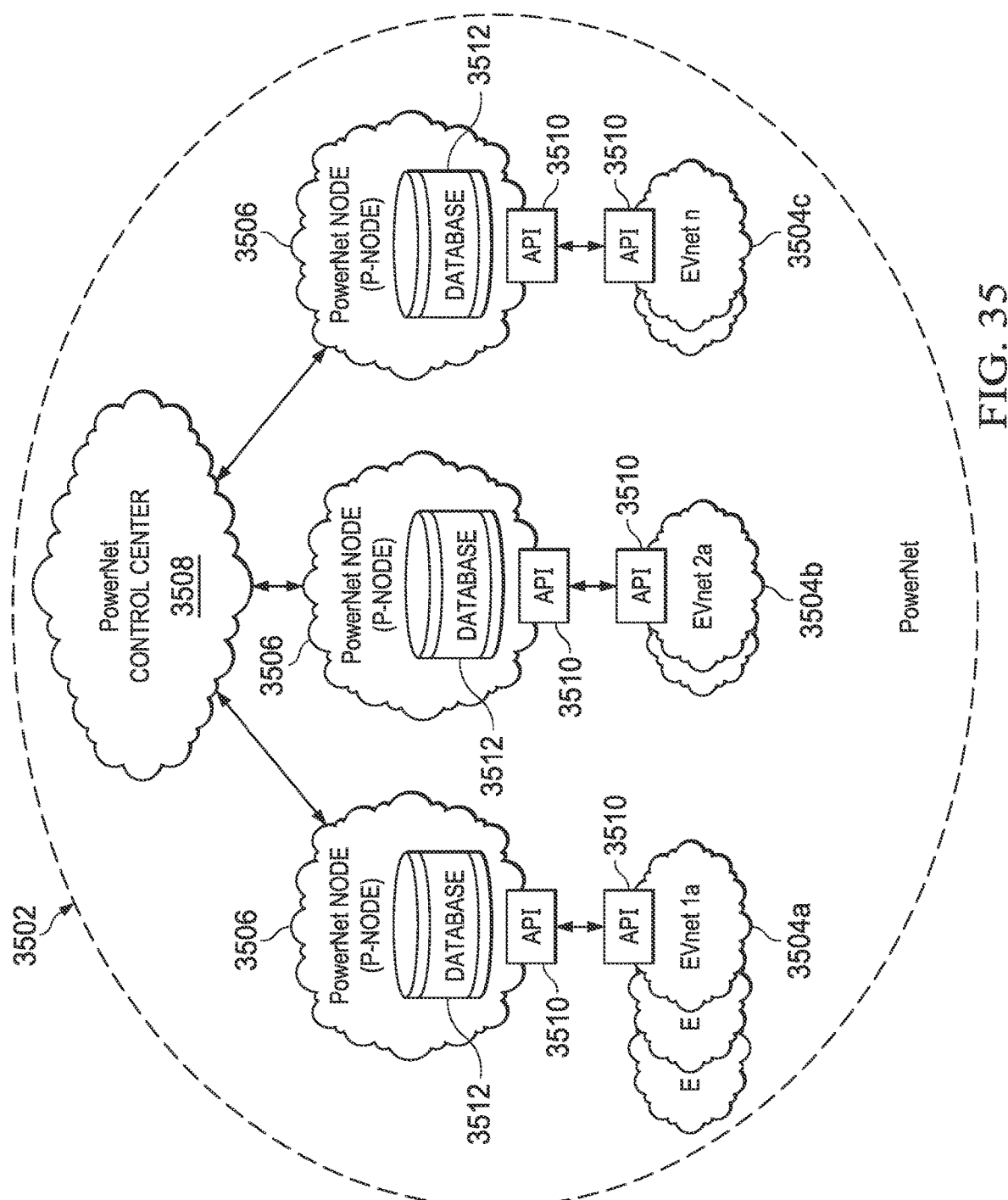
FIG. 35 illustrates a more detailed version of the open architecture system of FIG. 34.

Referring now to FIG. 35, there is illustrated an open and distributed system of a master network ("PowerNet") 3502 of two or more EVSE charging networks ("EVnet") 3504 wherein a subscriber of a first network ("EVnet1") 3504a may access a second third-party EVnet ("EVnet2") 3504b, and so forth to the $n^{th}$ EVnet ("EVnetn") 3504c so as to perform one or more functions on the targeted EVnet, via an app stored on a subscriber's mobile device designed for use on EVnet1 and vice-versa a subscriber of EVNet2 or EVnetn may access EVNet1 or any other EVnet in PowerNet network through that subscriber's host EVNet. For simplicity, the mobile app and the EVSEs (chargers) that are networked in the individual EVnets are not shown. However, chargers such as those described herein above may be used. The PowerNet Open System 3502 is essentially a consortium of EVnets 3504 and each EVnet is deemed to be a "consortium member."

As the PowerNet Consortium expands in number of EVNets 3504, PowerNet nodes ("P-Node(s)") 3506 will be deployed that act as hubs for groups of EVNets 3504 and such P-Nodes are managed by the PowerNet Control Center ("PNCC") 3508. Each P-Node 3506 and the PNCC 3508 includes the necessary hardware and software that provides and manages the necessary communications and security protocols and application programming interface ("API") 3510 to perform translations that are specific to each EVnet 3504, which are likely different from the API 3510 of another EVnet in the consortium. Such PowerNet node 3506, API translations and protocols are necessary to enable one EVnet 3504 to communicate with another EVnet seamlessly and securely. PowerNet nodes 3506 provide the translation functionality as required for the various existing networks and will accommodate future networks. It should be noted that interconnecting lines shown merely depict data connectivity and may be facilitated with physical or wireless connections or remotely through various data communications clouds, or a combination of both.

For ease of description, the functionality of the EVSE and the EVNet 3504 to which a specific EVSE is networked to, is not described as there are many different and separate branded private EVnets, each with several EVSE chargers under management and control. However, the EVSE chargers discussed above would comprise some examples thereof. Some or all of the EVSE chargers of any one EVNet 3504 may be networked and controlled remotely strictly for sole use of the particular EVNet's subscribing members. Some EVSE chargers are available for free public use. Many EVSEs are also not networked (un-connected) and these may be connected using the adapter device described above. EVnets 3504 that include chargers that incorporate the adapter functionality enables such adapter-equipped chargers to be remotely monitored, controlled, and electronically reserved. The adapter functionality may be licensed for use by one or more EVnets 3504 so as to be universally deployable or, if desired, to be set as an "open" standard for controlling standalone EVSEs. The intent for PowerNet network 3502 is to enable an EV driver that is a subscriber of one consortium EVnet 3504 to search for, reserve and use an EVSE charger that is managed by another consortium EVnet, and to do so seamlessly without the user's need to know the usage protocols of another consortium EVnet. Such ease of use is facilitated by the API translator functions 3510 embedded in PowerNet nodes 3506.

Figure 36:
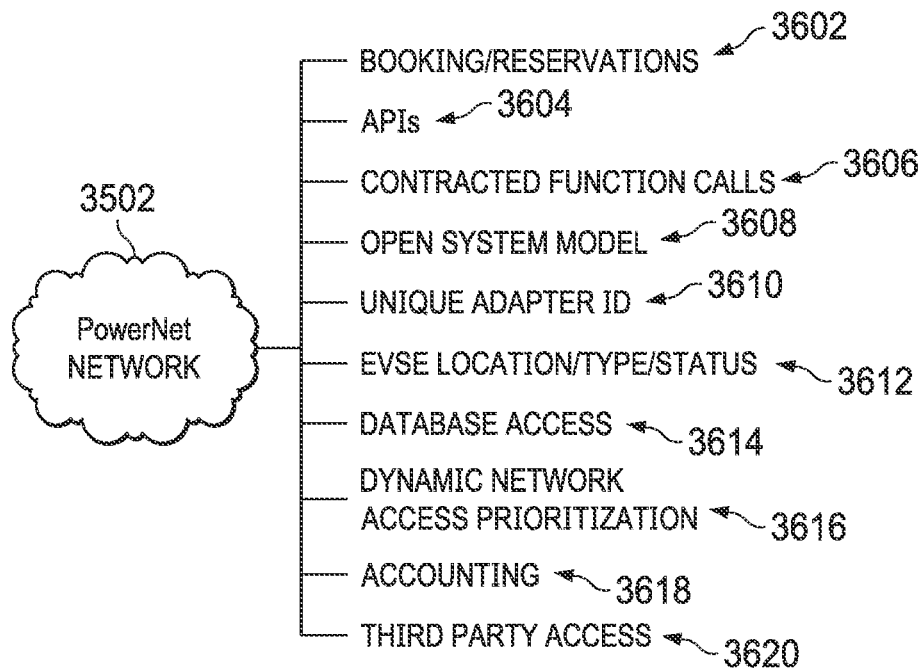
FIG. 36 illustrates various functionalities of the open architecture system.

The PowerNet Network 3502 herein described is shown to be a split hybrid model with central administration, security, exceptions and coordination functions with a distributed message passing system routed through PowerNet nodes that scales as more networks are added. The following discussion with respect to FIG. 36 is a summary but not exhaustive list of the features and functions of PowerNet Network 3502. A subscriber of one network 3504 can use the booking/reservation functionalities 3602 to search for and make booking/reservations on any EVSE charging network (EVnet) 3504 that is part of the PowerNet network 3502. The PowerNet Network 3502 provides API functionalities 3604 to every EVnet 3504 to enable transactions across the PowerNet network 3502 with various EVnets using different protocols. The EVnets 3504 include contracted function calls 3606. The EVnets 3504 provide their respective APIs 3510 to the PowerNet network 3502 to enable the network to make contracted function calls on the EVnets. The PowerNet network 3502 additionally includes an open system model 3608. The APIs 3510 enable all EVnets 3504 to deploy an adapter into their proprietary network. This supports an open system model for all EVSE manufacturers having deployed adapters that are then accessible across the PowerNet network 3502. A unique adapter ID functionality 3610 enables every adapter unit that goes into service to be assigned a unique ID. Third-party manufacturers who integrate and manufacturer an adapter or EVSE with embedded adapter functionalities may also be supported through the APIs 3510.

EVSE location/type/status functionalities 3612 enable the location of EVSEs to be determined along with their type and status. The booking/reservation functionalities 3602 also provide the ability to make reservations for located EVSEs. APIs 3510 of each EVnet 3504 are customized based on agreement between the PowerNet Network 3502 and the consortium network member. Database access functionalities 3614 provide access to databases 3512 associated with the network by third parties. Such databases 3512 may be deployed across the entire PowerNet environment such as in the P-Node 3506 as well as in the PNCC 3508 and in the EVnets (not shown). Database access will enable the printing of receipts and embedded ads, for example, or displaying the receipts or ads on a subscriber's mobile device. Dynamic prioritization of network access functionalities 3616 can prioritize access such as by time of day and/or membership status to subscribers. Accounting functions 3618 can provide grid debits and credits accounting based upon power consumed per transaction. Third-party access functionalities 3620 can provide network access by third parties such as utilities for utilizing the V2G functionality described herein. Other parties may be VRBO companies such as Airbnb.

Figure 37:
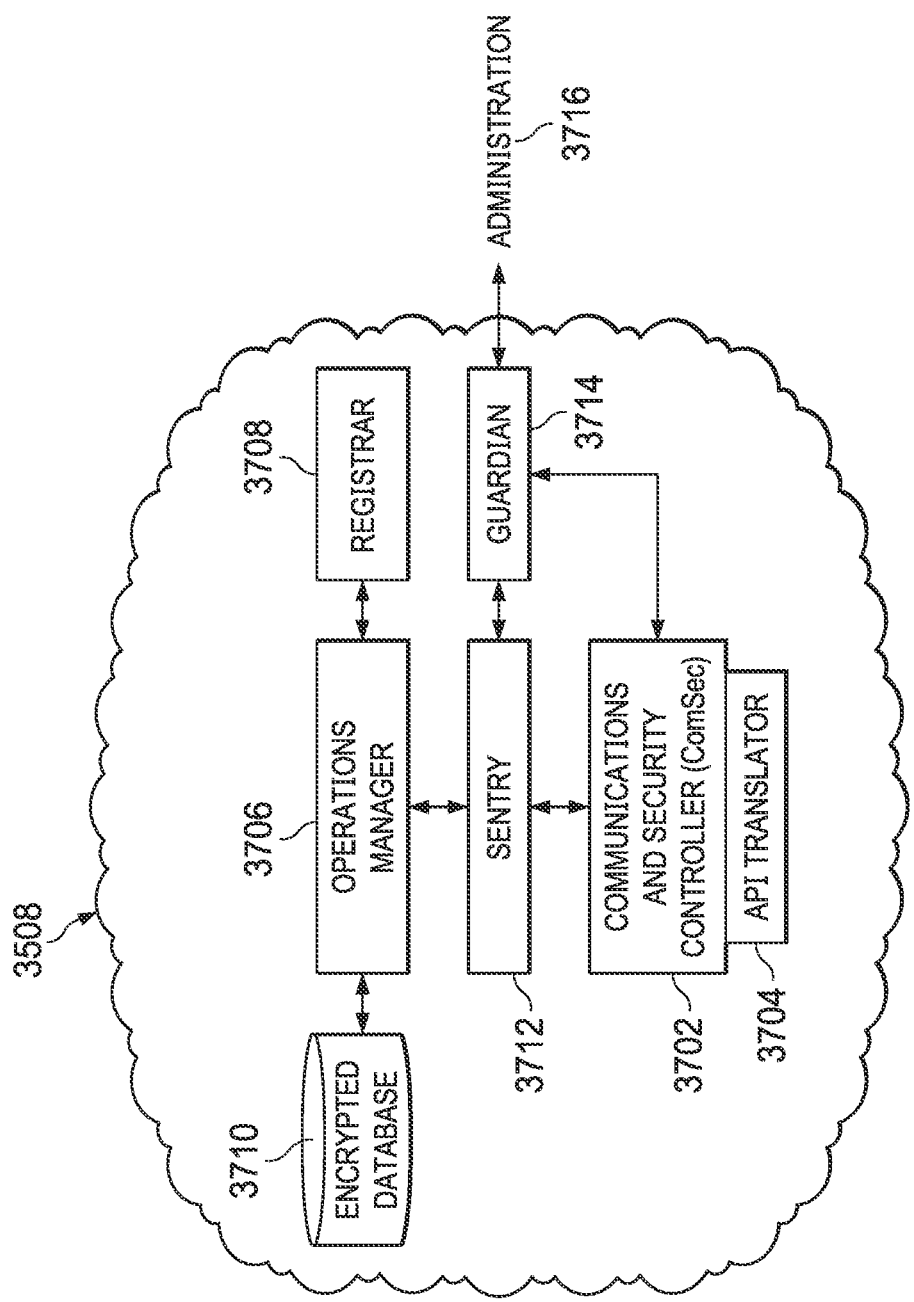
FIG. 37 illustrates the network control center of the open architecture system.

Referring now to FIG. 37, there is more particularly illustrated the PowerNet Control Center (PNCC) 3508. The PNCC 3508 operates the PowerNet Network 3502 which manages the communications and interactions with all consortium EVSE charging networks 3504 (the EVnets). FIG.

37 provides a functional blocks diagram of the PowerNet Control Center (PNCC) 3508. The PNCC 3508 interacts with all PowerNet Nodes (P-Node) 3506 and EVnets 3504 that have contracted to be a member network of the PowerNet Network 3502 to which the network has provided its API 3510 to enable the member EVnet 3504 to present data and action requests to the PowerNet node 3506. The member EVnet 3504 has also provided its API 3510 to the PowerNet Network 3502 to enable PowerNet nodes 3506 to present data and action requests to the respective EVnet.

PNCC 3508 manages the two-way interchange of communications between PowerNet nodes 3506 and the EVnets 3504 using system and sub-system components such as Communications & Security Controller ("ComSec") 3702. The ComSec 3702 is the primary access point of communications with the PowerNet Network 3508. Alternative physical access points may be incorporated for backup if security is compromised and instigates a system shutdown. Such alternative access points require an onsite physical connection with PNCC 3508 via the Guardian 3714 port using a secure device with appropriate protocols for restoration such as a laptop and the use of nFactor authentication and/or other accepted security protocol. ComSec 3702 contains appropriate security protocols for detecting any system attacks and is regularly updated as necessary.

The API Translator 3704 translates data communications between corresponding EVnets 3504 through PowerNet nodes 3506 or data communications with PowerNet nodes. The API translator 3704 provides a number of functions of the translator including receiving network requests from an EVnet 3504, receiving network requests from a P-Node 3506, translating network requests from an EVnet, transmitting network requests to a destination P-Node and sending network requests to EVnets.

Figure 38:
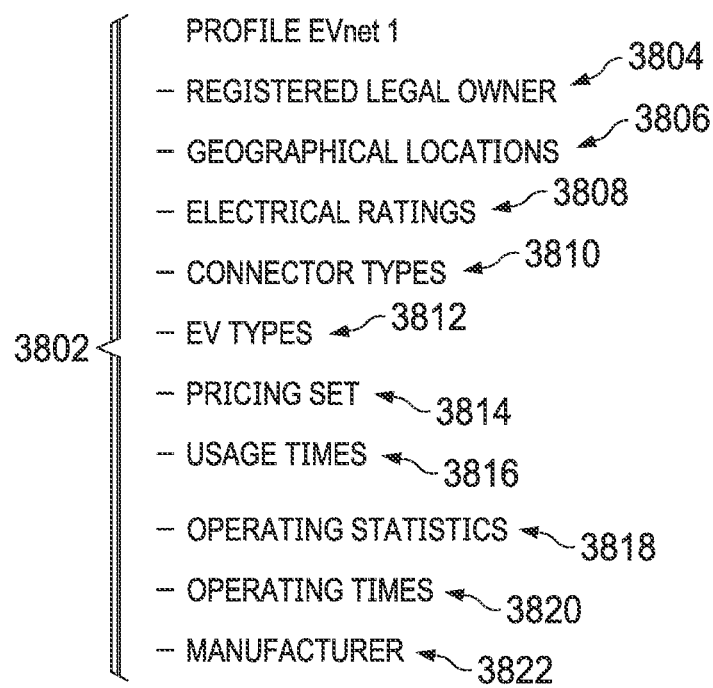
FIG. 38 illustrates the various types of information contained in a profile for an EVSE charging network.

The Operations Manager Controller 3706 monitors the operating status of each EVnet 3504 in the consortium, and also the status of all connected chargers in the respective EVnet. The Operations Manager Controller 3706 provides regular broadcast of member statuses as may be desired by specific EVnets 3504 that are appropriately configured for such updates. The Operations Manager 3706 operates in conjunction with the Registrar Controller 3708 described below. The Registrar 3708 manages the process wherein an EVnet is added, suspended, or removed from service and membership in the consortium. The Registrar Controller 3708 maintains the profile 3802 (FIG. 38) of each EVnet 3504. The profiles 3802 contain a variety of information including but not limited to the registered legal owner of the EVnet 3804 and all relevant information such as office address, communications protocol, etc. The profile 3802 also contains the geographical location 3806 of the EVnet's EVSE chargers, the electrical ratings 3808 of installed EVSE chargers, the types of standard connectors 3810 employed at each EVSE charger, the types of EVs 3812 that are chargeable at each EVSE charger, the pricing 3814 set for the respective EVSE chargers deployed, records usage times 3816 and operating statistics 3818 such as electricity usage per transaction (which may be subject to access control by each consortium EVnet), EVSE Charger operating times 3820, and the manufacturer 3822 of the installed EVSE chargers.

The PNCC 3508 also contains an Encrypted Database ("CryptData") 3710 which contains restricted data that may require synchronized encryption/decryption with respective EVnets 3504 with each requested database access. This database 3710 is regularly backed up to a backup PowerNet site which may comprise a mirror image of the operating PNCC 3508 to enable a quick recovery of PowerNet network 3502. The Sentry 3712 is essentially a gatekeeper between the active components of PNCC 3508 (the Operations Manager 3706, CryptData 3710 and Registrar 2708) and ComSec 3702. The Sentry Controller 3712 maintains an open gate for data flow between ComSec 3702 and the other active PNCC components as long as it receives a "green light" signal from the Guardian Controller 3714 which frequency may be set and regulated by the administrator 3716 of the PowerNet network 3508. The Guardian Controller 3714 is essentially the "key master" which determines whether ComSec 3702 stays connected to the active components of PNCC 3508 by randomly providing a "green light" signal to the Sentry Controller 3712. The Guardian Controller 3714 is controlled by the administrator 3716 of the PowerNet network 3508 and its sole function may be to control whether Sentry Controller is Open or Close by providing the green light or red light indication responsive to instructions from the administrator 3716. The Guardian Controller 3714 and Sentry Controller 3712 comprise security controllers for the PowerNet network 3508.

It should be noted that this implementation of PowerNet network 3508 depicts only one possible implementation of a network of a consortium of EVSE charging networks (EVnets) 3504 to enable users from different consortium EVnets to access EVSE chargers on other EVnets of which they are not a registered subscriber or are subject to access restrictions. Other topologies and/or system architecture may be deployed to facilitate seamless user access of multiple EVSE charging networks and EVSEs through a single user interface or app.

It will be appreciated by those skilled in the art having the benefit of this disclosure that these methods and devices for wireless and local control of flow of electrical power between electric vehicles, between EVSEs and electrical vehicles and between EVSEs and the electricity grid provides an improved method of charging and using electrical vehicles using a variety of types of charging devices. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus enabling an electric device charger to communicate with a central control network, comprising:
a first input interface for interconnecting the apparatus with the electric device charger;
a second input interface for interconnecting the apparatus with a charging connector associated with an electric device;
a wireless communications interface for providing wireless connectivity between the central control network and the electric device charger to receive bidirectional communications thereon; and
control circuitry interconnecting the first input interface with the second input interface via a signaling connection for providing communications between the first input interface and the second input interface, the control circuitry further providing a power connection for selectively providing a charging signal from the first input interface to the second input interface responsive to commands received over the wireless communications interface, wherein the control circuitry enters a standby mode upon completion of a registration process and enters a charging mode responsive to connection of the electric device to the second input interface and authorization of charging through the wireless communications interface.

2. The apparatus of claim 1, wherein the control circuitry further includes a simulator control unit for controlling the communications between the first input interface and the second input interface responsive to control signals received from the wireless communications interface.

3. The apparatus of claim 2, wherein the control circuitry further includes a power sensing and control unit for controlling the power connection between the first input interface and the second input interface responsive to control signals received from the simulator control unit.

4. The apparatus of claim 1, wherein the control circuitry further includes a remote control unit for controlling operation of the electric device charger responsive to control signals received from the central control network via the wireless communications interface.

5. The apparatus of claim 1, further comprising:
wherein the first input interface connects with power input interface of the electric device charger; and
wherein the control circuitry is implemented within power sensing control circuitry and electric device vehicle signaling circuitry of the electric device charger.

6. The apparatus of claim 1, further comprising:
a first connector including the first input interface for interconnecting the apparatus with a first charging connector of the electric device charger;
a second connector including the second input interface for interconnecting the apparatus with a second charging connector of the electric device;
a cable interconnecting the first connector with the second connector; and
wherein the wireless communications interface provides the wireless connectivity to the second connector responsive to connection of the first connector with the first charging connector of the electric device charger.

7. The apparatus of claim 1, further comprising:
a first connector including the first input interface for interconnecting the apparatus with a first charging connector of the electric device charger;
a second connector including the second input interface for interconnecting the apparatus with a second charging connector of the electric device vehicle;
a cable interconnecting the first connector with the second connector; and
wherein the wireless communications interface provides the wireless connectivity to the first connector responsive to connection of the first connector with the first charging connector of the electric device charger.

8. The apparatus of claim 1, wherein the apparatus is implemented within the charging connector of the electric device charger.

9. The apparatus of claim 1, wherein the electric device charger further comprises a second electric vehicle.

10. The apparatus of claim 1, wherein the electric device charger comprises an electric vehicle charger.

11. An apparatus enabling an electric device charger to communicate with a central control network, comprising:
a first input interface for interconnecting the apparatus with power input interface of the electric device charger;
a second input interface for interconnecting the apparatus with an electric device charger connector of the electric device charger;
power sensing control circuitry and electric device signaling circuitry of the electric device charger for controlling charging of an electric device by the electric device charger further comprising:
a wireless communications interface for providing wireless connectivity between the central control network and the electric device charger to receive bidirectional communications thereon; and
control circuitry interconnecting the first input interface with the second input interface via a signaling connection for providing communications between the first input interface and the second input interface, the control circuitry further providing a power connection for selectively providing a charging signal from the first input interface to the second input interface responsive to commands received over the wireless communications interface, wherein the control circuitry enters a standby mode upon completion of a registration process and enters a charging mode responsive to connection of the electric device to the second input interface and authorization of charging through the wireless communications interface.

12. The apparatus of claim 11, wherein the control circuitry further includes a simulator control unit for controlling the communications between the first input interface and the second input interface responsive to control signals received from the wireless communications interface.

13. The apparatus of claim 12, wherein the control circuitry further includes a power sensing and control unit for controlling the power connection between the first input interface and the second input interface responsive to control signals received from the simulator control unit.

14. The apparatus of claim 11, wherein the control circuitry further includes a remote control unit for controlling operation of the electric device charger responsive to control signals received from the central control network via the wireless communications interface.

15. The apparatus of claim 11, wherein the electric device charger comprises an electric vehicle charger.

16. An apparatus enabling an electric device charger to communicate with a central control network, comprising:
a first connector including a first input interface for interconnecting the apparatus with a first charging connector of the electric device charger;
a second connector including a second input interface for interconnecting the apparatus with a second charging connector of an electric device;
a cable interconnecting the first connector with the second connector;
a wireless communications interface for providing wireless connectivity between the central control network and the apparatus, the wireless connectivity initiated responsive to connection of the first connector with the first charging connector of the electric device charger; and
control circuitry interconnecting the first input interface with the second input interface via a signaling connection for providing communications between the first input interface and the second input interface, the control circuitry further providing a power connection for selectively providing a charging signal from the first input interface to the second input interface responsive to commands received over the wireless communications interface, wherein the control circuitry enters a standby mode upon completion of a registration process and enters a charging mode responsive to connection of the electric device to the second input interface and authorization of charging through the wireless communications interface.

17. The apparatus of claim 16, wherein the control circuitry further includes a simulator control unit for controlling the communications between the first input interface and the second input interface responsive to control signals received from the wireless communications interface.

18. The apparatus of claim 17, wherein the control circuitry further includes a power sensing and control unit for controlling the power connection between the first input interface and the second input interface responsive to control signals received from the simulator control unit.

19. The apparatus of claim 16 further comprising:
wherein the wireless communications interface and the control circuitry are located in the second connector; and
wherein the wireless communications interface provides the wireless connectivity to the second connector responsive to connection of the first connector with the first charging connector of the electric device charger.

20. The apparatus of claim 16 further comprising:
wherein the wireless communications interface and the control circuitry are located in the second connector; and
wherein the wireless communications interface provides the wireless connectivity to the first connector responsive to connection of the first connector with the first charging connector of the electric device vehicle charger.

21. The apparatus of claim 16, wherein the electric device charger comprises an electric vehicle charger.

* * * * *